US012787102B2

(12) United States Patent
Huang et al.

(10) Patent No.: US 12,787,102 B2
(45) Date of Patent: Nov. 3, 2026

(54) METHOD AND APPARATUS FOR TRANSMITTING USER EQUIPMENT TRIGGERED REPORT IN A WIRELESS COMMUNICATION SYSTEM

(71) Applicant: ASUS Technology Licensing Inc., Taipei City (TW)

(72) Inventors: Chun-Wei Huang, Taipei City (TW); Yu-Hsuan Guo, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 224 days.

(21) Appl. No.: 18/764,912

(22) Filed: Jul. 5, 2024

(65) Prior Publication Data

US 2025/0016871 A1 Jan. 9, 2025

Related U.S. Application Data

(60) Provisional application No. 63/532,013, filed on Aug. 10, 2023, provisional application No. 63/525,517, filed on Jul. 7, 2023.

(51) Int. Cl.

| | |
|---|---|
| ***H04W 76/20*** | (2018.01) |
| ***H04B 7/06*** | (2006.01) |
| ***H04B 17/318*** | (2015.01) |
| ***H04W 72/1268*** | (2023.01) |
| ***H04W 72/231*** | (2023.01) |

(52) U.S. Cl.

CPC .......... *H04W 76/20* (2018.02); *H04B 7/0626* (2013.01); *H04B 7/06968* (2023.05); *H04B 17/328* (2023.05); *H04W 72/1268* (2013.01); *H04W 72/231* (2023.01)

(58) Field of Classification Search

CPC ............. H04W 76/20; H04W 72/1268; H04W 72/231; H04W 24/10; H04W 24/08; H04W 36/0058; H04W 36/0033; H04W 36/0069; H04W 36/008; H04B 7/0626; H04B 7/06968; H04B 17/328; H04B 7/0695; H04B 7/06964; H04B 17/373; H04L 5/005

See application file for complete search history.

(56) References Cited

U.S. PATENT DOCUMENTS

2015/0050940 A1* 2/2015 Cai ....................... H04W 88/08 455/452.2
2023/0216565 A1* 7/2023 Kwak .................. H04B 7/0696 375/267
2025/0048152 A1* 2/2025 Yuan .................... H04B 7/0626

* cited by examiner

*Primary Examiner* — Sun Jong Kim
(74) *Attorney, Agent, or Firm* — Skaar Ulbrich Macari, P.A.

(57) ABSTRACT

User Equipment (UE) performing a method comprising receiving a configuration of at least one condition to trigger a report by the UE, receiving a first Downlink (DL) signal activating more than one joint or Transmission Configuration Indication (TCI) states, and triggering the report based on a first condition of the at least one condition being fulfilled. The UE determines the RSRP of a first current beam based on measurement of a first Reference Signal (RS) derived from a first joint or TCI state with a worst RSRP among the more than one joint or TCI states, or based on measurement of a second RS derived from a second joint or TCI state with a best RSRP among the more than one joint or TCI states. The UE determines the RSRP of the one or more candidate beams based on measurement of one or more candidate RSs.

20 Claims, 16 Drawing Sheets

| | | | | | | | | |
|---|---|---|---|---|---|---|---|---|
| R | Serving Cell ID | | | | | DL BWP ID | | Oct 1 |
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| D/U | TCI state ID 1 | | | | | | | Oct 4 |
| D/U | TCI state ID 2 | | | | | | | Oct 5 |
| ... | | | | | | | | |
| D/U | TCI state ID N | | | | | | | Oct N+3 |

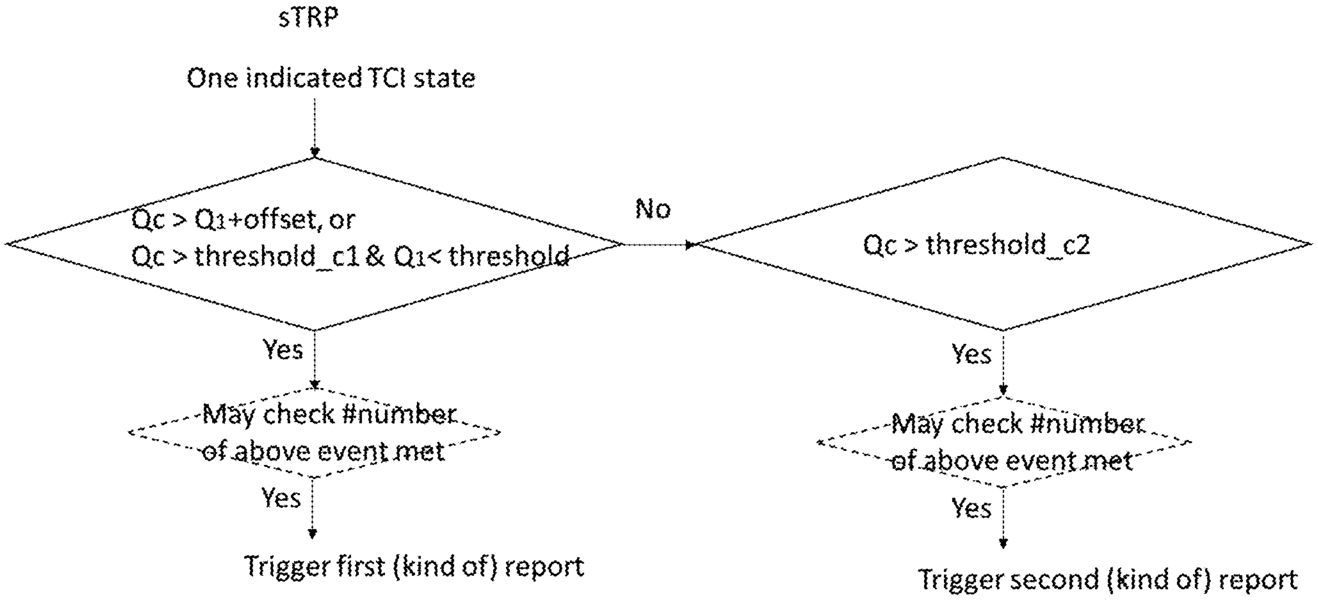

Qi: Quality of beam/RS/TCI state i
i=1: beam/RS/TCI state associated with currently used beam/RS/TCI state
i=c: beam/RS/TCI state associated one candidate beam/RS/TCI state Note1: Threhsold_c1, threshold_c2, and threshold may correspond to same or different value.
Note2: different candidate beam/RS/TCI state corresponds to different count of #number of event. In other words, per candidate RS's counting is assumed.)

FIG. 10

METHOD AND APPARATUS FOR TRANSMITTING USER EQUIPMENT TRIGGERED REPORT IN A WIRELESS COMMUNICATION SYSTEM

CROSS-REFERENCE TO RELATED APPLICATIONS

The present application claims priority to and the benefit of U.S. Provisional Patent Application Ser. No. 63/525,517, filed Jul. 7, 2023, and U.S. Provisional Patent Application Ser. No. 63/532,013, filed on Aug. 10, 2023; with each of the referenced applications and disclosures fully incorporated herein by reference.

FIELD

This disclosure generally relates to wireless communication networks and, more particularly, to a method and apparatus for transmitting a user equipment triggered report in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for transmitting a User Equipment (UE) triggered report in a wireless communication system, with a method comprising receiving a configuration of at least one condition to trigger a report by the UE, wherein the report is an L1 report or a Medium Access Control (MAC) Control Element (CE), receiving a first Downlink (DL) signal activating more than one joint or DL Transmission Configuration Indication (TCI) states, and triggering the report based on a first condition of the at least one condition being fulfilled, wherein: the first condition includes that: a Reference Signal Received Power (RSRP) of one or more candidate beams is with an offset better than an RSRP of a first current beam, or a number of instances, that the RSRP of the one or more candidate beams is with the offset better than the RSRP of the first current beam, exceeds or reaches a maximum number, and wherein: the UE determines the RSRP of the first current beam based on measurement of a first Reference Signal (RS) derived from a first joint or DL TCI state with a worst RSRP among the more than one joint or DL TCI states, or based on measurement of a second RS derived from a second joint or DL TCI state with a best RSRP among the more than one joint or DL TCI states, and the UE determines the RSRP of the one or more candidate beams based on measurement of one or more candidate RSs.

BRIEF DESCRIPTION OF THE DRAWINGS

FIG. 10 is an example diagram showing that a UE triggers a first (kind of) report when the quality associated with the candidate RS and the quality associated with the indicated RS are both met, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.300 V17.2.0 (2022-09) 3rd Generation Partnership Project; Technical Specification Group Radio Access Network; NR; NR and NG-RAN Overall Description; Stage 2 (Release 17); [2] Chair's notes RAN1 #111 eom3; [3] Chair's notes RAN1 #112 eom3; [4] R2-2213332 38.300 running CR for introduction of NR further mobility enhancements; [5] 3GPP TS 38.331 V17.3.0 (2022-12) 3rd Generation Partnership Project; Technical Specification Group Radio Access Network; NR; Radio Resource Control (RRC) protocol specification (Release 17); [6] 3GPP TS 38.214 V17.3.0 (2022-09) 3rd Generation Partnership Project; Technical Specification Group Radio Access Network; NR; Physical layer procedures for data (Release 17); [7] Chair's notes RAN1 #112b-e eom3; [8] Chair's notes RAN1 #113 eom3; [9] 3GPP TS 38.321 V17.3.0 (2022-12) 3rd Generation Partnership Project; Technical Specification Group Radio Access Network; NR; Medium Access Control (MAC) protocol specification (Release 17); and [10] 3GPP TS 38.212 V17.3.0 (2022-09) 3rd Generation Partnership Project; Technical Specification Group Radio Access Network; NR; Multiplexing and channel coding (Release 17). The standards and documents listed above are hereby expressly and fully incorporated herein by reference in their entirety.

Figure 1:
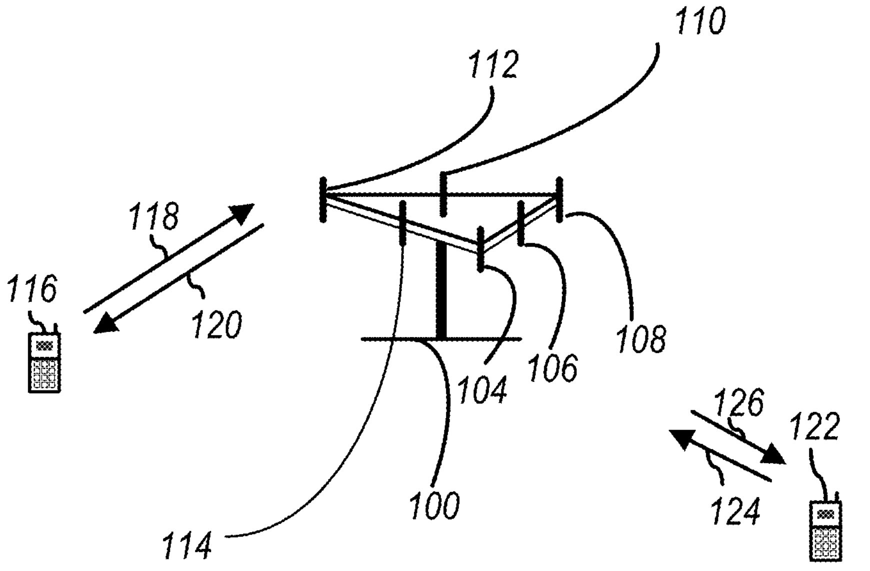
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
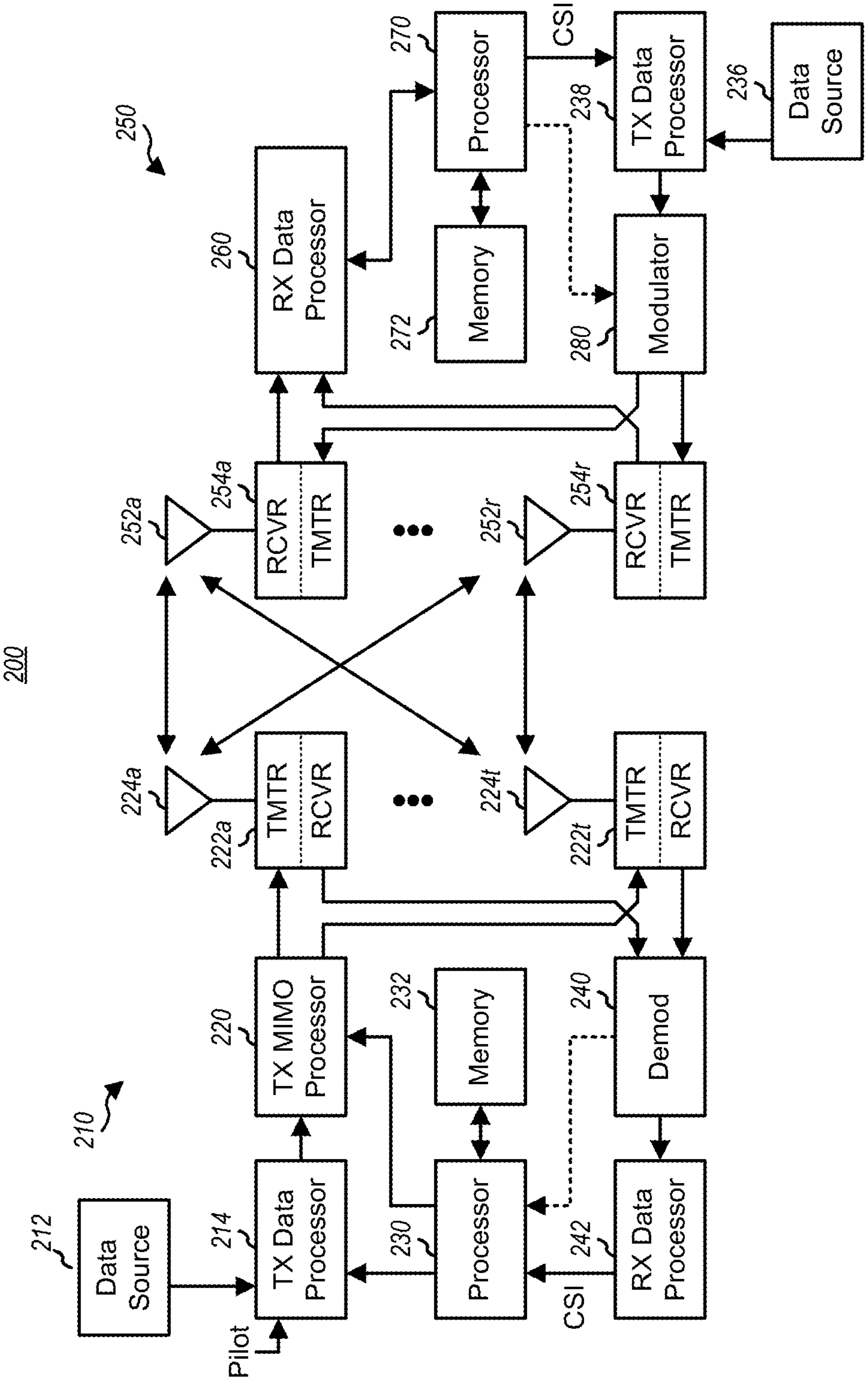
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$"detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
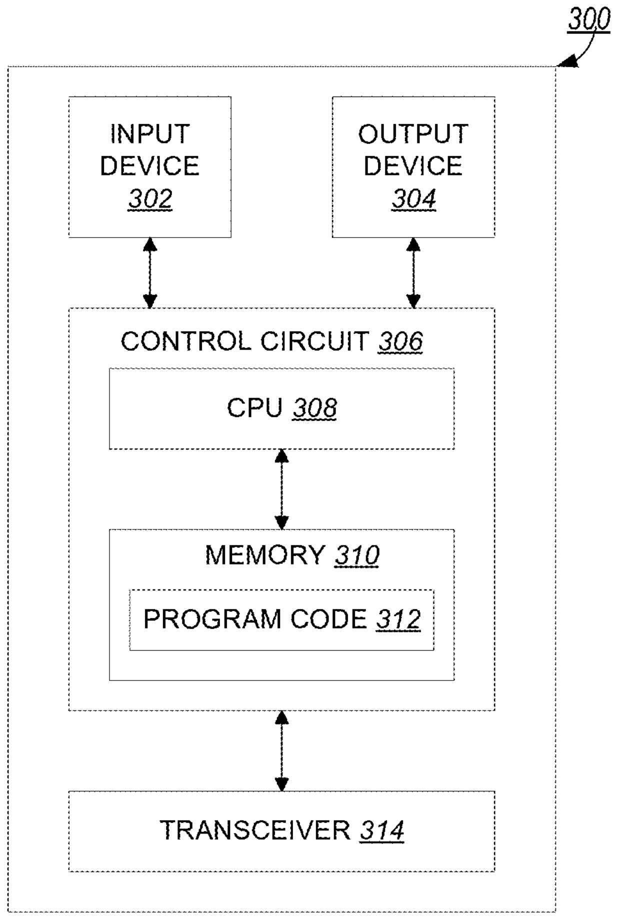
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
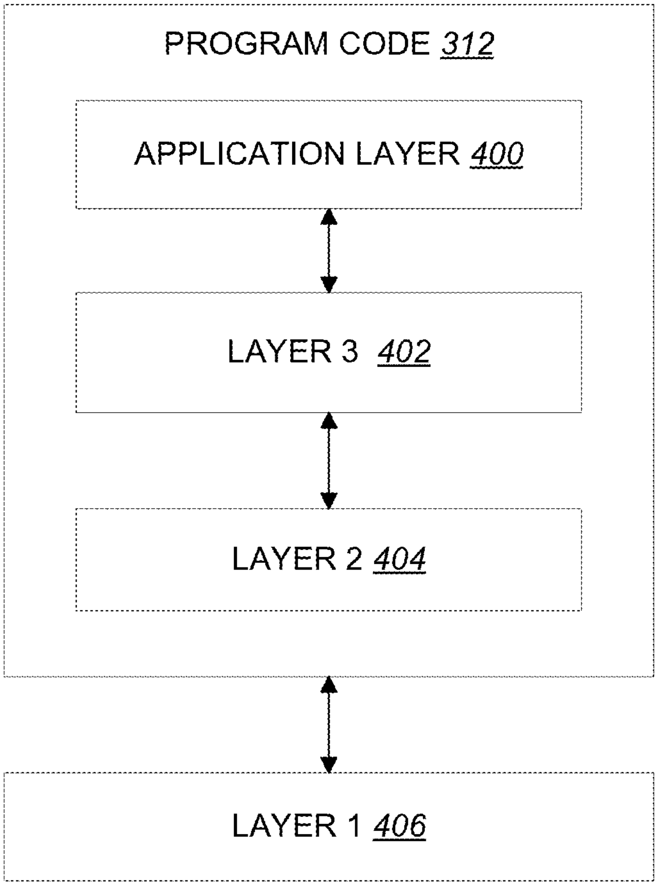
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In TS 38.300 ([1] 3GPP TS 38.300 V17.2.0 (2022-09) 3rd Generation Partnership Project), NR waveform, numerology and frame structure are quoted below.

The numerology is based on exponentially scalable sub-carrier spacing $\Delta f=2^{\mu}\times 15$ kHz with $\mu=\{0,1,3,4,5,6\}$ for PSS, SSS and PBCH and $\mu=\{0,1,2,3,5,6\}$ for other channels. Normal CP is supported for all sub-carrier spacings, Extended CP is supported for $\mu=2$. 12 consecutive sub-carriers form a Physical Resource Block (PRB). Up to 275 PRBs are supported on a carrier.

TABLE 5.1-1

Supported transmission numerologies.

| $\mu$ | $\Delta f = 2^{\mu} \cdot 15$ [kHz] | CP | Supported for data | Supported for synch |
|---|---|---|---|---|
| 0 | 15 | Normal | Yes | Yes |
| 1 | 30 | Normal | Yes | Yes |
| 2 | 60 | Normal, | Yes | No |

TABLE 5.1-1-continued

Supported transmission numerologies.

| μ | Δf = $2^{\mu} \cdot 15$ [kHz] | CP | Supported for data | Supported for synch |
|---|---|---|---|---|
| | | Extended | | |
| 3 | 120 | Normal | Yes | Yes |
| 4 | 240 | Normal | No | Yes |
| 5 | 480 | Normal | Yes | Yes |
| 6 | 960 | Normal | Yes | Yes |

The UE may be configured with one or more bandwidth parts on a given component carrier, of which only one can be active at a time, as described in clauses 7.8 and 6.10 respectively. The active bandwidth part defines the UE's operating bandwidth within the cell's operating bandwidth. For initial access, and until the UE's configuration in a cell is received, initial bandwidth part detected from system information is used.

Downlink and uplink transmissions are organized into frames with 10 ms duration, consisting of ten 1 ms subframes. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe.

Timing Advance TA is used to adjust the uplink frame timing relative to the downlink frame timing.

Figures 5, 6:
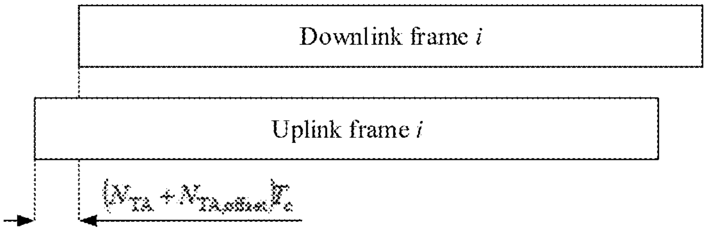
FIG. 5 (PRIOR ART)
FIG. 6 (PRIOR ART)
FIG. 5 is a reproduction of FIGS. 5.1-2: Uplink-downlink timing relation, from ([1] 3GPP TS 38.300 V17.2.0 (2022-09) 3rd Generation Partnership Project).
FIG. 6 is a reproduction of FIG. 6.1.3.47-1: Unified TCI state activation/deactivation MAC CE, from 3GPP TS 38.321 V17.3.0 (2022-12) 3rd Generation Partnership Project.

FIG. 5 is a Reproduction of FIGS. 5.1-2: Uplink-Downlink Timing Relation, from ([1] 3GPP TS 38.300 V17.2.0 (2022-09) 3rd Generation Partnership Project).

Operation on both paired and unpaired spectrum is supported.

In [2] Chair's notes RAN1 #111 eom3, related progress for mobility is quoted below. Agreement

- For L1 measurement report for Rel-18 L1/L2 mobility, if UE event triggered report for L1 measurement is supported based on further study
  - At least the following aspects may be considered
    - How to define UE event and exact definition of events,
    - Report container
    - Resource allocation/assignment for UE event triggered report
    - Necessity of indication to gNB when the condition UE event is met, and how
    - Necessity to define the condition to start/stop the reporting,
    - Contents of the report/reporting format, PCI, RS ID, measurement result etc.
    - The interaction with filtered L1 measurement results (if supported)
    - Support of simultaneous configuration of both UE event triggered and any of periodic/semi-persistence/aperiodic reporting, and solutions when both of them are configured.
    - Report destination, whether the report is sent to serving cell only or can be sent to one or more candidate cell(s).
    - Benefit when L3 measurement is involved Agreement

- For gNB scheduled L1 measurement report for Rel-18 LTM, report as UCI is supported
  - Semi-persistent report on PUSCH, and aperiodic report on PUSCH are supported
    - FFS: periodic and semi-persistent PUCCH
  - In a single report instance, report for serving cell and candidate cell(s) for intra-frequency and/or inter-frequency can be included.

Agreement

- For beam indication timing for Rel-18 LTM,
  - Support Scenario 2: Beam indication together with cell switch command,
    - For Rel-17 unified TCI framework,
      - Beam indication indicates TCI state for each target serving cell
  - FFS: Scenario 1: Beam indication before cell switch command
  - FFS: Scenario 3: Beam indication after cell switch command
- FFS: Activation of TCI state(s) of target serving and/or candidate cell(s).

Agreement

On mechanism to acquire TA of the candidate cell(s) in Rel-18 LTM, at least support PDCCH ordered RACH.

- The PDCCH order is only triggered by source cell

Agreement (Made in RAN1 #110b-e)

Support TA acquisition of candidate cell(s) before cell switch command is received in L1/L2 based mobility.

Agreement

For PDCCH ordered RACH in LTM, at least the following enhancements are supported

- Introduce indication of candidate cell and/or RO of candidate cell in DCI
- configuration of RACH resource for candidate cell(s) is provided prior to the PDCCH order Agreement

- TA updating (i.e. re-acquisition of TA) for candidate cell can be triggered by NW.
  - same triggering mechanism reuse the initial TA acquisition, i.e., PDCCH order triggered RACH in a candidate cell In [3] Chair's notes RAN1 #112 eom3, related progress for mobility is quoted below.

Agreement

- RAN1 shares the same understanding as RAN2 on agreement:
  - The LTM mobility trigger information is conveyed in a MAC CE
- The same MAC CE is used for the LTM triggering.

Agreement

- The agreement on scenario 2 (Beam indication together with cell switch command) at RAN1 #1 11 is further clarified as the following:
  - Beam indication for the target cell(s) is conveyed in the MAC CE used for LTM triggering for scenario 2

Agreement

- At least for Rel-17 unified TCI framework based beam indication included in cell switch command (i.e. scenario 2), beam indication applies to signals/channels that follow or are configured to follow Rel-17 unified TCI at the target cell(s)
- FFS: beam indication for mTRP case Agreement For Rel-18 LTM, Random Access Preamble indices and indication of RACH occasions with the associated SSB indices are configured for each candidate cell.

Agreement

The PDCCH order from the source cell contains the indication of candidate cell.

- The reserved bit(s) in DCI format 1_0 for PDCCH order can be used for indication of cell identity In 3GPP spec 38.300 running CR for introduction of NR further mobility enhancements ([4] R2-2213332 38.300 running CR for introduction of NR further mobility enhancements), L1/L2-triggered mobility (LTM) is introduced.

9.2.3.x L1/L2-Triggered Mobility 9.2.3.x.1 General

LTM is a procedure in which a gNB receives L1 measurement reports from UEs, and on their basis the gNB changes UEs' serving cell(s) through MAC CE. The gNB prepares one or multiple candidate cells and provides the candidate cell configurations to the UE through RRC message. Then LTM cell switch is triggered, by selecting one of the candidate configurations as target configuration for LTM by the gNB. The candidate cell configurations can only be added, modified and released by network via RRC signaling.

Editors' note: FFS later whether some optimization should be applied e.g. for release.

Editor's note: Current options to configure a LTM candidate cell:

a. One RRCReconfiguration message for candidate target cell b. One CellGroupConfig IE for each candidate target cell The following principles apply to LTM:

Candidate cell configuration can be provided as delta configurations on top of a reference configuration. The reference configuration is managed separately, and a UE stores the reference configuration as a separate configuration.

User plane is continued whenever possible (e.g. intra-DU), without reset, with the target to avoid data loss and the additional delay of data recovery.

Security is not updated in LTM.

Subsequent LTM between candidates (i.e., UE does not release other candidate cell configurations after LTM is triggered) can be performed without RRC reconfiguration.

LTM supports both intra-gNB-DU and intra-gNB-CU inter-gNB-DU mobility. LTM also supports inter-frequency mobility, including mobility to inter-frequency cell that is not a current serving cell. The following scenarios are supported:

PCell change in non-CA scenario,

PCell change without SCell change in CA scenario,

PCell change with SCell change(s) in CA scenario, including the following cases:

a) The target PCell/target SCell(s) is not a current serving cell (CA-to-CA scenario with PCell change)

b) The target PCell is a current SCell c) The target SCell is the current PCell.

Dual connectivity scenario, at least for the PSCell change without MN involvement case, i.e. intra-SN.

Inter-cell beam management is also supported, but is not considered as a prerequisite for using LTM.

In [5] 3GPP TS 38.331 V17.3.0 (2022-12) 3rd Generation Partnership Project, related information elements are quoted below.

CondReconfigToAddModList

The IE CondReconfigToAddModList concerns a list of conditional reconfigurations to add or modify, with for each entry the condReconfigId and the associated condExecutionCond/condExecutionCondSCG and condRRCReconfig.

CondReconfigToAddModList information element

```
-- ASN1START
-- TAG-CONDRECONFIGTOADDMODLIST-START
CondReconfigToAddModList-r16 ::=   SEQUENCE (SIZE (1.. maxNrofCondCells-r16)) OF CondReconfigToAddMod-
r16
CondReconfigToAddMod-r16 ::=       SEQUENCE {
      condReconfigId-r16                  CondReconfigId-r16,
      condExecutionCond-r16               SEQUENCE (SIZE (1..2)) OF MeasId                 OPTIONAL,
-- Need M
      condRRCReconfig-r16                 OCTET STRING (CONTAINING RRCReconfiguration)     OPTIONAL,
-- Cond condReconfigAdd
      ...,
      [[
      condExecutionCondSCG-r17            OCTET STRING (CONTAINING CondReconfigExecCondSCG-r17)  OPTIONAL
-- Need M
      ]]
}
CondReconfigExecCondSCG-r17 ::=   SEQUENCE (SIZE (1..2)) OF MeasId
-- TAG-CONDRECONFIGTOADDMODLIST-STOP
-- ASN1STOP
```

CondReconfigToAddMod Field Descriptions condExecutionCond

The execution condition that needs to be fulfiled in order to trigger the execution of a conditional reconfiguration for CHO, CPA, intra-SN CPC without MN involvement or MN initiated inter-SN CPC. When configuring 2 triggering events (Meas Ids) for a candidate cell, the network ensures that both refer to the same measObject. For CHO, if the network configures condEventD1 or condEventT1 for a candidate cell, the network configures a second triggering event condEventA3, condEventA4 or condEventA5 for the same candidate cell. The network does not configure both condEventD1 and condEventT1 for the same candidate cell. For CHO in terrestrial networks, the network does not indicate a MeasIdassociated with condEventA4. For CPA and for MN-initiated inter-SN CPC, the network only indicates MeasId(s) associated with condEventA4. For intra-SN CPC, the network only indicates MeasId(s) associated with condEventA3 or condEventA5.

condExecutionCondSMG

Contains execution condition that needs to be fulfilled in order to trigger the execution of a conditional reconfiguration for SN initiated inter-SN CPC. The Meas Ids refer to the measConfig associated with the SCG. When configuring 2 triggering events (Meas Ids) for a candidate cell, network ensures that both refer to the same measObject. For each condReconigId, the network always configures either condExecudonCond or condExecutionCondSCG (not both). The network only indicates MeasId(s) associated with condEventA3 or condEventA5.

condRRCReconfig

The RRCReconfiguration message to be applied when the condition(s) are fulfiled. The RRCReconfiguration message contained in condRRCReconfig cannot contain the field conditional Reconfiguration or the field daps-Config.

CSI-MeasConfig

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. See also TS 38.214 [19], clause 5.2.

| CSI-MeasConfig field descriptions |
| --- |
| aperiodicTriggerStateList<br>Contains trigger states for dynamically selecting one or more aperiodic and semi-persistent reporting configurations and/or triggering one or more aperiodic CSI-RS resource sets for channel and/or interference measurement (see TS 38.214 [19], clause 5.2.1). |
| csi-IM-ResourceSetToAddModList<br>Pool of CSI-IM-ResourceSet which can be referred to from CSI-ResourceConfig or from MAC CEs. |
| csi-IM-ResourceToAddModList<br>Pool of CSI-IM-Resource which can be referred to from CSI-IM-ResourceSet. |
| csi-ReportConfigToAddModList<br>Configured CSI report settings as specified in TS 38.214 [19] clause 5.2.1.1. |
| csi-ResourceConfigToAddModList<br>Configured CSI resource settings as specified in TS 38.214 [19] clause 5.2.1.2. |

CSI-MeasConfig information element

```
-- ASN1START
-- TAG-CSI-MEASCONFIG-START
CSI-MeasConfig ::=                    SEQUENCE {
    nzp-CSI-RS-ResourceToAddModList        SEQUENCE (SIZE (1..maxNrofNZP-CSI-RS-Resources)) OF NZP-CSI-
RS-Resource      OPTIONAL, -- Need N
    nzp-CSI-RS-ResourceToReleaseList       SEQUENCE (SIZE (1..maxNrofNZP-CSI-RS-Resources)) OF NZP-CSI-
RS-ResourceId    OPTIONAL, -- Need N
    nzp-CSI-RS-ResourceSetToAddModList     SEQUENCE (SIZE (1..maxNrofNZP-CSI-RS-ResourceSets)) OF NZP-
CSI-RS-ResourceSet
OPTIONAL, -- Need N
    nzp-CSI-RS-ResourceSetToReleaseList    SEQUENCE (SIZE (1..maxNrofNZP-CSI-RS-ResourceSets)) OF NZP-
CSI-RS-ResourceSetId
OPTIONAL, -- Need N
    csi-IM-ResourceToAddModList            SEQUENCE (SIZE (1..maxNrofCSI-IM-Resources)) OF CSI-IM-
Resource               OPTIONAL, -- Need N
    csi-IM-ResourceToReleaseList           SEQUENCE (SIZE (1..maxNrofCSI-IM-Resources)) OF CSI-IM-
ResourceId             OPTIONAL, -- Need N
    csi-IM-ResourceSetToAddModList         SEQUENCE (SIZE (1..maxNrofCSI-IM-ResourceSets)) OF CSI-IM-
ResourceSet        OPTIONAL, -- Need N
    csi-IM-ResourceSetToReleaseList        SEQUENCE (SIZE (1..maxNrofCSI-IM-ResourceSets)) OF CSI-IM-
ResourceSetId      OPTIONAL, -- Need N
    csi-SSB-ResourceSetToAddModList        SEQUENCE (SIZE (1..maxNrofCSI-SSB-ResourceSets)) OF CSI-SSB-
ResourceSet     OPTIONAL, -- Need N
    csi-SSB-ResourceSetToReleaseList       SEQUENCE (SIZE (1..maxNrofCSI-SSB-ResourceSets)) OF CSI-SSB-
ResourceSetId   OPTIONAL, -- Need N
    csi-ResourceConfigToAddModList         SEQUENCE (SIZE (1..maxNrofCSI-ResourceConfigurations)) OF
CSI-ResourceConfig
OPTIONAL, -- Need N
    csi-ResourceConfigToReleaseList        SEQUENCE (SIZE (1..maxNrofCSI-ResourceConfigurations)) OF
CSI-ResourceConfigId
OPTIONAL, -- Need N
    csi-ReportConfigToAddModList           SEQUENCE (SIZE (1..maxNrofCSI-ReportConfigurations)) OF CSI-
ReportConfig    OPTIONAL, -- Need N
    csi-ReportConfigToReleaseList          SEQUENCE (SIZE (1..maxNrofCSI-ReportConfigurations)) OF CSI-
ReportConfigId
OPTIONAL, -- Need N
    reportTriggerSize                      INTEGER (0..6)
OPTIONAL, -- Need M
    aperiodicTriggerStateList              SetupRelease { CSI-AperiodicTriggerStateList }
OPTIONAL, -- Need M
    semiPersistentOnPUSCH-TriggerStateList         SetupRelease { CSI-SemiPersistentOnPUSCH-
TriggerStateList }               OPTIONAL, -- Need M
    ...,
    [[
    reportTriggerSizeDCI-0-2-r16           INTEGER (0..6)
OPTIONAL -- Need R
    ]],
    [[
    ]]
}
-- TAG-CSI-MEASCONFIG-STOP
-- ASN1STOP
```

-continued

| CSI-MeasConfig field descriptions |
| --- |
| csi-SSB-ResourceSetToAddModList<br>Pool of CSI-SSB-ResourceSet which can be referred to from CSI-ResourceConfig.<br>nzp-CSI-RS-ResourceSetToAddModList<br>Pool of NZP-CSI-RS-ResourceSet which can be referred to from CSI-ResourceConfig or from MAC CEs.<br>nzp-CSI-RS-ResourceToAddModList<br>Pool of NZP-CSI-RS-Resource which can be referred to from NZP-CSI-RS-ResourceSet.<br>reportTriggerSize, reportTriggerSizeDCI-0-2<br>Size of CSI request field in DCI (bits) (see TS 38.214 [19], clause 5.2.1.5.1). The field reportTriggerSize applies to DCI format 0_1 and the field reportTriggerSizeDCI-0-2 applies to DCI format 0_2 (see TS 38.214 [19], clause 5.2.1.5.1). |

CSI-ResourceConfig

The IE CSI-ResourceConfig defines a group of one or more NZP-CSI-RS-ResourceSet, CSI-IM-ResourceSet and/or CSI-SSB-ResourceSet.

-continued

| CSI-ResourceConfig field descriptions |
| --- |
| CSI-ResourceConfig as resourceForChannelMeasurement, the network configures 2 resource sets, which may be two NZP CSI-RS resource sets, two CSI SSB resource sets or one NZP CSI-RS resource set and one CSI-SSB resource set (see TS 38.214 [19], clause 5.2.1.2 and 5.2.1.4.2). In this case, in TS 38.212 [17] Table 6.3.1.1.2-8B:<br>if the list has one CSI-SSB resource set, this resource set is indicated by a resource set indicator set to 1, while the resource set indicator of the NZP CSI-RS resource set is 0;<br>if the list has two CSI-SSB resource sets, the first resource set is indicated by a resource set indicator set to 0 and the second resource set by a resource set indicator set to 1.<br>nzp-CSI-RS-ResourceSetList<br>List of references to NZP CSI-RS resources used for beam measurement and reporting in a CSI-RS resource set. If resource Type is set to 'aperiodic', the network configures up to maxNrofNZP-CSI-RS-ResourceSetsPerConfig resource sets. If resource Type is is set to 'periodic' or 'semiPersistent' and groupBasedBeamReporting-v1710 is not configured in IE CSI- |

CSI-ResourceConfig information element

```
-- ASN1START
-- TAG-CSI-RESOURCECONFIG-START
CSI-ResourceConfig ::=              SEQUENCE {
    csi-ResourceConfigId                CSI-ResourceConfigId,
    csi-RS-ResourceSetList              CHOICE {
        nzp-CSI-RS-SSB                      SEQUENCE {
            nzp-CSI-RS-ResourceSetList          SEQUENCE (SIZE (1..maxNrofNZP-CSI-RS-ResourceSetsPerConfig))
OF NZP-CSI-RS-ResourceSetId
OPTIONAL, -- Need R                         SEQUENCE (SIZE (1..maxNrofCSI-SSB-ResourceSetsPerConfig)) OF
            csi-SSB-ResourceSetList
CSI-SSB-ResourceSet Id OPTIONAL   -- Need R
        },
        csi-IM-ResourceSetList              SEQUENCE (SIZE (1..maxNrofCSI-IM-ResourceSetsPerConfig)) OF CSI-
IM-ResourceSetId
    },
    bwp-Id                              BWP-Id,
    resourceType                        ENUMERATED { aperiodic, semiPersistent, periodic },
    ...,
    [[
    csi-SSB-ResourceSetListExt-r17              CSI-SSB-ResourceSetId
OPTIONAL   -- Need R
    ]]
}
-- TAG-CSI-RESOURCECONFIG-STOP
-- ASN1STOP
```

| CSI-ResourceConfig field descriptions |
| --- |
| bwp-Id<br>The DL BWP which the CSI-RS associated with this CSI-ResourceConfig are located in (see TS 38.214 [19], clause 5.2.1.2.<br>csi-IM-ResourceSetList<br>List of references to CSI-IM resources used for CSI measurement and reporting in a CSI-RS resource set. Contains up to maxNrofCSI-IM-ResourceSetsPerConfig resource sets if resource Type is 'aperiodic' and 1 otherwise (see TS 38.214 [19], clause 5.2.1.2).<br>csi-ResourceConfigId<br>Used in CSI-ReportConfig to refer to an instance of CSI-ResourceConfig.<br>csi-SSB-ResourceSetList, csi-SSB-ResourceSetListExt<br>List of references to SSB resources used for CSI measurement and reporting in a CSI-RS resource set (see TS 38.214 [19], clause 5.2.1.2). The csi-SSB-ResourceSetListExt provides additional references and can only be configured if csi-SSB-ResourceSetList is configured and groupBasedBeamReporting-v1710 is configured in the CSI-ReportConfig that indicates this CSI-ResourceConfig as resourcesForChannelMeasurement. If groupBasedBeamReporting-v1710 isconfigured in the IE CSI-ReportConfig that indicates this |

-continued

| CSI-ResourceConfig field descriptions |
| --- |
| ReportConfig, the network configures 1 resource set. If resource Type is set to 'periodic' or 'semiPersistent' and groupBasedBeamReporting-v1710 is configured, the network configures 2 resource sets, which may be two NZP CSI-RS resource sets, two CSI SSB resource sets or one NZP CSI-RS resource set and one CSI-SSB resource set (see TS 38.214 [19], clause 5.2.1.2 and 5.2.1.4.2). In this case, in TS 38.212 [17] Table 6.3.1.1.2-8B, the following applies:<br>if the list has one NZP CSI-RS resource set, this resource set is indicated by a resource set indicator set to 0;<br>if the list has two NZP CSI-RS resource sets, the first resource set is indicated by a resource set indicator set to 0 and the second resource set by a resource set indicator set to 1.<br>resourceType<br>Time domain behavior of resource configuration (see TS 38.214 [19], clause 5.2.1.2). It does not apply to resources provided in the csi-SSB-ResourceSetList. |

CSI-RS-ResourceConfigMobility

The IE CSI-RS-ResourceConfigMobility is used to configure CSI-RS based RRM measurements.

CSI-SSB-ResourceSet

The IE CSI-SSB-ResourceSet is used to configure one SS/PBCH block resource set which refers to SS/PBCH as indicated in ServingCellConfigCommon and ServingCellConfig.

CSI-SSB-ResourceSet information element

```
-- ASN1START
-- TAG-CSI-SSB-RESOURCESET-START
CSI-SSB-ResourceSet ::=                SEQUENCE {
      csi-SSB-ResourceSetId                  CSI-SSB-ResourceSetId,
      csi-SSB-ResourceList                   SEQUENCE (SIZE (1..maxNrofCSI-SSB-ResourcePerSet)) OF SSB-
Index,
      ...,
      [[
      servingAdditionalPCIList-r17           SEQUENCE (SIZE (1..maxNrofCSI-SSB-ResourcePerSet)) OF
ServingAdditionalPCIIndex-r17   OPTIONAL   -- Need R
      ]]
}
ServingAdditionalPCIIndex-r17   =::=   INTEGER (0..maxNrofAdditionalPCI-r17)
-- TAG-CSI-SSB-RESOURCESET-STOP
-- ASN1STOP
```

| CSI-SSB-ResourceSet field descriptions |
| --- |
| servingAdditionalPCIList<br>Indicates the physical cell IDs (PCI) of the SSBs in the csi-SSB-ResourceList. If present, the list has the same number of entries as csi-SSB-ResourceList. The first entry of the list indicates the value of the PCI for the first entry of csi-SSB-ResourceList, the second entry of this list indicates the value of the PCI for the second entry of csi-SSB-ResourceList, and so on. For each entry, the following applies:<br>If the value is zero, the PCI is the PCI of the serving cell in which this CSI-SSB-ResourceSet is defined;<br>otherwise, the value is additionalPCIIndex-r17 of an SSB-MTC-AdditionalPCI-r17 configured using the additionalPCI-ToAddModList-r17 in ServingCellConfig, and the PCI is the additionalPCI-r17 in this SSB-MTC-AdditionalPCI-r17. |

NZP-CSI-RS-Resource

The IE NZP-CSI-RS-Resource is used to configure Non-Zero-Power (NZP) CSI-RS transmitted in the cell where the IE is included, which the UE may be configured to measure on (see TS 38.214 [19], clause 5.2.2.3.1). A change of configuration between periodic, semi-persistent or aperiodic for an NZP-CSI-RS-Resource is not supported without a release and add.

NZP-CSI-RS-Resource information element

```
-- ASN1START
-- TAG-NZP-CSI-RS-RESOURCE-START
NZP-CSI-RS-Resource ::=              SEQUENCE {
      nzp-CSI-RS-ResourceId                NZP-CSI-RS-ResourceId,
      resourceMapping                      CSI-RS-ResourceMapping,
      powerControlOffset                   INTEGER (-8..15),
      powerControlOffsetSS                 ENUMERATED {db-3, db0, db3, db6}   OPTIONAL, -
- Need R
      scramblingID                         ScramblingId,
      periodicityAndOffset                 CSI-ResourcePeriodicityAndOffset   OPTIONAL, -
- Cond PeriodicOrSemiPersistent
      qcl-InfoPeriodicCSI-RS               TCI-StateId                        OPTIONAL, -
- Cond Periodic
      ...
```

-continued

| NZP-CSI-RS-Resource information element |
|---|

```
}
-- TAG-NZP-CSI-RS-RESOURCE-STOP
-- ASN1STOP
```

| NZP-CSI-RS-Resource field descriptions |
|---|
| periodicityAndOffset<br>Periodicity and slot offset sl1 corresponds to a periodicity of 1 slot, sl2 to a periodicity of two slots, and so on. The corresponding offset is also given in number of slots (see TS 38.214 [19], clause 5.2.2.3.1). Network always configures the UE with a value for this field for periodic and semi-persistent NZP-CSI-RS-Resource (as indicated in CSI-ResourceConfig).<br>powerControlOffset<br>Power offset of PDSCH RE to NZP CSI-RS RE. Value in dB (see TS 38.214 [19], clauses 5.2.2.3.1 and 4.1).<br>powerControlOffsetSS<br>Power offset of NZP CSI-RS RE to SSS RE. Value in dB (see TS 38.214 [19], clause 5.2.2.3.1).<br>qcl-InfoPeriodicCSI-RS<br>For a target periodic CSI-RS, contains a reference to one TCI-State in TCI-States for providing the QCL source and QCL type. For periodic CSI-RS, the source can be SSB or another periodic-CSI-RS. |

-continued

| NZP-CSI-RS-Resource field descriptions |
|---|
| Refers to the TCI-State or di-OrJoint-TCI-State which has this value for tci-StateId and is defined in tci-StatesToAddModList or in dl-OrJointTCI-StateToAddModList in the PDSCH-Config included in the BWP-Downlink corresponding to the serving cell and to the DL BWP to which the resource belongs to (see TS 38.214 [19], clause 5.2.2.3.1).<br>resourceMapping<br>OFDM symbol location(s) in a slot and subcarrier occupancy in a PRB of the CSI-RS resource.<br>scramblingID<br>Scrambling ID (see TS 38.214 [19], clause 5.2.2.3.1). |

NZP-CSI-RS-ResourceSet

The IE NZP-CSI-RS-ResourceSet is a set of Non-Zero-Power (NZP) CSI-RS resources (their IDs) and set-specific parameters.

| NZP-CSI-RS-ResourceSet information element |
|---|

```
-- ASN1START
-- TAG-NZP-CSI-RS-RESOURCESET-START
NZP-CSI-RS-ResourceSet ::=              SEQUENCE {
    nzp-CSI-ResourceSetId                   NZP-CSI-RS-ResourceSetId,
    nzp-CSI-RS-Resources                    SEQUENCE (SIZE (1..maxNrofNZP-CSI-RS-ResourcesPerSet)) OF
NZP-CSI-RS-ResourceId,
    repetition                              ENUMERATED { on, off }
OPTIONAL, -- Need S
    aperiodicTriggeringOffset               INTEGER (0..6)
OPTIONAL, -- Need S
    trs-Info                                ENUMERATED {true}
OPTIONAL, -- Need R
    ...,
    [[
    aperiodicTriggeringOffset-r16           INTEGER (0..31)
OPTIONAL -- Need S
    ]],
    [[
    pdc-Info-r17                            ENUMERATED {true}
OPTIONAL, -- Need R
    cmrGroupingAndPairing-r17               CMRGroupingAndPairing-r17
OPTIONAL, -- Need R
    aperiodicTriggeringOffset-r17           INTEGER (0..124)
OPTIONAL, -- Need S
    aperiodicTriggeringOffsetL2-r17         INTEGER (0..31)
OPTIONAL -- Need R
    ]]
}
CMRGroupingAndPairing-r17 ::=           SEQUENCE {
    nrofResourcesGroup1-r17                 INTEGER (1..7),
    pair1OfNZP-CSI-RS-r17                   NZP-CSI-RS-Pairing-r17
OPTIONAL, -- Need R
    pair2OfNZP-CSI-RS-r17                   NZP-CSI-RS-Pairing-r17
OPTIONAL -- Need R
}
NZP-CSI-RS-Pairing-r17 ::=              SEQUENCE {
    nzp-CSI-RS-ResourceId1-r17              INTEGER (1..7),
    nzp-CSI-RS-ResourceId2-r17              INTEGER (1..7)
}
-- TAG-NZP-CSI-RS-RESOURCESET-STOP
-- ASN1STOP
```

| NZP-CSI-RS-ResourceSet field descriptions |
|---|
| aperiodic TriggeringOffset, aperiodicTriggeringOffset-r16, aperiodicTriggeringOffset-r17<br>Offset X between the slot containing the DCI that triggers a set of aperiodic NZP CSI-RS resources and the slot in which the CSI-RS resource set is transmitted. For aperiodic TriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodic TriggeringOffset-r16 and aperiodicTriggeringOffset-r17, the value indicates the number of slots. aperiodicTriggeringOffset-r17 is applicable to SCS 480 kHz and 960 kHz, and only the values of integer multiples of 4 are valid, i.e. 0, 4, 8, and so on. The network configures only one of the fields. When neither field is included, the UE applies the value 0. |
| aperiodicTriggeringOffsetL2<br>Indicates triggering offset of aperiodic NZP CSI-RS resources used for fast activation of the SCell (see clause 5.2.1.5.3 of TS 38.214 [19]), when the NZP CSI-RS resources are activated by the MAC CE (see clause 5.9 of TS 38.321 [3]). The value indicates the number of slots. |
| cmrGroupingAndPairing<br>Configures CMR groups and pairs. The first nrofResourcesGroup1 resources in the NZP-CSI-RS resource set belong to Group 1 and the remaining resources in the NZP-CSI-RS resource set belong to Group 2. nrofResourcesGroup1 is $K_1$ and the number of remaining resources in the NZP-CSI-RS resource set belonging to Group 2 is $K_2$ as specified in TS 38.214 clause 5.2.1.4.1. Maximum total number in Group 1 and Group 2 is 8 (see TS 38.214 [19], clauses 5.2.1.4.1 and 5.2.1.4.2). |
| pair1OfNZP-CSI-RS, pair2OfNZP-CSI-RS<br>A pair of NZP CSI-RS resources. In one pair, one resource shall belong to group 1 and the other resource shall belong to group 2 as configured by nrofResourcesGroup1 and nrofResourcesGroup2. (see TS 38.214 [19], clause xx). |

-continued

| NZP-CSI-RS-ResourceSet field descriptions |
|---|
| nzp-CSI-RS-Resources<br>NZP-CSI-RS-Resources associated with this NZP-CSI-RS resource set (see TS 38.214 [19], clause 5.2). For CSI, there are at most 8 NZP CSI RS resources per resource set. |
| nzp-CSI-RS-ResourceId1, nzp-CSI-RS-ResourceId2<br>The nzp-CSI-RS-ResourceId1-r17 represents the index of the NZP CSI-RS resource in Resource Group 1, and nzp-CSI-RS-ResourceId2-r17 represents the index of the NZP CSI-RS resource in Resource Group 2. |
| pdc-Info<br>Indicates that this NZP-CSI-RS-ResourceSet, if configured also with trs-Info, is used for propagation delay compensation. The field can be present only if trs-info is present. The field can be present in only one NZP-CSI-RS-ResourceSet. If network configures this field for an NZP-CSI-RS-ResourceSet, the UE dimeasures the UE Rx-Tx time fference based on resources configured in this resource set. |
| repetition<br>Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP, L1 SINR or "no report". |
| trs-Info<br>Indicates that the antenna port for all NZP-CSI-RS resources in the CSI-RS resource set is same. If the field is absent or released the UE applies the value false (see TS 38.214 [19], clause 5.2.2.3.1). |

TCI-State

The IE TCI-State associates one or two DL reference signals with a corresponding quasi-colocation (QCL) type.

TCI-State information element

```
-- ASN1START
-- TAG-TCI-STATE-START
TCI-State ::=                 SEQUENCE {
    tci-StateId                   TCI-StateId,
    qcl-Type1                     QCL-Info,
    qcl-Type2                     QCL-Info
OPTIONAL,   -- Need R
    ...,
    [[
    additionalPCI-r17             AdditionalPCIIndex-r17
OPTIONAL,   -- Need R
    pathlossReferenceRS-Id-r17    PathlossReferenceRS-Id-r17
OPTIONAL,   -- Cond JointTCI1
    ul-powerControl-r17           Uplink-powerControlId-r17
OPTIONAL    -- Cond JointTCI
    ]]
}
QCL-Info ::=                  SEQUENCE {
    cell                          ServCellIndex
OPTIONAL,   -- Need R
    bwp-Id                        BWP-Id
OPTIONAL, -- Cond CSI-RS-Indicated
    referenceSignal               CHOICE {
        csi-rs                        NZP-CSI-RS-ResourceId,
        ssb                           SSB-Index
    },
    qcl-Type                      ENUMERATED {typeA, typeB, typeC, typeD},
    ...
}
-- TAG-TCI-STATE-STOP
-- ASN1STOP
```

| QCL-Info field descriptions |
|---|
| bwp-Id<br>The DL BWP which the RS is located in.<br>cell<br>The UE's serving cell in which the referenceSignal is configured. If the field is absent, it applies to the serving cell in which the TCI-State is applied by the UE. The RS can be located on a serving cell other than the serving cell for which the TCI-State is applied by the UE only if the qcl-Type is configured as typeC or typeD. See TS 38.214 [19] clause 5.1.5.<br>referenceSignal<br>Reference signal with which quasi-collocation information is provided as specified in TS 38.214 [19] clause 5.1.5.<br>qcl-Type<br>QCL type as specified in TS 38.214 [19] clause 5.1.5. |

| TCI-State field descriptions |
|---|
| additionalPCI<br>Indicates the physical cell IDs (PCI) of the SSBs when referenceSignal is configured as SSB for both QCL-Type1 and QCL-Type2. In case the cell is present, the additionalPCI refers to a PCI value configured in the list configured using additionalPCI-ToAddModList in the serving cell indicated by the field cell. Otherwise, it refers to a PCI value configured in a list additionalPCI-ToAddModList configured in the serving cell where the TCI-State is applied by the UE. When this field is present the cell for qcl-Type1 and qcl-Type2 is configured with same value, if present.<br>pathlossReferenceRS-Id<br>The ID of the reference signal (e.g. a CSI-RS or an SS block) used for PUSCH, PUCCH and SRS path loss estimation.<br>qcl-Type1, qcl-Type2<br>QCL information for the TCI state as specified in TS 38.214 [19] clause 5.1.5.<br>tci-StateId<br>ID number of the TCI state.<br>ul-PowerControl<br>Configures power control parameters for PUCCH, PUSCH and SRS for this TCI state. The field is present here only if ul-powerControl is not configured in any BWP-Uplink-Dedicated of this serving cell. |

In [6] 3GPP TS 38.214 V17.3.0 (2022-09) 3rd Generation Partnership Project, TCI state related paragraph is quoted below.

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

- 'typeA': {Doppler shift, Doppler spread, average delay, delay spread}
- 'typeB': {Doppler shift, Doppler spread}
- 'typeC': {Doppler shift, average delay}
- 'typeD': {Spatial Rx parameter}

The UE can be configured with a list of up to 128 TCIState configurations, within the higher layer parameter dl-OrJoint-TCIStateList in PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the TCIState or UL-TCIState configurations are absent in a BWP of the CC, the UE can apply the TCIState or UL-TCIState configurations from a reference BWP of a reference CC. The UE is not expected to be configured with TCI-State, SpatialRelationInfo or PUCCH-SpatialRelationInfo, except SpatialRelationInfoPos in a CC in a band, if the UE is configured with dl-OrJoint-TCIStateList or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with dl-OrJoint-TCIStateList or UL-TCIState in any CC within the same band in the CC list.

The UE receives an activation command, as described in clause 6.1.3.14 of [10, TS 38.321] or 6.1.3.47 of [10, TS 38.321], used to map up to 8 TCI states and/or pairs of TCI states, with one TCI state for DL channels/signals and/or one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs. If the activation command maps TCIState and/or UL-TCIState to only one TCI codepoint, the UE shall apply the indicated TCIState and/or UL-TCIState to one or to a set of CCs/DL BWPs, and if applicable, to one or to a set of CCs/UL BWPs once the indicated mapping for the one single TCI codepoint is applied as described in [11, TS 38.133].

When the bwp-id or cell for QCL-TypeA/D source RS in a QCL-Info of the TCI state is not configured, the UE assumes that QCL-TypeA/D source RS is configured in the CC/DL BWP where TCI state applies.

When tci-PresentInDCI is set as 'enabled' or tci-PresentDCI-1-2 is configured for the CORESET, a UE configured with dl-OrJoint-TCIStateList with activated TCIState or UL-TCIState receives DCI format 1_1/1_2 providing indicated TCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/ is without DL assignment, the UE can assume the following:

- CS-RNTI is used to scramble the CRC for the DCI
- The values of the following DCI fields are set as follows:
  - RV=all '1's
  - MCS=all '1's
  - NDI=0
  - Set to all '0's for FDRA Type 0, or all '1's for FDRA Type 1, or all '0's for dynamicSwitch (same as in Table 10.2-4 of [6, TS 38.213]).

After a UE receives an initial higher layer configuration of dl-OrJoint-TCIStateList with more than one TCIState and before application of an indicated TCJ state from the configured TCJ states:

The UE assumes that DM-RS of PDSCH and DM-RS of PDCCH and the CSI-RS applying the indicated TCJ state are quasi co-located with the SS/PBCH block the UE identified during the initial access procedure After a UE receives an initial higher layer configuration of dl-OrJoint-TCIStateList with more than one TCIState or more than one UL-TCIState and before application of an indicated TCJ state from the configured TCJ states:

The UE assumes that the UL TX spatial filter, if applicable, for dynamic-grant and configured-grant based PUSCH and PUCCH, and for SRS applying the indicated TCJ state, is the same as that for a PUSCH transmission scheduled by a RAR UL grant during the initial access procedure After a UE receives a higher layer configuration of dl-OrJoint-TCIStateList with more than one TCIState as part of a Reconfiguration with sync procedure as described in [12, TS 38.331] and before applying an indicated TCJ state from the configured TCJ states:

The UE assumes that DM-RS of PDSCH and DM-RS of PDCCH, and the CSI-RS applying the indicated TCJ state are quasi co-located with the SS/PBCH block or the CSI-RS resource the UE identified during the random access procedure initiated by the Reconfiguration with sync procedure as described in [12, TS 38.331].

After a UE receives a higher layer configuration of dl-OrJoint-TCIStateList with more than one TCIState or more than one UL-TCIState as part of a Reconfiguration with sync procedure as described in [12, TS 38.331] and before applying an indicated TCJ state from the configured TCJ states:

The UE assumes that the UL TX spatial filter, if applicable, for dynamic-grant and configured-grant based PUSCH and PUCCH, and for SRS applying the indicated TCJ state, is the same as that for a PUSCH transmission scheduled by a RAR UL grant during random access procedure initiated by the Reconfiguration with sync procedure as described in [12, TS 38.331].

If a UE receives a higher layer configuration of dl-OrJoint-TCIStateList with a single TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of dl-OrJoint-TCIStateList with a single TCIState or a single UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit a PUCCH with HARQ-ACK information or a PUSCH with HARQ-ACK information corresponding to the DCI carrying the TCI State indication and without DL assignment, or corresponding to the PDSCH scheduled by the DCI carrying the TCI State indication, and if the indicated TCI State is different from the previously indicated one, the indicated DLorJointTCIState or UL-TCIstate should be applied starting from the first slot that is at least beamAppTime symbols after the last symbol of the PUCCH or the PUSCH. The first slot and the beamAppTime symbols are both determined on the active BWP with the smallest SCS among the active BWP(s) of the carrier(s) applying the beam indication.

If a UE is configured with pdsch-TimeDomainAllocationListForMultiPDSCH-r17 in which one or more rows contain multiple SLIVs for PDSCH on a DL BWP of a serving cell, and the UE is receiving a DCI carrying the TCI-State indication and without DL assignment, the UE does not expect that the number of indicated SLIVs in the row of the pdsch-TimeDomainAllocationListForMultiPDSCH-r17 by the DCI is more than one.

If the UE is configured with SSB-MTC-AddtionalPCI and with PDCCH-Config that contains two different values of coresetPoolIndex in ControlResourceSet, the UE receives an activation command for CORESET associated with each coresetPoolIndex, as described in clause 6.1.3.14 of [10, TS 38.321], used to map up to 8 Tel states to the codepoints of the DCI field 'Transmission Configuration Indication' in one CC/DL BWP. When a set of TCI state IDs are activated for a coresetPoolIndex, the activated TCI states corresponding to one coresetPoolIndex is associated with the serving cell physical cell ID and activated TCI states corresponding to another coresetPoolIndex can be associated with another physical cell ID.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{sub\,frame,\mu} + \frac{2^{\mu}}{2^{\mu_{K_{mac}}}} \cdot k_{mac}$$

where μ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

5.1.6.1.2 CSI-RS for L1-RSRP and L1-SINR Computation

If a UE is configured with a NZP-CSI-RS-ResourceSet configured with the higher layer parameter repetition set to 'on', the UE may assume that the CSI-RS resources, described in Clause 5.2.2.3.1, within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

5.2.1.4.3 L1-RSRP Reporting

For L1-RSRP Computation

- the UE may be configured with CSI-RS resources, SS/PBCH Block resources or both CSI-RS and SS/PBCH block resources, when resource-wise quasi co-located with 'type C' and 'typeD' when applicable.
- the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

When the higher layer parameter groupBasedBeamReporting-r17 in CSI-ReportConfig is configured, the UE shall indicate the CSI Resource Set associated with the largest measured value of L1-RSRP, and for each group, CRI or SSBRI of the indicated CSI Resource Set is present first.

If the higher layer parameter timeRestrictionForChannelMeasurements in CSI-ReportConfig is set to "notConfigured", the UE shall derive the channel measurements for computing L1-RSRP value reported in uplink slot n based on only the SS/PBCH or NZP CSI-RS, no later than the CSI reference resource, (defined in TS 38.211[4]) associated with the CSI resource setting.

If the higher layer parameter timeRestrictionForChannelMeasurements in CSI-ReportConfig is set to "Configured", the UE shall derive the channel measurements for computing L1-RSRP reported in uplink slot n based on only the most recent, no later than the CSI reference resource, occasion of SS/PBCH or NZP CSI-RS (defined in [4, TS 38.211]) associated with the CSI resource setting.

When the UE is configured with SSB-MTC-AddtionalPCI, a CSI-SSB-ResourceSet configured for L1-RSRP reporting includes one set of SSB indices and one set of PCI indices, where each SSB index is associated with a PCI index. When the UE is configured with a CSI-ReportConfig with the higher layer parameter reportQuantity set to 'cri-RSRP-Capability[Set]Index' or 'ssb-Index-RSRP-Capability[Set]Index' an index of UE capability value set, indicating the maximum supported number of SRS antenna ports, is reported along with the pair of SSBRI/CRI and L1-RSRP.

In [7] Chair's notes RAN1 #112b-e eom3, the following is provided.

Agreement

- Adopt Alt.2 for beam indication of target cell(s) and TCI state activation for candidate cell(s) (if supported),
  - Alt. 1: By indicating RS identifier, i.e. mapping between RS identifier and Rel-17 unified TCI state is done by a UE
  - Alt. 2: By indicating Rel-17 TCI state index Agreement From RAN1 point of view, at least the following information can be included in the cell switch command, which is conveyed by MAC CE

- Information to identify the target cell(s)
- The details including bit number are designed by RAN2
- TA related information (details up to the discussion in A.I. 9.10.2)
- 1 joint or 1 pair of UL and DL unified TCI State index for the target Cell
- Note: discussion on target SpCell is not precluded Agreement For the beam selection for SSB based L1-RSRP measurement report,

- Beam selection is performed across the L cells from configured (or activated, if introduced) cells, i.e. M beams for each of the L cells
  - FFS: How to select the L cells and M beams per cells is up to UE
- M×L beams are reported in a single report instance
  - Max values of M and L are based on UE capability, and at least M×L=4 is supported as a UE capability, other UE capabilities are FFS
    - FFS if UE is allowed to report less than M×L beams
  - The values of M and L are configured to the UE in the reporting configuration
- FFS: The following configurability is introduced in the report configuration
  - 1) Whether serving cell is always selected in the L cell selection performed by the UE, and applicable when a UE is configured with L>=2
  - 2) at least one of the inter-frequency cells is always selected in the L cell selection performed by the UE, and applicable when a UE is configured with L>=2 and at least one cell in inter-frequency Agreement For the Rel-17 unified TCJ based beam indication in Rel-18 LTM, at least Alt 1 is supported:

- Alt 1: TCJ state activation of a candidate cell is received before the reception of beam indication of the candidate cell,
- Alt 2: TCI state activation of a candidate cell is received together with the reception of beam indication of the candidate cell
  - FFS: signalling details for TCI state indication, if both activation and indication are done in the same MAC CE message carrying switch command
- Alt 3: Alt 1 and/or Alt 2 can be supported based on the UE capability
- FFS: signalling details for TCI state activation
- FFS: For Alt 1, whether/how TCI state activation for candidate cell(s) is allowed Note: If scenarios 1 and 3 are to be supported other beam indication/TCI activation timing relationships are not precluded.

Working Assumption

On the presence of beam indication within cell switch command, at least for scenario 2, following is supported:

A field to indicate 1 joint or 1 pair of UL and DL unified TCI State index for the target cell field is always present in the cell switch command.

Agreement

Periodic and semi-persistent report on PUCCH are also supported for gNB scheduled L1-measurement reporting.

Agreement

Send an LS to RAN2,3,4 on the RAN1 agreements in this meeting

All agreements in AI 9.10.1 and 9.10.2 in RAN1 #112bis-e are included

The following contents are included in the LS

RAN1 has made the following agreement in RAN1 #112bis-e

Adopt Alt.2 for beam indication of target cell(s) and TCI state activation for candidate cell(s) (if supported), Alt. 1: By indicating RS identifier, i.e. mapping between RS identifier and Rel-17 unified TCI state is done by a UE Alt. 2: By indicating Rel-17 TCI state index This agreement implies that the source cell must be provided with information so that the source cell can send a Rel-17 TCI state index of the target/candidate cell(s) to the UE even when source cell and target/candidate cell(s) belong to different DUs. RAN1 respectfully asks RAN3 to perform any necessary specification work to support this functionality.

In [8] Chair's notes RAN1 #113 eom3, the following is provided.

Agreement

A UE can be indicated and activated a single joint TCI state or a pair of UL/DL TCI state in the cell switch command.

Agreement

For the configuration of SSB based L1-RSRP measurement, periodicity of SSB, SSB position in burst are provided as time domain information for intra- and inter-frequency Agreement Each TCI state included up to 2 qcl-types and each qcl-type source RS in a QCL-Info of the TCI state is provided at least based on the RS configuration for LTM FFS: other RS index outside measurement RS configuration for LTM FFS: Additional contents of TCI states for LTM Agreement For TCI state activation for candidate cell(s) before the cell switch command, MAC CE is used and the details of MAC-CE for TCI state activation for LTM is up to RAN2

Further study if PDCCH order for candidate cell(s) can be used

Agreement

For PDCCH order based PRACH to candidate cell, the candidate cell SSB indicated in the PDCCH order serves as the path loss RS for PRACH Tx power determination.

Agreement

On the determination of the PRACH transmission power when reception of RAR is not configured, a [1-bit] field in PDCCH order explicitly indicating initial transmission or retransmission of PRACH is supported.

Agreement

On the determination of the PRACH transmission power when reception of RAR is not configured, a 1-bit field in PDCCH order explicitly indicating initial transmission or retransmission of PRACH, FFS UE will increase the power with the value of power ramping configuration if it is indicated as re-transmission, unless the max allowed power is achieved whether/how to reset the counter Agreement For PDCCH-order based PRACH for candidate cell, If UE capability does not support simultaneous/parallel transmissions, when the PRACH transmission to a candidate cell other than current serving cell (including any interruption due to processing time to build the PRACH transmission, carrier or/and BWP switching time if any, UL or DL RF retuning time if any, additional preparation time if any) happen to overlap over one or more symbols or have a time gap below a certain threshold (e.g., N symbols, FFS: the value of N) with following UL transmission to one of the serving cells PRACH transmission PUCCH/PUSCH transmission carrying HARQ-ACK, SR, P/SP CSI, aperiodic CSI SRS transmission Any other PUCCH/PUSCH transmission Down-select the UE behavior in this case Alt 1: Dropping rule is needed Alt 2: up to UE implementation In [9] 3GPP TS 38.321 V17.3.0 (2022-12) 3rd Generation Partnership Project, the following is provided.

6.1.3.47 Unified TCI States Activation/Deactivation MAC CE

The Unified TCI States Activation/Deactivation MAC CE is identified by a MAC subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331 [5], this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively;

DL BWP ID: This field indicates a DL BWP for which the MAC CE applies as the codepoint of the DCI bandwidth part indicator field as specified in TS 38.212 [9]. The length of the BWP ID field is 2 bits;

UL BWP ID: This field indicates a UL BWP for which the MAC CE applies as the codepoint of the DCI bandwidth part indicator field as specified in TS 38.212 [9]. If value of unifiedTCI-StateType in the Serving Cell indicated by Serving Cell ID is joint, this field is considered as the reserved bits. The length of the BWP ID field is 2 bits;

$P_i$: This field indicates whether each TCI codepoint has multiple TCI states or single TCI state. If $P_i$ field is set to 1, it indicates that $i^{th}$ TCI codepoint includes the DL TCI state and the UL TCI state. If $P_i$ field is set to 0, it indicates that $i^{th}$ TCI codepoint includes only the DL/joint TCI state or the UL TCI state. The codepoint to which a TCI state is mapped is determined by its ordinal position among all the TCI state ID fields;

D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in TS 38.331 [5]. If D/U is set to 1, 7-bits length TCI state ID i.e. TCI-StateId as specified in TS 38.331 [5] is used. If D/U is set to 0, the most significant bit of TCI state ID is considered as the reserved bit and remainder 6 bits indicate the UL-TCIState-Id as specified in TS 38.331 [5]. The maximum number of activated TCI states is 16;

R: Reserved bit, set to 0.

FIG. 6 is a reproduction of FIG. 6.1.3.47-1: Unified TC state activation/deactivation MAC CE, from 3GPP TS 38.321 V17.3.0 (2022-12) 3rd Generation Partnership Project.

6.1.3.15 TCI State Indication for UE-specific PDCCH MAC CE

The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all theServing Cells in the set simultaneousTCI-UpdateList1 or simultaneousTCI-UpdateList2, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-StatesToAddModList and tci-StatesToReleaseList in the PDSCH-Config in the active BWP or by dl-OrJoint-TCI-State-ToAddModList and dl-OrJoint-TCI-State-ToReleaseList in the PDSCH-Config in the active BWP or the reference BWP. If the field of CORESET ID is set to the other value than 0, this field indicates a TCI-StateId configured by tci-StatesPDCCH-ToAddList and tei-StatesPDCCH-ToReleaseList in the controlResourceSet identified by the indicated CORESET ID. The length of the field is 7 bits.

Figure 7:
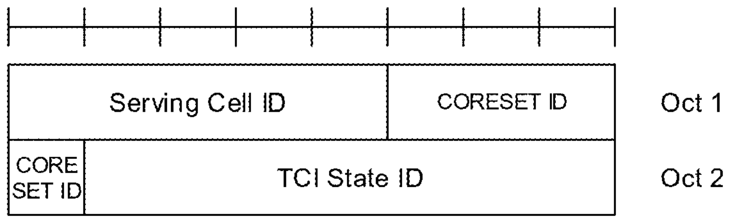
FIG. 7 (PRIOR ART)
FIG. 7 is a reproduction of FIG. 6.1.3.15-1: TCI State Indication for UE-specific PDCCH MAC CE, from 3GPP TS 38.321 V17.3.0 (2022-12) 3rd Generation Partnership Project.

FIG. 7 is a reproduction of FIG. 6.1.3.15-1: TCI State Indication for UE-specific PDCCH MAC CE, from 3GPP TS 38.321 V17.3.0 (2022-12) 3rd Generation Partnership Project.

6.1.3.44 Enhanced TCI States Indication for UE-Specific PDCCH MAC CE

The Enhanced TCI States Indication for UE-specific PDCCH MAC CE is identified by a MAC PDU subheader with eLCID as specified in Table 6.2.1-1b. It has a fixed size of 24 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all theServing Cells in the set simultaneousTCI-UpdateList1 or simultaneousTCI-UpdateList2, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI state IDi: This field indicates the TCI state identified by TCI-StateId as specified in TS 38.331 [5] applicable to the Control Resource Set identified by CORESET ID field. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

NOTE 1: The Enhanced TCI State Indication for UE specific PDCCH MAC CE is not applicable to any of the configured CORESETs in a BWP if the CORESETs are configured with different CORESETPoolindex values in the BWP.

NOTE 2: The Enhanced TCI State Indication for UE specific PDCCH MAC CE is applied only if sfn-SchemePdcch is configured.

NOTE 3: The Enhanced TCI State Indication for UE specific PDCCH MAC CE is not applicable to the CORESET configured by controlResourceSetZero if the CORESET is associated with the search space configured by pdcch-ConfigSIBI in MIB, or searchSpaceSIBI, searchSpaceZero, searchSpaceOtherSysteminformation, or pagingSearchSpace in PDCCH-ConfigCommon.

Figure 8:
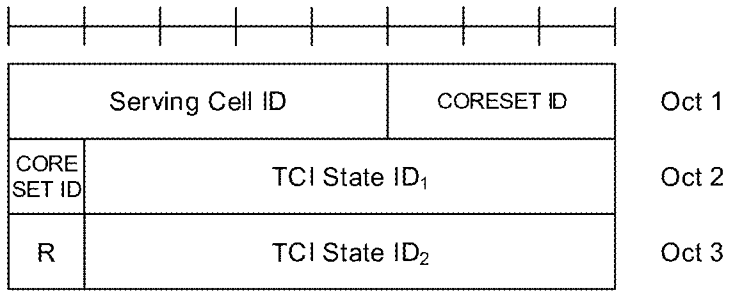
FIG. 8 (PRIOR ART)
FIG. 8 is a reproduction of FIG. 6.1.3.44-1: Enhanced TCI States Indication for UE-specific PDCCH MAC CE, from 3GPP TS 38.321 V17.3.0 (2022-12) 3rd Generation Partnership Project.

FIG. 8 is a reproduction of FIG. 6.1.3.44-1: Enhanced TCI States Indication for UE-specific PDCCH MAC CE, from 3GPP TS 38.321 V17.3.0 (2022-12) 3rd Generation Partnership Project.

In [10], 3GPP TS 38.212 V17.3.0 (2022-09) 3rd Generation Partnership Project, the following is provided.

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats—1 bit

The value of this bit field is always set to 0, indicating an UL DCI format

Carrier indicator—0 or 3 bits, as defined in Clause 10.1 of [5, TS38.213]. This field is reserved when this format is carried by PDCCH on the primary cell and the UE is configured for scheduling on the primary cell from an SCell, with the same number of bits as that in this format carried by PDCCH on the SCell for scheduling on the primary cell.

UL/SUL indicator—0 bit for UEs not configured with supplementary Uplink in ServingCellConfig in the cell or UEs configured with supplementary Uplink in Serving CellConfig in the cell but only one carrier in the cell is configured for PUSCH transmission; otherwise, 1 bit as defined in Table 7.3.1.1.1-1.

Bandwidth part indicator—0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where $n_{BWP}=n_{BWP,RRC}+1$ if $n_{BWP,RRC}\leq 3$, in which case the bandwidth part indicator is equivalent to the ascending order of the higher layer parameter BWP-Id;

otherwise $n_{BWP}=n_{BWP,RRC}$, in which case the bandwidth part indicator is defined in Table 7.3.1.1.2-1;

If a UE does not support active BWP change via DCI, the UE ignores this bit field.

Frequency domain resource assignment—number of bits determined by the following, where $$N_{RB}^{UL,BWP}$$

is the size of the active UL bandwidth part:

If higher layer parameter useInterlacePUCCH-PUSCH in BWP-UplinkDedicated is not configured $N_{RBG}$ bits if only resource allocation type 0 is configured, where $N_{RBG}$ is defined in Clause 6.1.2.2.1 of [6, TS 38.214], $$\lceil \log_2(N_{RB}^{UL,BWP}(N_{RB}^{UL,BWP}+1)/2 \rceil$$

bits if only resource allocation type 1 is configured, or $$\max(\lceil \log_2(N_{RB}^{UL,BWP}(N_{RB}^{UL,BWP}+1)/2 \rceil, N_{RBG})+1$$

Bits if resourceAllocation is configured as 'dynamicSwitch'.

If resourceAllocation is configured as 'dynamicSwitch', the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Clause 6.1.2.2.1 of [6, TS 38.214].

For resource allocation type 1, the $$\lceil \log_2(N_{RB}^{UL,BWP}(N_{RB}^{UL,BWP}+1)/2 \rceil$$

LSBs provide the resource allocation as follows:

For PUSCH hopping with resource allocation type 1:

$N_{UL\_hop}$ MSB bits are used to indicate the frequency offset according to Clause 6.3 of [6, TS 38.214], where $N_{UL\_hop}=1$ if the higher layer parameterfrequencyHoppingOffsetLists contains two offset values and $N_{UL\_hop}=2$ if the higher layer parameter frequencyHoppingOffsetLists contains four offset values $$\lceil \log_2(N_{RB}^{UL,BWP}(N_{RB}^{UL,BWP}+1)/2 \rceil - N_{UL\_hop}$$

bits provide the frequency domain resource allocation according to Clause 6.1.2.2.2 of [6, TS 38.214]

For non-PUSCH hopping with resource allocation type 1:

$$\lceil \log_2(N_{RB}^{UL,BWP}(N_{RB}^{UL,BWP}+1)/2 \rceil$$

bits provide the frequency domain resource allocation according to Clause 6.1.2.2.2 of [6, TS 38.214]

Time domain resource assignment—0, 1, 2, 3, 4, 5, or 6 bits

If the higher layer parameter pusch-TimeDomainAllocationListDCI-0-1 is not configured and if the higher layer parameter pusch-TimeDomainAllocationList-ForMultiPUSCH is not configured and if the higher layer parameter pusch-TimeDomainResourceAllocationListForMultiPUSCH-r17 is not configured and if the higher layer parameter pusch-TimeDomainAllocationList is configured, 0, 1, 2, 3, or 4 bits as defined in Clause 6.1.2.1 of [6, TS38.214]. The bitwidth for this field is determined as $\lceil \log_2(I) \rceil$ bits, where I is the number of entries in the higher layer parameter pusch-TimeDomainAllocationList;

If the higher layer parameter pusch-TimeDomainAllocationListDCI-0-1 is configured or if the higher layer parameter pusch-TimeDomainAllocationListForMultiPUSCH is configured or if the higher layer parameter push-TimeDomainResourceAllocationListForMultiPUSCH-r17 is configured, 0, 1, 2, 3, 4, 5 or 6 bits as defined in Clause 6.1.2.1 of [6, TS38.214]. The bitwidth for this field is determined as $[\log_2(I)]$ bits, where I is the number of entries in the higher layer parameter pusch-TimeDomainAllocationListDCI-0-1 or pusch-TimeDomainAllocationListForMultiPUSCH or pusch-TimeDomainResourceAllocationListForMultiPUSCH-r17;

otherwise the bitwidth for this field is determined as $\lceil \log_2(I) \rceil$ bits, where I is the number of entries in the default table.

Modulation and coding scheme—5 bits as defined in Clause 6.1.4.1 of [6, TS 38.214]

New data indicator—1 bit if the number of scheduled PUSCH indicated by the Time domain resource assignment field is 1; otherwise 2, 3, 4, 5, 6, 7 or 8 bits determined based on the maximum number of schedulable PUSCH among all entries in the higher layer parameter pusch-TimeDomainAllocationListForMultiPUSCH or pusch-TimeDomainResourceAllocationListForMultiPUSCH-r17, where each bit corresponds to one scheduled PUSCH as defined in clause 6.1.4 in [6, TS 38.214].

Redundancy version—number of bits determined by the following:

2 bits as defined in Table 7.3.1.1.1-2 if the number of scheduled PUSCH indicated by the Time domain resource assignment field is 1;

otherwise 2, 3, 4, 5, 6, 7 or 8 bits determined by the maximum number of schedulable PUSCHs among all entries in the higher layer parameter pusch-TimeDomainAllocationListForMultiPUSCH or pusch-TimeDomainResourceAllocationListForMultiPUSCH-r17, where each bit corresponds to one scheduled PUSCH as defined in clause 6.1.4 in [6, TS 38.214] and redundancy version is determined according to Table 7.3.1.1.2-34.

HARQ process number—5 bits if higher layer parameter harq-ProcessNumberSizeDCU-0-1 is configured; otherwise 4 bits TPC command for scheduled PUSCH—2 bits as defined in Clause 7.1.1 of [5, TS38.213]

Second TPC command for scheduled PUSCH—2 bits as defined in Clause 7.1.1 of [5, TS38.213] if higher layer parameter SecondTPCFieldDCI-0-1 is configured; 0 bit otherwise.

SRS resource set indicator—0 or 2 bits 2 bits according to Table 7.3.1.1.2-36 if txConfig=nonCodeBook, and there are two SRS resource sets configured by srs-ResourceSetToAddModList and associated with the usage of value 'nonCodeBook', or txConfig=codebook, and there are two SRS resource sets configured by srs-ResourceSetToAddModList and associated with usage of value 'codebook';

0 bit otherwise.

SRS resource indicator $$\left\lceil \log_2\left(\sum_{k=1}^{\min\{L_{max},N_{SRS}\}} \binom{N_{SRS}}{k}\right)\right\rceil$$

or $\lceil \log_2(N_{SRS}) \rceil$ bits, where $N_{SRS}$ is the number of configured SRS resources in the SRS resource set indicated by SRS resource set indicator field if present; otherwise $N_{SRS}$ is the number of configured SRS resources in the SRS resource set configured by higher layer parameter srs-ResourceSetToAddModList and associated with the higher layer parameter usage of value 'codeBook' or 'nonCodeBook', $$\left\lceil \log_2\left(\sum_{k=1}^{\min\{L_{max},N_{SRS}\}} \binom{N_{SRS}}{k}\right)\right\rceil$$

bits according to Tables 7.3.1.1.2-28/29/30/31 if the higher layer parameter txConfig=nonCodebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'nonCodeBook', and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32, 7.3.1.1.2-32A and 7.3.1.1.2-32B if the higher layer parameter txConfig=codebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'codeBook'.

Second SRS resource indicator—0, $$\left\lceil \log_2\left(\max_{k\in\{1,2,\ldots,\min\{L_{max},N_{SRS}\}\}} \binom{N_{SRS}}{k}\right)\right\rceil$$

or $\lceil \log_2(N_{SRS}) \rceil$ bits, $$\left\lceil \log_2\left(\max_{k\in\{1,2,\ldots,\min\{L_{max},N_{SRS}\}\}} \binom{N_{SRS}}{k}\right)\right\rceil$$

bits according to Tables 7.3.1.1.2-28/29A/30A/31A with the same number of layers indicated by SRS resource indicator field if the higher layer parameter txConfig=nonCodebook and SRS resource set indicator field is present, where $N_{SRS}$ is the number of configured SRS resources in the second SRS resource set, and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32, 7.3.1.1.2-32A and 7.3.1.1.2-32B if the higher layer parameter txConfig=codebook and SRS resource set indicator field is present, where $N_{SRS}$ is the number of configured SRS resources in the second SRS resource set.

0 bit otherwise.

CSI request—0, 1, 2, 3, 4, 5, or 6 bits determined by higher layer parameter reportTriggerSize.

7.3.1.2.2 Format 1_1

DCI format 1_1 is used for the scheduling of one or multiple PDSCH in one cell.

The following information is transmitted by means of the DCI format 1_1 with CRC scrambled by C-RNTI or CS-RNTI or MCS-C-RNTI:

Identifier for DCI formats—1 bits

The value of this bit field is always set to 1, indicating a DL DCI format

Carrier indicator—0 or 3 bits as defined in Clause 10.1 of [5, TS 38.213]. This field is reserved when this format is carried by PDCCH on the primary cell and the UE is configured for scheduling on the primary cell from an SCell, with the same number of bits as that in this format carried by PDCCH on the SCell for scheduling on the primary cell.

Bandwidth part indicator—0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where $n_{BWP}=n_{BWP,RRC}\leq 3$, in which case the bandwidth part indicator is equivalent to the ascending order of the higher layer parameter BWP-Id;

otherwise $n_{BWP}=n_{BWP,RRC}$, in which case the bandwidth part indicator is defined in Table 7.3.1.1.2-1;

If a UE does not support active BWP change via DCI, the UE ignores this bit field.

Frequency domain resource assignment—number of bits determined by the following, where $$N_{RB}^{DL,BWP}$$

is the size of the active DL bandwidth part:

$N_{RBG}$ bits if only resource allocation type 0 is configured, where $N_{RBG}$ is defined in Clause 5.1.2.2.1 of [6, TS38.214], $$\lceil \log_2(N_{RB}^{UL,BWP}(N_{RB}^{UL,BWP}+1)/2\rceil$$

bits if only resource allocation type 1 is configured, or $$\max(\lceil \log_2(N_{RB}^{UL,BWP}(N_{RB}^{UL,BWP}+1)/2\rceil, N_{RBG})+1$$

bits if resourceAllocation is configured as 'dynamicSwitch'.

If resourceAllocation is configured as 'dynamicSwitch', the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Clause 5.1.2.2.1 of [6, TS 38.214].

For resource allocation type 1, the $$\lceil \log_2(N_{RB}^{UL,BWP}(N_{RB}^{UL,BWP}+1)/2\rceil$$

LSBs provide the resource allocation as defined in Clause 5.1.2.2.2 of [6, TS 38.214]

If "Bandwidth part indicator" field indicates a bandwidth part other than the active bandwidth part and if resourceAllocation is configured as 'dynamicSwitch' for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment—0, 1, 2, 3, 4, 5 or 6 bits

If the higher layer parameter pdsch-TimeDomainResourceAllocationListForMultiPDSCH is not configured and if the higher layer parameter pdsch-TimeDomainAllocationList is configured, 0, 1, 2, 3 or 4 bits as defined in Clause 5.1.2.1 of [6, TS 38.214]. The bitwidth for this field is determined as $\rceil\log_2(I)\lceil$ bits, where I is the number of entries in the higher layer parameter pdsch-TimeDomainAllocationList if the higher layer parameter is configured;

if the higher layer parameter pdsch-TimeDomainResourceAllocationListForMultiPDSCH is configured, 0, 1, 2, 3, 4, 5 or 6 bits as defined in Clause 5.1.2.1 of [6, TS38.214]. The bitwidth for this field is determined as $\rceil\log_2(I)\lceil$ bits, where I is the number of entries in the higher layer parameter pdsch-TimeDomainResourceAllocationListForMultiPDSCH;

otherwise I is the number of entries in the default table.

ZP CSI-RS trigger—0, 1, or 2 bits as defined in Clause 5.1.4.2 of [6, TS 38.214]. The bitwidth for this field is determined as $\rceil\log_2(n_{ZP}+1)\lceil$ bits, where $n_{ZP}$ is the number of aperiodic ZP CSI-RS resource sets configured by higher layer.

For Transport Block 1:

Modulation and coding scheme—5 bits as defined in Clause 5.1.3.1 of [6, TS 38.214]

New data indicator—1 bit if the number of scheduled PDSCH indicated by the Time domain resource assignment field is 1; otherwise 2, 3, 4, 5, 6, 7 or 8 bits determined based on the maximum number of schedulable PDSCH among all entries in the higher layer parameter pdsch-TimeDomainResourceAllocationList-ForMultiPDSCH, where each bit corresponds to one scheduled PDSCH as defined in clause 5.1.3 in [6, TS 38.214].

Redundancy version—number of bits determined by the following:

2 bits as defined in Table 7.3.1.1.1-2 if the number of scheduled PDSCH indicated by the Time domain resource assignment field is 1;

otherwise 2, 3, 4, 5, 6, 7 or 8 bits determined by the maximum number of schedulable PDSCHs among all entries in the higher layer parameter pdsch-TimeDomainResourceAllocationListForMulti-PDSCH, where each bit corresponds to one scheduled PDSCH as defined in clause 5.1.3 in [6, TS 38.214] and redundancy version is determined according to Table 7.3.1.1.2-34.

For Transport Block 2 (Only Present if maxNrofCodeWordsScheduledByDCI Equals 2):

Modulation and coding scheme—5 bits as defined in Clause 5.1.3.1 of [6, TS 38.214]

New data indicator—1 bit if the number of scheduled PDSCH indicated by the Time domain resource assignment field is 1; otherwise 2, 3, 4, 5, 6, 7 or 8 bits determined based on the maximum number of schedulable PDSCH among all entries in the higher layer parameter pdsch-TimeDomainResourceAllocationList-ForMultiPDSCH, where each bit corresponds to one scheduled PDSCH as defined in clause 5.1.3 in [6, TS 38.214].

Redundancy version—number of bits determined by the following:

2 bits as defined in Table 7.3.1.1.1-2 if the number of scheduled PDSCH indicated by the Time domain resource assignment field is 1;

otherwise 2, 3, 4, 5, 6, 7 or 8 bits determined by the maximum number of schedulable PDSCHs among all entries in the higher layer parameter pdsch-TimeDomainResourceAllocationListForMulti-PDSCH, where each bit corresponds to one scheduled PDSCH as defined in clause 5.1.3 in [6, TS 38.214] and redundancy version is determined according to Table 7.3.1.1.2-34.

HARQ process number—5 bits if higher layer parameter harq-ProcessNumberSizeDCI-1-1 is configured; otherwise 4 bits TPC command for scheduled PUCCH—2 bits as defined in Clause 7.2.1 of [5, TS 38.213]

Second TPC command for scheduled PUCCH—2 bits as defined in Clause 7.2.1 of [5, TS 38.213] if higher layer parameter SecondTPCFieldDCI-1-1 is configured; 0 bit otherwise.

PUCCH resource indicator—3 bits as defined in Clause 9.2.3 of [5, TS 38.213]

PDSCH-to-HARQ_feedback timing indicator—0, 1, 2, or 3 bits as defined in Clause 9.2.3 of [5, TS 38.213]. The bitwidth for this field is determined as $\rceil \log_2(I) \lceil$ bits, where I is the number of entries in the higher layer parameter dl-DataToUL-ACK.

Transmission configuration indication—0 bit if higher layer parameter tci-PresentInDCI is not enabled; otherwise 3 bits as defined in Clause 5.1.5 of [6, TS38.214].

If "Bandwidth part indicator" field indicates a bandwidth part other than the active bandwidth part, if the higher layer parameter tci-PresentInDCI is not enabled for the CORESET used for the PDCCH carrying the DCI format 1_1, the UE assumes tci-PresentInDCI is not enabled for all CORESETs in the indicated bandwidth part;

otherwise, the UE assumes tci-PresentInDCI is enabled for all CORESETs in the indicated bandwidth part.

In order to have handover sooner, L1/L2-triggered mobility (LTM) is introduced. A source network node could trigger Physical Random Access Channel (PRACH) transmission by Physical Downlink Control Channel (PDCCH) order for acquiring Timing Advance (TA) before transmitting Handover (HO) command. The PDCCH order would trigger a Contention Free Random Access Procedure (CFRA). For saving signaling, the network node may not transmit message comprising TA information to a User Equipment (UE), which is called a Random Access Response (RAR)-less TA mechanism herein. Instead, the network node provides TA information along with the HO command which could benefit from storing too much TA information for each candidate cell. Without losing generality, a number of candidate cells could be configured by the network node and/or could be subjected to the UE's capability. Each candidate cell is not a serving cell before the UE receives the HO command. Before receiving the HO command, the UE would have a light or full configuration associated with one or more candidate cells. A light configuration may comprise a Random Access Channel (RACH) configuration. A full configuration may further comprise a RACH configuration, a Physical Uplink Shared Channel (PUSCH) configuration, a Physical Uplink Control Channel (PUCCH) configuration, a Sounding Reference Signal (SRS) configuration. Besides, Channel State Information (CSI) reporting for Beam Management (BM) is configured by the network in advance. No matter if the time behavior of CSI reporting is periodic, semi-persistent, or aperiodic, CSI reporting for BM is based on the network's instruction.

Figure 9:
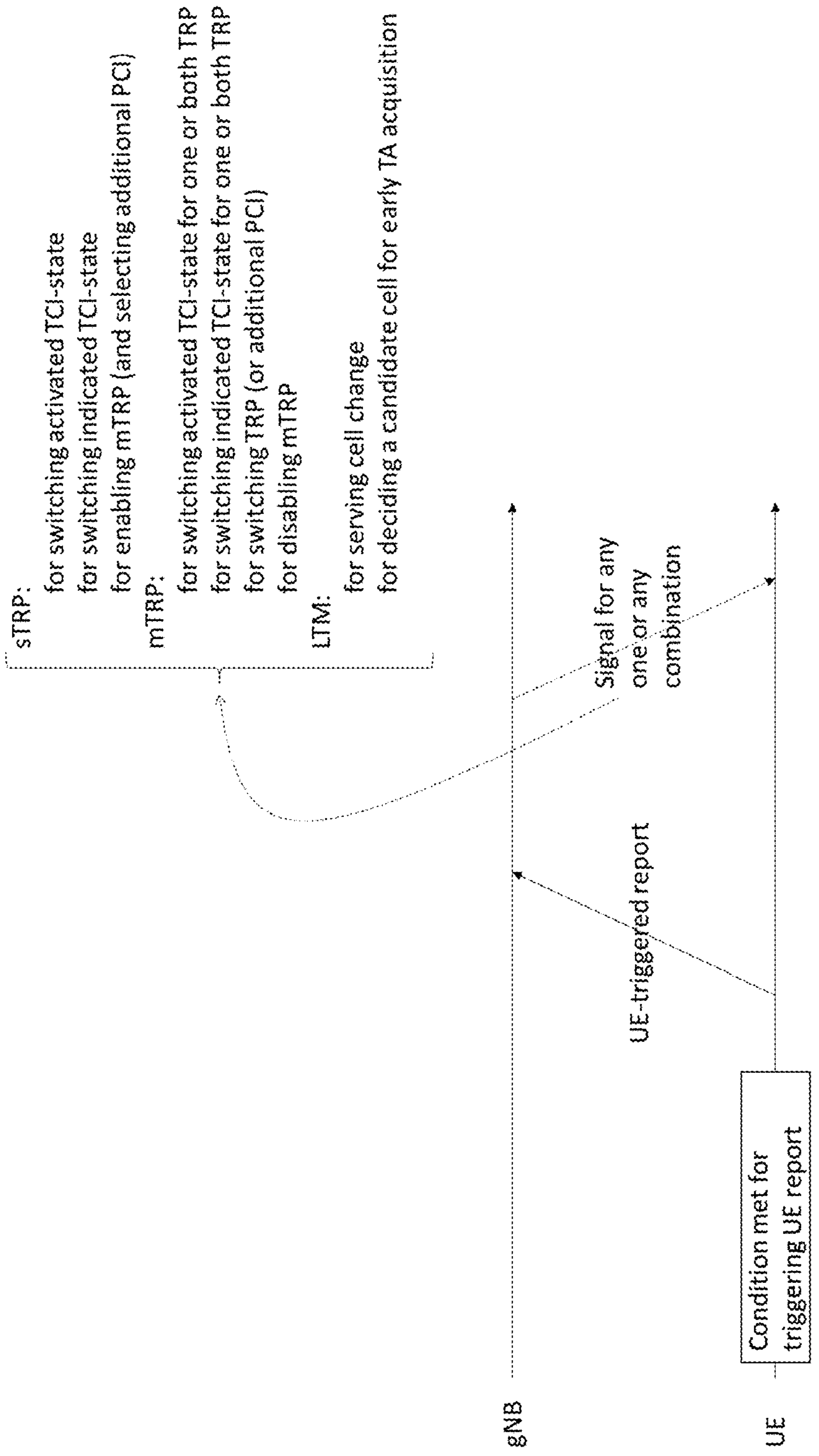
FIG. 9 is an example diagram showing that once a condition is met for triggering a UE report, the UE would transmit a UE-triggered report to a gNB and the gNB can make a decision for possible action, in accordance with embodiments of the present invention.

In light of the above, no matter if LTM or CSI reporting for BM, the UE reports in response to the network's instruction or configuration. However, the UE is indeed the device that notices a variety of DL channel conditions in the earlier moment. In order to have quick response for a Downlink (DL) channel, it is considered design framework for the UE triggered report (or event triggered report or UE initiated report) or UE triggered LTM (ULTM) (or called conditional LTM (CLTM)). Besides, such a UE triggered report may not only be used for LTM but also used for assisting the network node's decision for intra-cell cell scheduling. More specifically, the UE triggered report may include any one or any combination of intra-Distributed Unit (DU), inter-DU, intra-Centralized Unit (CU), inter-CU, intra-cell, inter-cell, multiple Downlink Control Information (mDCI) multiple Transmission/Reception Points (mTRP), shortened DCI (sDCI) mTRP, and/or single TRP. For example, in FIG. 9, once condition is met for triggering a UE report, the UE would transmit a UE-triggered report to a Next Generation Node (gNB) or a to cell. The gNB can make a decision for possible action.

For ULTM, the UE could change its serving cell(s) (e.g., Primary Cell(s) (PCell(s)), Primary Secondary Cell(s) (PSCell(s)), and/or Secondary Cell(s) (SCell(s)) to candidate cell(s) selected by the UE itself, e.g., without receiving a Medium Access Control (MAC) Control Element (CE) for LTM to indicate candidate cell(s). The UE could receive a (Radio Resource Control (RRC)) configuration of candidate cell(s) before performing ULTM (or before triggering a procedure due to a condition met). The UE could receive a (RRC) configuration of candidate beam(s)/RS(s)/Transmission Configuration Indication (TCI) state(s)/TRP(s) before performing ULTM (or before triggering a procedure due to a condition met). The UE could receive a (RRC) configuration of one or more conditions before performing ULTM (or before triggering a procedure due to a condition met). The UE could receive a (RRC) configuration of one or more conditions associated with the one or more candidate cell (s)/beam(s)/RS(s)/TCI state(s)/TRP(s) before performing ULTM (or before triggering a procedure due to a condition met). Once the UE triggers the procedure associated with ULTM (or changing the beam or changing the TRP or changing the TCI state) based on the condition being met, the UE will trigger the procedure to add candidate cell(s)/beam(s)/RS(s)/TCI state(s)/TRP(s) (in addition to the currently used cell(s)/beam(s)/RS(s)/TCI state(s)/TRP(s)) or change the current used cell(s)/beam(s)/RS(s)/TCI state(s)/TRP(s) to one candidate cell(s)/beam(s)/RS(s)/TCI state(s)/TRP(s) which the condition is being met. The UE will add the candidate cell(s)/beam(s)/RS(s)/TCI state(s)/TRP(s) (in addition to the currently used cell(s)/beam(s)/RS(s)/TCI state(s)/TRP(s)) or change the current used cell(s)/beam(s)/RS(s)/TCI state(s)/TRP(s) to one candidate cell(s)/beam(s)/RS(s)/TCI state(s)/TRP(s) which the condition is being met. The triggered procedure may comprise performing a RACH procedure (e.g., transmitting PRACH). The RACH procedure may comprise transmitting PRACH to the target network node. The UE monitors DCI from the target network node (the DCI schedules Physical Downlink Shared Channel (PDSCH) comprising an RAR grant). Alternatively, the UE monitors DCI from the source network node (the DCI schedules PDSCH comprising the RAR grant). The RACH procedure is triggered to transmit a complete message to the target network node. The UE would receive a response message from the target network node. The response message is used to stop the triggered procedure. Once the UE receives the response message, the UE stops the triggered procedure (due to condition being met). Alternatively, the complete message is used to stop the triggered procedure. Once the UE transmits the complete message, the UE stops the triggered procedure (due to condition being met). The complete message could be an RRC message or MAC CE or Physical Layer (PHY) signaling.

In New Radio (NR) Rel-16, conditioned handover could be a starting point. For example, (Cond)Event A3, A4, or A5 in TS 38.331 could be considered, which could be summarized as checking the quality of a candidate and/or a Primary Cell (PCell)/Primary Secondary Cell (PSCell).

With introducing of a UE triggered report or a UE triggered LTM, there may be some issues that need to be solved. Preferably, throughout the invention, UE triggered report, UE triggered LTM, and UE triggered LTM (report) could be interchangeable. Preferably, UE triggered LTM or UE triggered LTM (report) is one kind of UE triggered report with the candidate beam or candidate cell associated with a neighboring cell or non-serving cell (e.g., with a different physical cell ID than the serving cell).

The first issue is to design under which condition the UE triggers a report. Since the network node may use this UE triggered report to have a different decision (e.g., for changing scheduling beam, changing number of scheduling TRP, changing scheduling of number of coordinated TRPs, changing number of TRPs, etc . . . ), the UE's triggered condition seems to be designed differently. For example, when the UE has a good channel quality via one current used beam, once the UE identifies a candidate beam with good quality for communication, using a condition of comparing both a current used beam and a candidate beam will result that the UE does not trigger a report but in fact a candidate beam could be triggered for assisting the network node's decision for scheduling an mTRP scheme or adding/activating/indicating an additional beam. In other words, when identifying a candidate beam with good quality for possibly operating mTRP, the UE could trigger a report without comparing that the quality of the candidate beam is an offset better than a quality of the currently used beam. On the other hand, when the UE has a bad channel quality via one current used beam, once the UE identifies a candidate beam preferably with an offset having better quality for communication than a channel quality of the one current used beam, using the condition of comparing only the candidate beam will result that the UE does not trigger a report but, in fact, the candidate beam could be reported for assisting the network node's decision on replacing the currently used beam. This may happen when the quality of the candidate beam does is not better than a threshold, but with an offset better than the quality of the currently used beam. In light of the above, design of the condition for different scenarios may be needed.

The second issue is that when a network node receives a UE triggered report, how the network node knows the root cause of this report (e.g., triggering's reason). For example, if the triggered report comprises a candidate beam related information and a beam quality (e.g., with qualified matric, such as L1 or L3-Reference Signal Received Power (RSRP)), the network node may be confused as to whether this report is triggered for changing the current beam or to add or use the reported candidate beam.

The third issue is which object is used for the UE to determine to measure for a triggering report. For Rel-15/16, without considering a unified Transmission Configuration Indication (TCI) state, the UE may receive beam information per Control Resource Set (CORESET) for monitoring. When the UE triggered report is introduced on a cell without having/applying a unified TCI state, how to determine which Reference Signal (RS) or beam is used to claim whether a triggering condition is met or not. For Rel-17/18 with considering a unified TCI state, it seems feasible to use an indicated TCI state as currently used one(s) if the condition needs quality of the currently used beam(s). Besides, which object for the UE to determine as candidate RS(s)/beam(s) may also need further proper design. For mTRP operation, whether to have a separately or jointly determining triggered condition may need further study. For example, considering the UE is indicated by BM DCI with TCI state x and TCI state y associated with beam 1, beam 2, respectively, is the object of a currently used beam corresponding to each indicated beam (e.g., beam1, beam2 separately) or corresponding to one indicated beam pair (e.g., beam1 and beam 2 being as one pair). Also, an object of candidate one(s) corresponds to each candidate beam (e.g., candidate beam 1 is preferably compared with beam 1, and candidate beam 2 is preferably compared with beam 2) or corresponds to a beam pair (e.g., a candidate beam pair is preferably compared with beam 1 and beam 2). In the latter, once the group based beam reporting is supported by the UE (and/or also the UE is configured with group based beam reporting), how to determine support of this feature and the UE triggered report may need further design.

The fourth issue is how/whether to prohibit behavior for such a UE triggered report in order to frequently trigger such a report. Besides, interaction between the network configured/indicated/requested beam report and the UE triggered report may need further design.

The fifth issue is detailed content of the UE triggered report. Based on the identified issue above, what the UE set or put in the triggered report may need to be designed properly.

Preferably in certain embodiments, a container for the UE initiated report could be Medium Access Control (MAC) Control Element (CE) or L1 signal (e.g., Uplink Control Information (UCI) on PUCCH/PUSCH).

Preferably in certain embodiments, condition or criteria for the UE initiated report could be (pre-)configured per UE, serving cell, beam, RS, Bandwidth Part (BWP), or TCI state.

Preferably in certain embodiments, the UE triggers the report and/or transmits the triggered report, wherein any beam failure detection counter is not expired.

Preferably in certain embodiments, the UE triggers the report when a Beam Failure Recovery (BFR) procedure is not triggered.

Preferably in certain embodiments, the UE triggered report is not in response to beam failure or radio link failure.

Preferably in certain embodiments, the UE triggers the report, and/or transmits the triggered report when the UE does not encounter beam failure or radio link failure.

Preferably in certain embodiments, the UE triggered report is not or does not correspond to a report in response to beam failure.

Preferably in certain embodiments, the UE triggered report is not or does not correspond to BFR report or request transmitted via the UE.

Preferably in certain embodiments, the UE triggered report here is transmitted when a channel condition via a currently used beam(s) is not worse to claim or determine as the beam failure or radio link failure.

Preferably in certain embodiments, the UE triggered report here is transmitted when the UE identified candidate beam(s) have good quality and/or have better quality than the current used beam(s).

Concept 0

A triggered condition for a UE triggered report could consider one or more of the following:

- quality of at least one candidate beam;
- quality of at least one current used/indicated beam; and/or
- content (beam(s)/TCI state(s)/RS(s) and/or associated quality) of the last transmitted (UE-triggered, periodic, aperiodic, or semi-persistent) report (associated with the same serving cell).

A triggered condition for a UE triggered report could be based on one or more of the following criteria:

quality of at least one candidate beam (plus or minus offset(s)) is larger than (or equal to) a threshold;

quality of at least one current used/indicated beam (plus or minus offset(s)) is smaller than (or equal to) a threshold;

quality of at least one candidate beam (plus or minus offset(s)) is larger than (or equal to) quality of at least one current used/indicated beam (plus or minus offset (s));

beam(s)/TCI state(s)/RS(s) to be indicated by the UE triggered report is different from that indicated by the last transmitted (UE-triggered, periodic, aperiodic, or semi-persistent) report (associated with the same serving cell); and/or quality of beam(s)/TCI state(s)/RS(s) to be indicated by the UE triggered report (plus or minus offset(s)) is different from (e.g., larger than (or equal to) or smaller than (or equal to)) quality of the beam(s)/TCI state(s)/RS(s) indicated by the last transmitted (UE-triggered, periodic, aperiodic, or semi-persistent) report (plus or minus offset(s)) (associated with the same serving cell).

The quality of at least one candidate beam could be derived from one or multiple of the following:

quality of a candidate beam with quality (plus or minus offset(s)) larger than (or equal to) a threshold;

quality of one of the at least one candidate beam with the best quality, e.g., quality of which is the best among the at least one candidate beam; and/or (average) quality of a number of the at least one candidate beam with the best quality, e.g., N-best beam(s) or N-th best beam (N could be configured by the network and/or N could be 1 or larger than 1).

The at least one candidate beam could be one or multiple of the following:

candidate RS(s), e.g., for BFR, for declaring beam failure, or for being as candidate RS in response to beam failure;

(all) (deactivated) TCJ state(s), e.g., for PDCCH monitoring, for (all) CORESET(s), for CORESET 0, and/or of one or multiple or all CORESET pools, for CORESET associated with Common Search Space (CSS), for CORESET associated with both UE Specific Search Space (USS) and CSS;

(activated) TCI state(s) of one, multiple, or all candidate cells;

RS(s) associated with one or more triggered conditions or criteria;

RS(s) associated with triggered condition or criteria; and/or

RS(s) configured for the UE triggered report.

The at least one candidate beam does not include (or should exclude) the least one current used/indicated beam.

The quality of at least one current used/indicated beam could be derived from one or multiple of the following:

quality of one of the at least one current used/indicated beam with the worst quality, e.g., quality of which is the worst among the at least one current used/indicated beam;

(average) quality of a number of the at least one current used/indicated beam with the worst quality, e.g., N-worst beam(s) or N-th worst beam (N could be configured by network and/or N could be 1 or larger than 1);

quality of a current used/indicated beam with quality (plus or minus offset(s)) smaller than (or equal to) a threshold;

quality of one of the at least one current used/indicated beam with the best quality, e.g., quality of which is the best among the at least one current used/indicated beam;

(average) quality of a number of the at least one current used/indicated beam with the best quality, e.g., N-best beam(s) or N-th best beam (N could be configured by network and/or N could be 1 or larger than 1); and/or (average) quality of all of the at least one current used/indicated beam.

The at least one current used/indicated beam could be one or multiple of the following:

RS(s) in one Bidirectional Forwarding Detection (BFD)-RS set;

RS(s) in multiple (or all) BFD-RS sets;

(all) activated TCI state(s), e.g., for PDCCH monitoring, for (all) CORESET(s), for CORESET 0, and/or of one or multiple or all CORESET pools; and/or beam(s)/TCI state(s) indicated by a (last received) beam indication DCI.

One or multiple of the following triggered conditions for a UE triggered report could be used by the UE:

quality of at least (or any) one candidate beam (plus or minus offset(s)) of a serving cell is larger than (or equal to) a threshold;

quality of at least (or any) one current used/indicated beam (plus or minus offset(s)) of a serving cell is smaller than (or equal to) a threshold;

quality of at least (or any) one candidate beam (plus or minus offset(s)) of a serving cell is larger than (or equal to) quality of at least (or any) one current used/indicated beam (plus or minus offset(s)) of the serving cell;

beam(s)/TCI state(s)/RS(s) to be indicated by the UE triggered report associated with a serving cell is different from that indicated by the last transmitted (UE-triggered, periodic, aperiodic, or semi-persistent) report associated with the serving cell;

quality of beam(s)/TCI state(s)/RS(s) to be indicated by the UE triggered report (plus or minus offset(s)) is different from (e.g., larger than (or equal to) or smaller than (or equal to)) quality of the beam(s)/TCI state(s)/RS(s) indicated by the last transmitted (UE-triggered, periodic, aperiodic, or semi-persistent) report (plus or minus offset(s));

quality of at least (or any) one candidate beam (plus or minus offset(s)) of a serving cell is larger than (or equal to) quality of at least (or any) one current used/indicated beam (plus or minus offset(s)) of the serving cell (and preferably in certain embodiments, the at least one candidate beam of the serving cell and the at least one current used/indicated beam of the serving cell are associated with a same TRP or a same UE panel). Preferably in certain embodiments, operation of multiple TRPs still works if the at least one current used/indicated beam is replaced by the at least one candidate beam, which both are associated with same TRP or same UE panel);

quality of at least (or any) one candidate beam (plus or minus offset(s)) of a (or any) candidate cell is larger than (or equal to) a threshold;

quality of at least (or any) one candidate beam (plus or minus offset(s)) of a (or any) candidate cell is larger than (or equal to) quality of at least (or any) one current used/indicated beam (plus or minus offset(s)) of PCell or SpCell (e.g., not considering PSCell or Secondary Cell(s) (SCell(s)); and/or beam(s)/TCI state(s)/RS(s) to be indicated by the UE triggered report associated with a candidate cell is different from that indicated by the last transmitted (UE-triggered, periodic, aperiodic, or semi-persistent) report associated with the candidate cell.

The threshold could be configured for a specific triggered condition, a specific serving cell, a specific candidate cell, a specific LTM candidate configuration (for a set of cells), and/or a specific additional Physical Cell Identity (PCI). Thresholds could be (pre-)configured or associated with different conditions, different serving cells, different candidate cells, different LTM candidate configurations, or different additional PCIs. Thresholds for different conditions, different serving cells, different candidate cells, different LTM candidate configurations, or different additional PCIs could be different.

The UE triggered report could include one or multiple of the following information:

- one or multiple serving cells which are associated with at least one current used/indicated beam and/or at least one candidate beam indicated by the UE triggered report;
- at least one current used/indicated beam of the serving cell;
- at least one current used/indicated beam of PCell;
- quality of the at least one current used/indicated beam;
- at least one candidate beam of the serving cell, e.g., associated with same or different additional PCIs;
- one or multiple candidate cells which are associated with at least one candidate beam indicated by the UE triggered report;
- at least one candidate beam of same or different candidate cells;
- quality of the at least one candidate beam;
- information associated with LTM or non-LTM (explicit field or via implicit derivation from other fields); and/or
- Identity associated with UETriggeredCondConfig, comprising triggered condition or parameter, associated with the at least one candidate beam.

In response to (initiating, performing, or completing) the UE triggered LTM, the UE could indicate one or multiple of the following information, e.g. to current serving cell(s) or to candidate cell(s) selected by the UE itself:

- one or multiple serving cells which are associated with at least one current used/indicated beam and/or at least one candidate beam indicated by the UE triggered report;
- at least one current used/indicated beam of the serving cell;
- at least one current used/indicated beam of PCell;
- quality of the at least one current used/indicated beam;
- at least one candidate beam of the serving cell, e.g., associated with the same or different additional PCIs;
- one or multiple candidate cells which are associated with at least one candidate beam indicated by the UE triggered report;
- at least one candidate beam of same or different candidate cells;
- quality of the at least one candidate beam;
- information associated with LTM or non-LTM (explicit field or via implicit derivation from other fields); and/or
- Identity associated with UETriggeredCondConfig, comprising triggered condition or parameter, associated with the at least one candidate beam.

The UE triggered report may not indicate one or multiple of the following information:

- a serving cell which is associated with at least one current used/indicated beam and/or at least one candidate beam indicated by the UE triggered report;
- at least one current used/indicated beam of a serving cell other than PCell or SpCell;
- candidate beams of the serving cell associated with different additional PCIs; and/or
- candidate beams of different candidate cells.

In response to (initiating, performing, or completing) the UE triggered LTM, the UE may not indicate one or multiple of the following information, e.g. to current serving cell(s) or to candidate cell(s) selected by the UE itself:

- a serving cell which is associated with at least one current used/indicated beam and/or at least one candidate beam indicated by the UE triggered report;
- at least one current used/indicated beam of a serving cell other than PCell or SpCell;
- candidate beams of the serving cell associated with different additional PCIs; and/or
- candidate beams of different candidate cells.

The UE triggered report (for a serving cell or associated with a serving cell) could be canceled in one or multiple of the following conditions:

- the UE triggered report is transmitted by the UE or is included in a transmission (e.g., MAC Packet Data Unit (PDU) or Transport Block (TB));
- a periodic, semi-persistent, or network requested report is transmitted by the UE. Content of the periodic, semi-persistent, or network requested report and (expected) content of the UE triggered report are (partially) the same.
- MAC reset;
- parameter(s) for the UE triggered report is reconfigured;
- BFR is triggered (for a serving cell or a BFD-RS set). The UE triggered report could be associated with the serving cell or the BFD-RS set;
- a random access procedure for (SpCell or SCell) BFR is initiated;
- at least one current used/indicated beam to be indicated in the UE triggered report is deactivated or becomes non-current used/indicated beam;
- at least one candidate beam to be indicated in the UE triggered report is deactivated or becomes non-candidate beam;
- at least one serving cell associated with the UE triggered report is deactivated or released;
- at least one candidate cell associated with the UE triggered report is deactivated or released;
- PCell change (e.g., Cell, for receiving PDCCH associated with common search space, change);
- MAC CE for LTM (e.g., LTM Cell Switch Command) is received or LTM is initiated; and/or
- A network node is in a power saving state for the UE's serving cell (e.g., cell-Discontinuous Transmission (DTX) Discontinuous Reception (DRX)).

The serving cell could be a PCell, PSCell, SpCell, or SCell (if no explicit exclusion).

The beam could be replaced by an RS or TCI state. The RS could be replaced by a beam or TCI state. The TCI state could be replaced by a beam or RS.

The (UE triggered) report could be an CSI report. The (UE triggered) report could be a MAC CE for CSI.

When one or multiple triggered conditions are fulfilled, the UE could perform a UE triggered LTM to change its serving cell(s) (e.g. PCell, PSCell, and/or SCell(s)) to candidate cell(s).

Concept 1

This concept is to have different triggered conditions for the UE communicating with a single TRP, or with multiple TRPs (in case an identified candidate beam is on the same cell as the currently used beam), and/or LTM (in case the identified candidate beam is on a different cell as the currently used beam). Preferably in certain embodiments, the UE communicating with a single TRP may correspond that the UE performs (UE-specific) downlink reception via a first beam associated with the single TRP. Preferably in certain embodiments, the UE communicating with multiple TRPs may correspond that the UE performs (UE-specific) downlink reception via a first beam and a second beam associated with the multiple TRPs.

Preferably in certain embodiments, for a single TRP scenario, the triggered condition for a UE triggered report may be (based on) that the UE identifies (at least) a first candidate beam with a quality larger than a threshold. Preferably in certain embodiments, the UE triggers a report (for single TRP) without considering the quality of the current used/indicated beam.

Preferably in certain embodiments, for an LTM scenario, the triggered condition for a UE triggered report may be (based on) that the UE identifies (at least) a first candidate beam with good quality and the currently used beam with bad quality. More specifically, the triggered condition for LTM may be (based on) the quality of a first candidate beam with an offset better than the quality of one or both or all currently used/indicated beam(s). For example, the triggered condition for LTM may be (based on) the quality of the first candidate beam plus or minus the offset better than the quality of one or both or all currently used/indicated beam (s). Alternatively and more specifically, the triggered condition for LTM may be (based on) the quality of a first candidate beam being better than a threshold and quality of one or both or all currently used/indicated beam(s) being worse than a second threshold. Preferably in certain embodiments, the triggered condition for LTM could be (pre-) configured per UE, or per serving cell. Preferably in certain embodiments, the UE triggers a report (for LTM) when the triggered condition for LTM is met (preferably in certain embodiments, which may further consider a first number of times with the quality of a first candidate beam being better than a threshold and the quality of one or both or all currently used/indicated beam(s) being worse than a second threshold). Preferably in certain embodiments, the UE triggers a report (for LTM) when the triggered condition for LTM is met (preferably in certain embodiments, which may further consider a first number of times that the quality of a first candidate beam is with an offset better than the quality of one or both or all currently used/indicated beam(s)).

Preferably in certain embodiments, for a multiple TRPs scenario, the triggered condition for a UE triggered report may be based on a per beam based comparison or per beam pair based comparison.

Preferably in certain embodiments, for per beam based comparison, the triggered condition for a UE triggered report may be (based on) that the UE identifies (at least) a first candidate beam with a quality larger than a first threshold or a second candidate beam with a quality larger than a second threshold. Preferably in certain embodiments, the first candidate beam and the second candidate beam correspond to different TRPs. Alternatively and/or preferably in certain embodiments, the triggered condition for a UE triggered report may be (based on) that the UE identifies (at least) a first candidate beam with a quality larger than a first threshold or a second candidate beam with a quality larger than a second threshold.

Preferably in certain embodiments, whether to utilize per beam based comparison or per beam pair based comparison is based on a signal. Preferably in certain embodiments, the signal could be a Radio Resource Control (RRC) configuration, MAC CE, and/or DCI. Preferably in certain embodiments, the signal could comprise one or more parameters (and/or based on the one or more parameters, the UE could determine using a per beam based or per beam pair based comparison). Preferably in certain embodiments, the signal could indicate either a per beam based comparison or a per beam pair based comparison. Preferably in certain embodiments, the signal could indicate enable/disable a per beam based comparison and/or enable/disable a per beam pair based comparison. Preferably in certain embodiments, the signal could be per characteristic. Preferably in certain embodiments, one characteristic could be frequency range (e.g., FR1, FR2, FR2-2, FR3), frequency band, TRP, BWP, serving cell, carrier, UE, beam, beam pair, one kind of report, one report. Preferably in certain embodiments, a same characteristic (e.g., same BWP) may associate with the same operation (e.g., per beam based or per beam pair based comparison) based on the signal per characteristic. Preferably in certain embodiments, different characteristics may associate with the same or different operation based on the signal per characteristic. Preferably in certain embodiments, one or more characteristics may share the signal (e.g., the signal is applied for the one or more characteristics). Preferably in certain embodiments, based on the signal, the UE determines whether to trigger a report based on a beam pair based comparison. Preferably in certain embodiments, for each first kind of report, the UE could be configured with the signal (for indicating whether to trigger the report based on a beam pair based comparison or a beam based comparison).

Preferably in certain embodiments, when the UE receives a TCI state (de)activation MAC CE, wherein the MAC CE indicates association between TCI state(s) and one or more code-points in TCJ field in DCI.

Preferably in certain embodiments, when there is no code-point associated with more than one two same directional TCJ states (e.g., either same DL or same UL), the UE is operating in single TRP operation. Preferably in certain embodiments, the UE receives (beam indication) DCI indicating a first TCJ state via a TCI field of the beam indication DCI. Preferably in certain embodiments, the first TCJ state corresponds to one "indicated TCI state". Preferably in certain embodiments, the UE would determine the currently used TCI state for triggering the UE report based on the one indicated TCI state (e.g., the first TCI state). Preferably in certain embodiments, the first TCI state is on a first serving cell. Preferably in certain embodiments, the UE would receive a UE-specific channel or signal based on the one indicated TCI state (e.g., Quasi Co-location (QCL) assumption with a first RS associated with the first TCI state). Preferably in certain embodiments, the UE could be configured with one or more RSs (and/or one or more TCI states) associated with cell(s). Preferably in certain embodiments, the one or more RSs (or the one or more TCI states) are candidate RSs (or candidate TCI states). Preferably in certain embodiments, the one or more RSs could be configured via one RS list. Preferably in certain embodiments, the cell(s) comprises the first serving cell, a second serving cell, a third cell (which is an additional cell with different PCI, and is associated with the first serving cell), a fourth cell (which is an additional cell with a different PCI, and is associated with the second serving cell), and/or a fifth cell (which is without association with the first or the second serving cell).

Preferably in certain embodiments, the UE determines whether to trigger a first (kind of) report based on both the currently used/indicated TCI state and at least one candidate TCI state. Preferably in certain embodiments, the first (kind of) report may correspond to LTM (i.e., inter cell) or serving beam change (i.e., intra cell). Preferably in certain embodiments, the triggered condition for the first (kind of) report may be (based on) that the quality of the currently used/indicated TCI state is lower than a threshold and the quality of the at least one candidate TCI state is higher than a second threshold. Alternatively, the triggered condition for the first (kind of) report may be (based on) that the quality of the at least one candidate TCI state is with an offset higher than the quality of the currently used/indicated TCI state. Preferably in certain embodiments, once the triggered condition is met, the UE triggers to generate the first (kind of) report and/or transmits the first (kind of) report. Preferably in certain embodiments, the first (kind of) report may correspond to a first sub report that the serving cell changes. Preferably in certain embodiments, the first (kind of) report may correspond to a second sub report that the serving cell does not change. Preferably in certain embodiments, it may depend on whether the candidate RS is associated with the same serving cell (e.g., the first serving cell) or not.

Preferably in certain embodiments, the UE determines whether to trigger a second (kind of) report based on (only) candidate TCI state(s) (without additionally considering the currently used/indicated TCI state). Preferably in certain embodiments, the UE triggers the second (kind of) report when the quality of the candidate TCI state is higher than a third threshold. Preferably in certain embodiments, the UE triggers the second (kind of) report when the quality of the currently used/indicated TCI state is NOT lower than a threshold. Preferably in certain embodiments, the UE triggers the second (kind of) report when the quality of the currently used/indicated TCI state is NOT with an offset lower than the quality of candidate TCI state. Preferably in certain embodiments, in light of the above, the second (kind of) report is not triggered for assisting a network node for serving beam/cell switching. Instead, the second (kind of) report is triggered for assisting the network node for a number of TRP/beam/TCI states scheduling/activating/adding. Preferably in certain embodiments, the second (kind of) report may correspond to the candidate beam addition without a serving beam change. Preferably in certain embodiments, once the triggered condition is met, the UE triggers to generate the second (kind of) report and/or transmits the second (kind of) report.

For example, in FIG. 10, the UE triggers a first (kind of) report when both the quality associated with the candidate RS and the quality associated with the indicated RS are both met. Additionally, the quality associated with the candidate RS and the quality associated with the indicated RS being met may correspond to one counting, and the UE triggers the first (kind of) report when there are a #Number of events (associated with the first kind of report) being met.

In FIG. 10, the UE triggers a second (kind of) report when the quality associated with candidate RS is met and the quality associated with an indicated RS is NOT met. Alternatively, the UE triggers a second (kind of) report when the quality associated with candidate RS is met (no matter if the quality associated with indicated RS is met or not). Additionally, the quality associated with the candidate RS and the quality associated with the indicated RS being met may correspond to one counting, and the UE triggers a second (kind of) report when there are #Number of events (associated with the second kind of report) being met.

Preferably in certain embodiments, the triggered condition for the first (kind of) report or the second (kind of) report may be (further) based on:

- a first number of times that the quality of the currently used/indicated TCI state is lower than a threshold and the quality of the at least one candidate TCI state is higher than a second threshold;
- a second number of times that the quality of the at least one candidate TCI state is with an offset higher than the quality of the currently used/indicated TCI state; or
- a third number of times that the quality of the candidate TCI state is higher than a third threshold.

Preferably in certain embodiments, the first, the second, and the third number of times could be (pre-)configured or specified.

Preferably in certain embodiments, the first, the second, and the third number of times could be (pre-)configured or specified based on UE capability.

Preferably in certain embodiments, the first, the second, and the third number of times could be a different value or the same value.

Preferably in certain embodiments, the third number of times could be smaller than the first, or the second number of times.

Preferably in certain embodiments, the triggered condition for the first (kind of) report or the second (kind of) report may be based on at least information or a configuration associated with the candidate RS.

Figure 11:
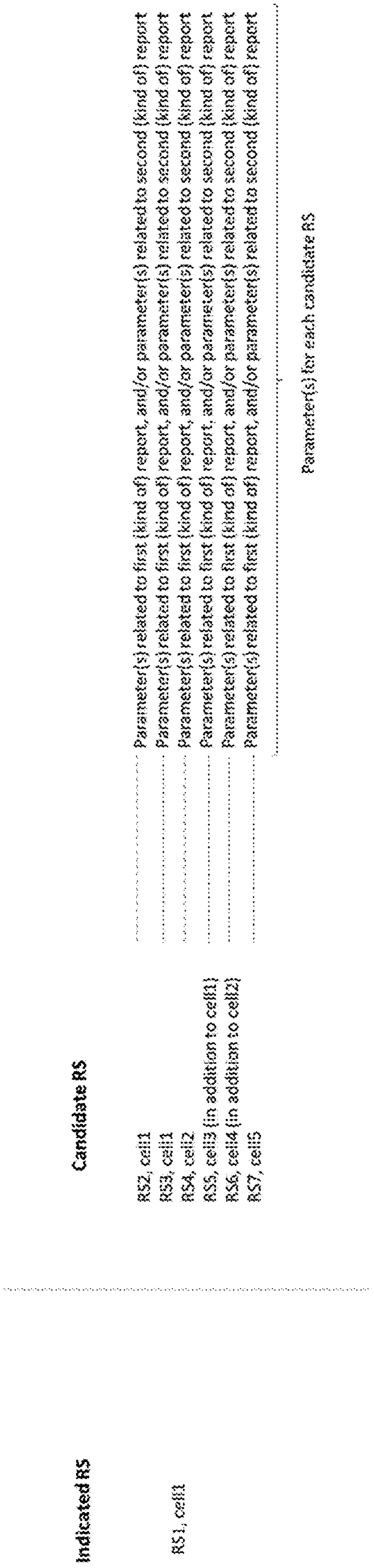
FIG. 11 is an example diagram showing that RS1 on cell1 corresponds to the indicated TCI state, and the UE has or is configured with RS2-7, which are on cell1, 1, 2, 3, 4, 5, respectively, in accordance with embodiments of the present invention.

Preferably in certain embodiments, the RS on a different cell could correspond to the same or a different triggered condition. Preferably in certain embodiments, the RS on the same cell could correspond to the same or a different triggered condition. For example, in FIG. 11, RS1 on cell1 corresponds to the indicated TCI state, and the UE has or is being configured with RS2-7 which are on cell1, 1, 2, 3, 4, 5, respectively. Cell1 and cell2 are serving cells, cell3 and cell4 are additional cells in addition to cell1 and cell2, respectively. Cell5 is a cell with PCI different than the serving cell and without associating with the serving cells (e.g., cell1 and cell2). It could be illustrated that each RS could have associated parameter(s) related to the first (kind of) report, and/or parameter(s) related to the second (kind of) report. Preferably in certain embodiments, a different RS could associate with different parameter(s). Preferably in certain embodiments, a different (kind of) report could associate with the same or a different parameter. In one example, for the second (kind of) report, parameter(s) for candidate RS in the serving cell could be configured with more a frequent triggered condition (e.g., less a number for triggering the report, loose threshold for comparison) than the candidate RS on the non-serving cell (e.g., cell3, 4, 5). For the candidate RS on an additional cell associated with the serving cell may be associated with more a frequent triggered condition than the candidate RS on the cell without association with the serving cell. Preferably in certain embodiments, (even more), the candidate RS on the cell with the same frequency band may be associated with the more frequent triggered condition than the candidate RS on the cell in the different frequency band. Parameter(s) could correspond to #Number of times which is used to trigger the (UE triggered) report, offset (for comparing L1/L3-RSRP), the threshold associated with the candidate RS (also related to the first kind of report) (e.g., threshold_c1 in FIG. 10), the threshold associated with the candidate RS (also related to the second kind of report) (e.g., threshold_c2 in FIG. 10), and/or the threshold associated with the currently used/indicated RS (e.g., threshold in FIG. 10), and/or information related to which kind of report, and/or which explicit indication/signaling for the triggered condition (e.g., eventA3, A4, A5). Alternatively, based on the presence/absence of one or more parameter(s), the UE could determine which triggered condition is used. Preferably in certain embodiments, based on the candidate RS being on the serving cell or not, the UE determines whether the triggered condition is for LTM or not. Preferably in certain embodiments, one time of the #Number of times corresponds to one time instance that the UE identifies that the triggered condition is met. Preferably in certain embodiments, the UE triggers the report when the #Number of times is reached. Preferably in certain embodiments, it could be shown that the UE triggers the report when accumulating enough number of satisfying events. Preferably in certain embodiments, one candidate RS with one indicated RS could correspond to one event. Preferably in certain embodiments, one pair of candidate RSs with one pair of indicated RSs could correspond to one event. Alternatively, there may be no long term check (without the #Number of times), in this case, default times (e.g., 1) would be applied or the UE would trigger the report once the triggered condition is met.

Preferably in certain embodiments, the UE receives a TCI state (de)activation MAC CE, wherein the MAC CE indicates association between TCI state(s) and one or more code-points in a TCI field in DCI.

Preferably in certain embodiments, when there is at least one code-point associated with two same directional TCI states (e.g., either same DL or same UL), the UE is operating in multiple TRP operation. Preferably in certain embodiments, the UE receives a (beam indication) DCI indicating a first TCI state and a second TCI state via a TCI field of the beam indication DCI. Preferably in certain embodiments, the first TCI state or the second TCI state corresponds to two “indicated TCI states”. Preferably in certain embodiments, the first TCI state or the second TCI state corresponds to one pair of “indicated TCI states”. Preferably in certain embodiments, the first TCI state and the second TCI state corresponds to the same direction (e.g., both DL or both UL). Preferably in certain embodiments, the UE would determine the currently used TCI state for triggering the UE report based on the two indicated TCI states (e.g., the first TCI state and the second TCI state). Preferably in certain embodiments, the first TCI state is on a first serving cell. Preferably in certain embodiments, the second TCI state is on a second serving cell. Preferably in certain embodiments, the UE would receive the UE-specific channel or signal based on one or two of the two indicated TCI states (e.g., a QCL assumption with a first RS associated with the first TCI state and/or a QCL assumption with a second RS associated with the second TCI state). Preferably in certain embodiments, the UE could be configured with one or more RSs (and/or one or more TCI states) associated with cell(s). Preferably in certain embodiments, the one or more RSs (or the one or more TCI states) are candidate RSs (or candidate TCI states). Preferably in certain embodiments, the one or more RSs could be configured via one RS list. Preferably in certain embodiments, the one or more RSs could be configured via two RS lists. Preferably in certain embodiments, one of the two RS lists corresponds to a first TRP while another one of the two RS lists corresponds to a second TRP. Preferably in certain embodiments, the triggered condition is based on comparison between an RS in the list and the first or the second indicated TCI states associated with the same TRP. Preferably in certain embodiments, the cell(s) comprises the first serving cell, a second serving cell, a third cell (which is an additional cell with a different PCI, and is associated with the first serving cell), a fourth cell (which is an additional cell with a different PCI, and is associated with the second serving cell), and/or a fifth cell (which is without association with the first or the second serving cell).

Preferably in certain embodiments, the UE determines whether to trigger a first (kind of) report based on one or both currently used/indicated TCI state(s) and at least one candidate TCI state. Preferably in certain embodiments, the first (kind of) report may correspond to LTM (i.e., inter cell) or at least one of the serving beam changes (i.e., intra cell). Preferably in certain embodiments, the triggered condition for the first (kind of) report may be that the quality of at least one of the two currently used/indicated TCI states is lower than a threshold and the quality of the at least one candidate TCI state is higher than a second threshold. Alternatively, the triggered condition for the first (kind of) report may be that the quality of the at least one candidate TCI state is with an offset higher than the quality of at least one of the two currently used/indicated TCI states. Preferably in certain embodiments, once the triggered condition is met, the UE triggers to generate the first (kind of) report and/or transmits the first (kind of) report. Alternatively, the UE determines whether to trigger a first (kind of) report which is associated with LTM based on the TCI state associated with CORESET 0, or based on the TCI state associated with the first indicated TCI state, or based on the TCI state associated with common PDCCH monitoring, or based on the TCI state associated with the serving cell. In other words, the currently used/indicated TCI state (used for determining whether to trigger a first kind of report associated with LTM) corresponds to the TCI state associated with CORESET 0, or the TCI state associated with the first indicated TCI state, or the TCI state associated with common PDCCH monitoring, or the TCI state associated with the serving cell.

Preferably in certain embodiments, the UE could be configured with a per TRP list of RSs. Preferably in certain embodiments, the UE could be configured with two list of RSs. Preferably in certain embodiments, when the UE determines whether to trigger a first (kind of) report, the currently used RS corresponds to the first indicated TCI state and a first candidate RS is among a first list of RSs. Preferably in certain embodiments, when the UE determines whether to trigger a first (kind of) report, the currently used RS corresponds to the second indicated TCI state and a second candidate RS is among a second list of RSs. Preferably in certain embodiments, the first list of RSs is associated with the first indicated TCI state. Preferably in certain embodiments, the second list of RSs is associated with the second indicated TCI state. Preferably in certain embodiments, a cross-list comparison to a non-associated indicated TCI state is not allowed or is prohibited.

Preferably in certain embodiments, the UE determines whether to trigger a second (kind of) report based on (only) the candidate TCI state(s) (without additionally considering the currently used/indicated TCI state). Preferably in certain embodiments, the UE triggers the second (kind of) report when the quality of the candidate TCI state is higher than a third threshold. Preferably in certain embodiments, the UE triggers the second (kind of) report when the quality of the currently used/indicated TCI state is NOT lower than a threshold. Preferably in certain embodiments, the UE triggers the second (kind of) report when the quality of the currently used/indicated TCI state is NOT with an offset lower than the quality of the candidate TCI state. Preferably in certain embodiments, in light of the above, the second (kind of) report is not triggered for assisting the network node for serving beam/cell switching. Instead, the second (kind of) report is triggered for assisting the network node for the number of TRP/beam/TCI states scheduled/activated/added. Preferably in certain embodiments, the second (kind of) report may correspond to the candidate beam addition without serving beam change. Preferably in certain embodiments, once the triggered condition is met, the UE triggers to generate the second (kind of) report and/or transmits the second (kind of) report.

Preferably in certain embodiments, the triggered condition for the first (kind of) report or the second (kind of) report may be based in at least information or the configuration associated with candidate RS. Preferably in certain embodiments, the RS on a different cell could correspond to the same or a different triggered condition. Preferably in certain embodiments, the RS on the same cell could correspond to the same or a different triggered condition. For example, in FIG. 12, it could be illustrated that each RS could have associated parameter(s) related to the first (kind of) report, and/or the parameter(s) related to the second (kind of) report. Preferably in certain embodiments, the different RS could associate with a different parameter(s). Preferably in certain embodiments, a different (kind of) report could associate with the same or a different parameter. In one example, for the second (kind of) report, the parameter(s) for candidate RS in the serving cell could be configured with more frequent triggered conditions (e.g., less the number for triggering the report, loose threshold for comparison) than the candidate RS on non-serving cell (e.g., cell3, 4, 5). For the candidate RS on an additional cell associated with the serving cell may be associated with a more frequent triggered condition than the candidate RS on the cell without association with the serving cell. Preferably in certain embodiments, (even more), the candidate RS on the cell with the same frequency band may be associated with the more frequent triggered condition than the candidate RS on the cell in a different frequency band. Parameter (s) could correspond to the #Number of times which is used to trigger the (UE triggered) report, the offset (for comparing L1/L3-RSRP), the threshold associated with the candidate RS (also related to the first kind of report and the first indicated TCI state) (e.g., threshold_c1 in FIG. 12), the threshold associated with the candidate RS (also related to the first kind of report and the second indicated TCI state) (e.g., threshold_c3 in FIG. 12), the threshold associated with the candidate RS (also related to the second kind of report and the first indicated TCI state) (e.g., threshold_c2 in FIG. 12), the threshold associated with the candidate RS (also related to the second kind of report and the second indicated TCI state) (e.g., threshold_c4 in FIG. 12), and/or the threshold associated with the currently used/indicated RS and the first indicated TCI state (e.g., threshold1 in FIG. 12), the currently used/indicated RS and the second indicated TCI state (e.g., threshold2 in FIG. 12) and/or the information related to which kind of report, and/or which explicit indication/signaling for the triggered condition (e.g., eventA3, A4, A5), the information related to which list with the indicated TCI state (e.g., the first/second indicated TCI state). Alternatively, based on the presence/absence of one or parameter(s), the UE could determine which triggered condition is used. For example, when the parameter associated with the second kind of report (e.g., threshold_c2 and/or threshold_c4) is absent, the triggered condition associated with the first kind report is used. Preferably in certain embodiments, based on the candidate RS being on the serving cell or not, the UE determines whether the triggered condition is for LTM or not. Preferably in certain embodiments, based on one or both currently used/indicated RSs with the quality being lower than the (corresponding) threshold, the UE determines whether the triggered condition is for LTM or not. Preferably in certain embodiments, one time of the #Number of times corresponds to one time instance that the UE identifies that the triggered condition is met. Preferably in certain embodiments, the UE triggers the report when the #Number of times is reached. Preferably in certain embodiments, it could be shown that the UE triggers the report when accumulating enough number of satisfying events. Preferably in certain embodiments, one candidate RS with one indicated RS could correspond to one event. Preferably in certain embodiments, one pair of candidate RSs with one pair of indicated RSs could correspond to one event. Alternatively, there may be no long term check (without the #Number of times), in this case, a default time (e.g., 1) would be applied or the UE would trigger the report once the triggered condition is met.

Figure 12:
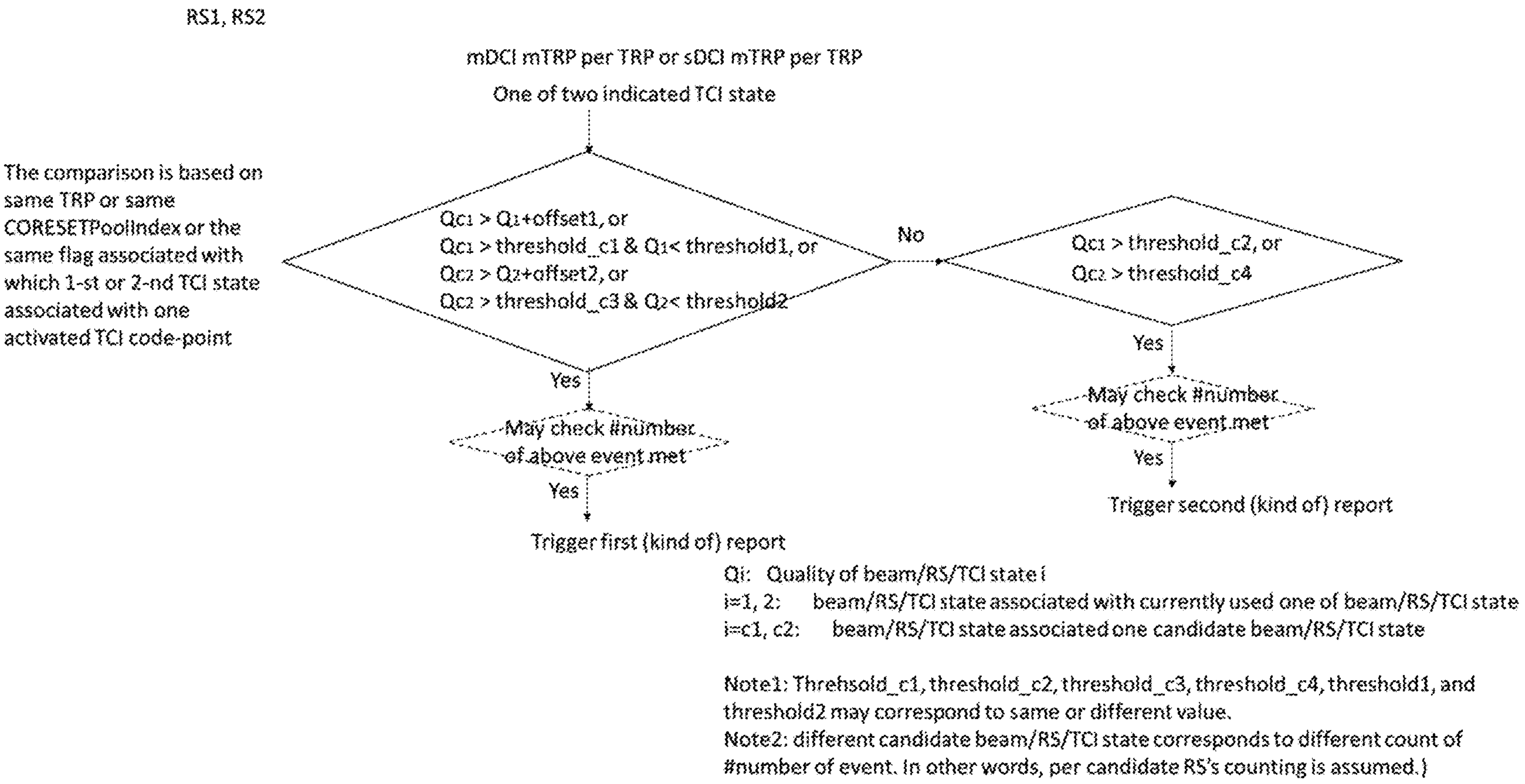
FIG. 12 is an example diagram shows that each RS could have associated parameter(s) related to a first (kind of) report, and/or parameter(s) related to a second (kind of) report, in accordance with embodiments of the present invention.
Figure 13:
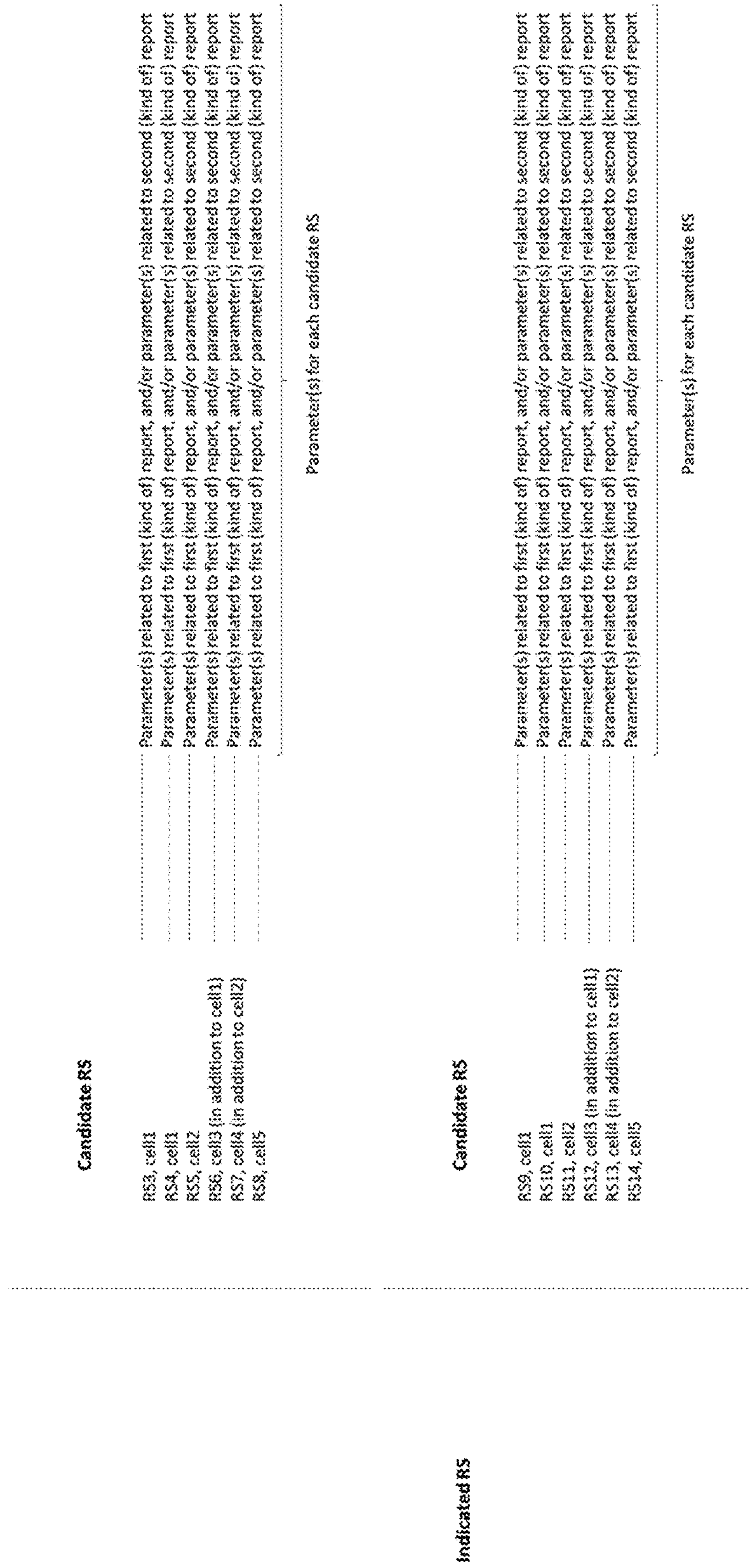
FIG. 13 is an example diagram showing that a UE may be configured with two lists of RSs, in accordance with embodiments of the present invention.

For example, in FIG. 12, similar to single TRP, mTRP operation could be considered as two singe TRP operations, respectively. At least the currently used/indicated TCI state associated with one TRP with the quality being lower than a (corresponding) threshold, the UE triggers the report. The event could be TRP specific configured and satisfied (each TRP could associate with a corresponding event for triggering the report). In one time instance, the UE triggers a first (kind of) report for a first TRP (or for the first indicated TCI state) and a second (kind of) report for a second TRP (or for the second indicated TCI state). The comparison for triggering the first (kind of) report is based on per TRP or per indicated TCI state. In this example, when the UE determines whether to trigger the first (kind of) report for the first TRP, the quality associated with first indicated TCI state is used as Q1, and/or preferably in certain embodiments threshold1 associated with the first indicated TCI state or the first TRP. On the other hand, when the UE determines whether to trigger the second (kind of) report for the second TRP, the quality associated with the second indicated TCI state is used as Q2, and/or preferably in certain embodiments threshold2 associated with the second indicated TCI state or the second TRP. For another example, Qc1 corresponds to the quality associated with a first candidate RS which may be associated with the first TRP. Qc2 corresponds to the quality associated with a second candidate RS which may be associated with the second TRP. Preferably in certain embodiments, the UE may be configured with two lists of RSs as shown in FIG. 13. Preferably in certain embodiments, the first candidate RS is selected or identified or determined or utilized from the first list of RSs (which is associated with the first TRP). Preferably in certain embodiments, the second candidate RS is selected or identified or determined or utilized from the second list of RSs (which is associated with the second TRP). Alternatively, the UE is configured with one list of RSs. Preferably in certain embodiments, the UE determines whether to trigger the first (kind of) report based on the quality of candidate RS comparison to both the currently used/indicated RS. Preferably in certain embodiments, when comparing the quality of the candidate RS and the currently used/indicated RS of both TRPs, at least one currently used/indicated RS of one TRP compared with the candidate RS is determined to trigger the report or determined as an event met. In this example of FIG. 12, Qc1>Q1+offset1, or Qc1>threshold_c1 & Q1<threshold1, or Qc1>Q2+offset2, or Qc1>threshold_c1 & Q2<threshold2, which means Qc1 is used to compare Q1 and A2. And, once Qc1 is better than at least Q1 or Q2, the UE triggers the report.

For example, in FIG. 13, the UE is configured with two lists of RSs, wherein one list of RSs (upper half ones) is associated with the first indicated TCI state (e.g., RS1, cell1) and another one list of RSs (bottom half ones) is associated with the second indicated TCI state (e.g., RS2, cell2).

Alternatively and/or preferably, a beam pair based comparison is utilized. Preferably in certain embodiments, the UE determines whether to trigger a first (kind of) report based on both currently used/indicated TCI state(s) and at least a pair of candidate TCI states comprising a first candidate TCI state and a second candidate TCI state. More specifically, the UE triggers a first (kind of) report when both the quality associated with first candidate TCI state and the quality associated with second candidate TCI state are against/better than a first currently used/indicated TCI state and a second currently used/indicate TCI state, respectively. Preferably in certain embodiments, the UE triggers a second (kind of) report when both the quality associated with first candidate TCI state and the quality associated with second candidate TCI state are against/better than a corresponding threshold. Alternatively, the UE triggers a second (kind of) report when at least the quality associated with the first candidate TCI state is against/better than the corresponding threshold or the quality associated with the second candidate TCI state is against/better than the corresponding threshold. Preferably in certain embodiments, a beam pair based comparison is used to assist the network node for Single Frequency Network (SFN) operation or Coherent Joint Transmission (CJT) operation. Preferably in certain embodiments, it could assist the network node to change a pair of beams instead of changing one beam which may cause interruption that the UE may not receive better performance after changing only one beam.

Figure 14:
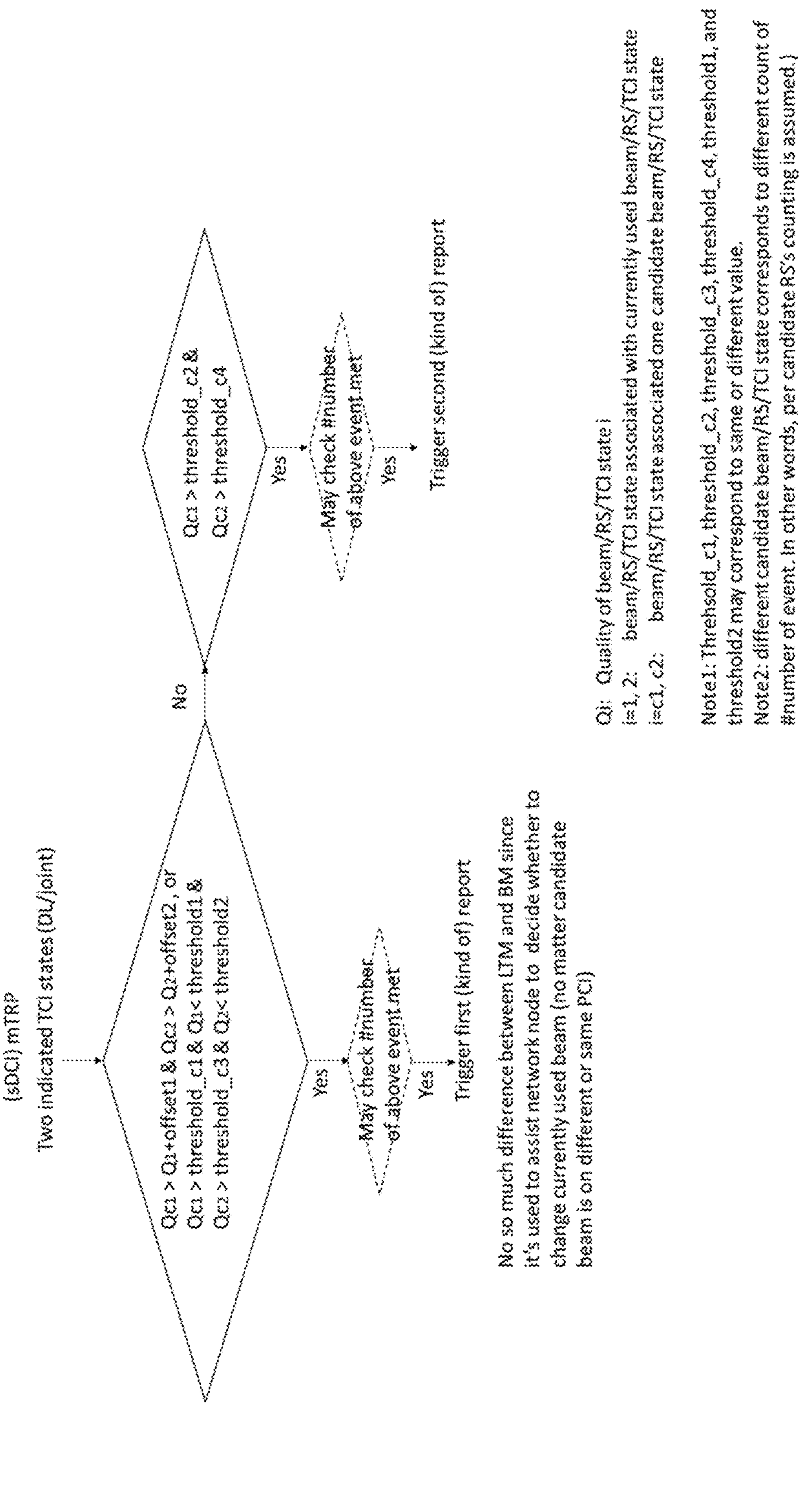
FIG. 14 is an example diagram showing a UE triggering a report based on a beam pair based comparison, in accordance with embodiments of the present invention.

For example, in FIG. 14, the UE triggers the report based on beam pair based comparison. The beam pair based comparison could be used for both the first and second (kind of) report. Alternatively, the beam pair based comparison may be used for only the first (kind of) report. Alternatively, the beam pair based comparison may be used for only the second (kind of) report Preferably in certain embodiments, the first (kind of) report or the second (kind of) report correspond to a UE triggered report.

Preferably in certain embodiments, when the UE receives a TCI state (de)activation MAC CE per CORESETPoolIndex or per TRP, wherein per CORESETPoolIndex MAC CE indicates association between TCI state(s) and one or more code-points in a TCI field in DCI for one CORESETPoolIndex or for one TRP.

Due to non-ideal backhaul for mDCI mTRP (e.g., the UE being configured with CORESETPoolIndex), the triggered condition for the report will be per TRP operation (e.g., mTRP operation could be considered as two singe TRP operations, respectively). The triggered condition for first (kind of) report and the triggered condition for the second (kind of) report could be referred to FIG. 12 and/or the paragraph/disclosure related to FIG. 12. Preferably in certain embodiments, the UE receives a first (beam indication) DCI (for a first TRP, e.g., CORESETPoolIndex=0) indicating a first TCI state (which is the first indicated TCI state or currently used/indicated TCI state) and receives a second DCI (for a second TRP, e.g., CORESETPoolIndex=1) indicating a second TCI state (which is the second indicated TCI state or currently used/indicated TCI state), respectively.

Preferably in certain embodiments, the candidate RS (or TCI state) may have a different priority. Preferably in certain embodiments, the candidate RS on the cell in intra-frequency band may have higher priority than the candidate RS on the cell in inter-frequency band. Preferably in certain embodiments, the candidate RS on the serving cell may have higher priority than the candidate RS on the non-serving cell. Preferably in certain embodiments, the candidate RS without being activated may have higher priority than the candidate RS with being activated (or in activation command). Preferably in certain embodiments, the UE could be configured with a triggering condition for each priority. Preferably in certain embodiments, the UE could be configured with a triggering condition for each candidate RS (or TCI state). Preferably in certain embodiments, priority could correspond to 1-4, with the lower value having higher priority.

Preferably in certain embodiments, priority here could be used as an order for including in one time instance (or in one report). Preferably in certain embodiments, when a capacity of resources for the one (UE triggered) report cannot include all triggered candidate RSs (associated with the first/second kind of report), the UE prioritizes to include the candidate RS or report associated with the candidate RS or triggered condition based on from higher priority to lower priority. Preferably in certain embodiments, for the candidate RS with lower priority, the UE does not include information or the triggered report associated with the candidate RS into resources for the one (UE triggered) report.

Preferably in certain embodiments, a different candidate RS (or TCI state) may have a different condition for triggering the report. Preferably in certain embodiments, the candidate RS on the serving cell, or (already) in activation command could be configured with a condition which is more frequently triggered for reporting than the candidate RS on an additional cell or the non-serving cell or NOT in activation command. Preferably in certain embodiments, the candidate RS with higher priority may be configured with a smaller number of times (of event being met) for triggering the report than the candidate RS with lower priority.

Preferably in certain embodiments, whether the UE transmit a (UE triggered) report may depend on whether the MAC PDU could comprise the first (kind of) report or not.

Preferably in certain embodiments, once triggering a (UE triggered) report, the UE would generate the (UE triggered) report. Preferably in certain embodiments, the UE generates the (UE triggered) report by setting content associated with the current used/indicated TCI state, one or more candidate TCI states. Preferably in certain embodiments, the content of the (UE triggered) report may comprise the quality of the used/indicated TCJ state, the quality of the one or more candidate TCI states, explicit indication of first or second (kind of) reports, the triggered condition, the cell Identity (ID) (of triggered cell), a BWP ID, and/or a number of triggered events in one reporting instance. Preferably in certain embodiments, the content of the (UE triggered) report may comprise information associated with which TRP or which indicated TCI state (e.g., either the first indicated or the second indicated TCI state) is associated with the (UE triggered) report.

Preferably in certain embodiments, one reporting instance may associate with the (UE triggered) report of one or more triggered events. Preferably in certain embodiments, one reporting instance may associate with the (UE triggered) report of one or more triggered cells and/or BWPs. Preferably in certain embodiments, one reporting instance may associate with one or more first (kind of) reports and/or second (kind of) reports. Preferably in certain embodiments, one reporting instance may associate with merely the same kind of (triggered) report. Preferably in certain embodiments, one reporting instance means or correspond to the same timing's reporting.

Preferably in certain embodiments, the UE is configured with one RS list. Preferably in certain embodiments, the one RS list is for the triggering report. Preferably in certain embodiments, the RS in the one RS list could be configured with information of the triggered condition. Preferably in certain embodiments, the triggered condition could be a check candidate RS only, or check both candidate RSs and serving RSs. Preferably in certain embodiments, the triggered condition is associated with a single TRP scenario, a multiple TRP scenario, LTM. Preferably in certain embodiments, when the UE is configured with the RS associated with a certain triggered condition, the triggered report may not comprise information associated with the triggered condition (as RS index in the one RS list could refer to the triggered condition). Alternatively, the UE could be configured with one RS list for LTM and another RS list for non-LTM. Preferably in certain embodiments, for the one RS list for LTM, the RS in the RS list is on one or more cell(s) which is different than the serving cell and preferably in certain embodiments the additional cell. Preferably in certain embodiments, for the other/another one RS list for non-LTM, the RS in the RS list is on one or more cell(s) which is the serving cell and preferably in certain embodiments the additional cell. For the single TRP scenario, the UE could be configured with one RS list comprising the RS associated with the serving cell and another RS list comprising the RS different than the serving cell (i.e., non-serving cell or cell(S) with additional PCI).

Alternatively, the UE could be configured with two RS lists, wherein one RS list is for determining whether the currently/used beam is bad or not, and another one RS list is for determining the candidate beam. Preferably in certain embodiments, the two lists are configured per TRP (e.g., one TRP is configured with two RS lists). Preferably in certain embodiments, each RS list could be configured with information associated with one triggered condition. Preferably in certain embodiments, each RS in one RS list could be configured with information associated with one triggered condition.

Preferably in certain embodiments, the one or more indicated TCI state(s) are indicated by the same beam indication DCI.

Preferably in certain embodiments, the UE receives a first beam indication DCI indicating a first TCI state.

Preferably in certain embodiments, when there is no code-point comprising more than one same direction TCI state, and the UE receives a second beam indication DCI indicating a second TCI state, the UE performs UE-specific reception based on the second TCI state (which is changed from the first TCI state to the second TCI state), and preferably in certain embodiments after a specific timing. Preferably in certain embodiments, the specific timing corresponds to the timing that the UE applied the second TCI state (which is a beam application time after timing for transmitting Hybrid Automatic Repeat Request (HARQ) associated with the second beam indication DCI). Preferably in certain embodiments, the first TCI state could be the currently used/indicated TCJ state for determining whether to trigger the report (before the specific timing). Preferably in certain embodiments, the second TCI state could be the currently used/indicated TCI state for determining whether to trigger the report (after the specific timing).

Preferably in certain embodiments, the UE receives a first beam indication DCI indicating a first TCI state and a third TCI state (with the same direction).

Preferably in certain embodiments, when there is at least one code-point comprising more than one same direction TCI state, and the UE receives a second beam indication DCI indicating a second TCI state (for updating either the first or the third TCI state), the UE performs UE-specific reception based on the second TCI state (which is a change from either the first TCI state or the third TCI state to the second TCI state), and preferably in certain embodiments after a specific timing. Preferably in certain embodiments, the specific timing corresponds to the timing that the UE applied the second TCI state (which is a beam application time after timing for transmitting HARQ associated with the second beam indication DCI). Preferably in certain embodiments, the first TCI state and the third TCI state could be the currently used/indicated TCI state for determining whether to trigger the report (before the specific timing). Preferably in certain embodiments, based on which TCI state is updated by the second TCI state, (the first TCI state and the second TCI state) or (the third TCI state and the second TCI state) could be the currently used/indicated TCI state for determining whether to trigger the report (after the specific timing).

For example, one or multiple of the following triggered conditions for a UE triggered report could be used by the UE, e.g., for a non-LTM scenario and/or for a single TRP scenario:

- the quality of at least one candidate beam (plus or minus offset(s)) of a serving cell is larger than (or equal to) a threshold;
- the quality of at least one current used/indicated beam (plus or minus offset(s)) of a serving cell is smaller than (or equal to) a threshold;
- the quality of at least one candidate beam (plus or minus offset(s)) of a serving cell is larger than (or equal to) the quality of at least one current used/indicated beam (plus or minus offset(s)) of the serving cell;
- beam(s)/TCI state(s)/RS(s) to be indicated by the UE triggered report associated with a serving cell is different from that indicated by the last transmitted (UE-triggered, periodic, aperiodic, or semi-persistent) report associated with the serving cell; and/or
- the quality of beam(s)/TCI state(s)/RS(s) to be indicated by the UE triggered report (plus or minus offset(s)) is different from (e.g., larger than (or equal to) or smaller than (or equal to)) the quality of the beam(s)/TCI state(s)/RS(s) indicated by the last transmitted (UE-triggered, periodic, aperiodic, or semi-persistent) report (plus or minus offset(s)).

For example, one or multiple of the following triggered conditions for a UE triggered report could be used by the UE, e.g., for non-LTM scenario and/or for multiple TRP scenario:

- the quality of at least one current used/indicated beam (plus or minus offset(s)) of a serving cell is smaller than (or equal to) a threshold;
- the quality of at least one candidate beam (plus or minus offset(s)) of a serving cell is larger than (or equal to) the quality of at least one current used/indicated beam (plus or minus offset(s)) of the serving cell (and preferably in certain embodiments, the at least one candidate beam of the serving cell and the at least one current used/indicated beam of the serving cell are associated with the same TRP or the same UE panel). Preferably in certain embodiments, operation of multiple TRP still works if the at least one current used/indicated beam is replaced by the at least one candidate beam which both are associated with the same TRP or the same UE panel;

beam(s)/TCI state(s)/RS(s) to be indicated by the UE triggered report associated with a serving cell is different from that indicated by the last transmitted (UE-triggered, periodic, aperiodic, or semi-persistent) report associated with the serving cell; and/or the quality of beam(s)/TCI state(s)/RS(s) to be indicated by the UE triggered report (plus or minus offset(s)) is different from (e.g., larger than (or equal to) or smaller than (or equal to)) the quality of the beam(s)/TCI state(s)/RS(s) indicated by the last transmitted (UE-triggered, periodic, aperiodic, or semi-persistent) report (plus or minus offset(s)).

For example, one or multiple of the following triggered conditions for a UE triggered report could be used by the UE, e.g., for LTM scenario:

the quality of at least one candidate beam (plus or minus offset(s)) of a candidate cell is larger than (or equal to) a threshold;

the quality of at least one candidate beam (plus or minus offset(s)) of a candidate cell is larger than (or equal to) the quality of at least one current used/indicated beam (plus or minus offset(s)) of PCell or SpCell (e.g., not considering PSCell or SCell(s));

beam(s)/TCI state(s)/RS(s) to be indicated by the UE triggered report associated with a candidate cell is different from that indicated by the last transmitted (UE-triggered, periodic, aperiodic, or semi-persistent) report associated with the candidate cell; and/or the quality of beam(s)/TCI state(s)/RS(s) to be indicated by the UE triggered report (plus or minus offset(s)) is different from (e.g., larger than (or equal to) or smaller than (or equal to)) the quality of the beam(s)/TCI state(s)/RS(s) indicated by the last transmitted (UE-triggered, periodic, aperiodic, or semi-persistent) report (plus or minus offset(s)).

Which triggered condition for a UE triggered report is to be enabled (e.g., used by the UE) could be based on a configuration from the network, e.g., network explicitly indicates which triggered condition to be enabled. Parameter (s), e.g., threshold(s) and/or offset(s), of a triggered condition for a UE triggered report could be configured by the network. Whether the triggered condition for a UE triggered report is enabled (e.g., used by the UE) could be based on whether the UE is configured with a configuration for LTM (e.g., candidate cell(s)/configuration(s) for LTM) and/or whether the UE is served by multiple TRP (beam(s)/TCI state(s)/RS(s) associated with the multiple TRPs are activated) or configured with configuration for multiple TRPs (e.g., more than one CORESET pools for a serving cell), e.g., the network does not explicitly indicate which triggered condition is to be enabled.

A triggered condition for a UE triggered report applicable to (or allowed to be configured for) one of the scenarios may not be applicable to (or not be allowed to be configured for) another one of the scenarios. The scenarios include single TRP, multiple TRP, and/or LTM.

The format of a UE triggered report for one of the scenarios may be different from that for another one of the scenarios. The scenarios include single TRP, multiple TRP, and/or LTM.

A UE triggered report not for LTM may indicate a serving cell which is associated with at least one current used/indicated beam and/or at least one candidate beam indicated by the UE triggered report. A UE triggered report for LTM may not indicate the serving cell.

Preferably in certain embodiments, throughout this disclosure, "A of B" could be replaced by "A which is associated with B".

Preferably in certain embodiments, throughout this disclosure, "A for B" could be replaced by "A which is associated with B".

Preferably in certain embodiments, throughout this disclosure, "quality of A", or "quality associated with A" corresponds to the channel quality measured based on A.

Preferably in certain embodiments, throughout this disclosure, "quality" may be L1-RSRP, L3-RSRP (which is with long term average), L1-Signal to Interference plus Noise Ratio (SINR), L3-SINR (which is with long term average).

Preferably in certain embodiments, throughout this disclosure, "beam" could be replaced by "TCI state", "spatial relation", "spatial filter", "QCL (type-D) assumption" or "RS".

Preferably in certain embodiments, throughout this disclosure, "RS" and "TCI state" could be replaced vice versa, which means the source RS of the TCI state is the RS.

Preferably in certain embodiments, throughout this disclosure, threshold corresponds to RSRP threshold or SINR threshold based on which quality is defined or specified.

Preferably in certain embodiments, throughout this disclosure, "one currently used/indicated RS" could be replaced by "one serving RS".

Preferably in certain embodiments, the first (kind of) report or the second (kind of) report corresponds to the UE triggered report.

Preferably in certain embodiments, the RS could be Synchronization Signal (SS)-Physical Broadcast Channel (PBCH), CSI-RS for CSI, CSI-RS for tracking, or CSI-RS for beam management.

Preferably in certain embodiments, RS could be replaced by RS resource.

Preferably in certain embodiments, throughout this disclosure, the currently used beam may be applied or may be on a PCell, PSCell, or SCell.

Preferably in certain embodiments, throughout this disclosure, "beam" could be replaced by "beam of a cell", or vice versa.

Preferably in certain embodiments, throughout this disclosure, beam A and beam B being associated with the same TRP or the same UE panel may correspond that beam A and beam B are associated with the same CORESETPoolIndex.

Preferably in certain embodiments, throughout this disclosure, beam A and beam B being associated with the same TRP or the same UE panel may correspond that beam A and beam B are associated with the same order of indicated TCI states (e.g., 1-st indicated TCI state or 2-nd indicated TCI state).

Preferably in certain embodiments, throughout this disclosure, "indicated TCI state" corresponds to "one or more TCI states associated with a same code-point of a TCI field in one beam indication DCI".

Preferably in certain embodiments, throughout this disclosure, for each code-point of a TCI field in DCI comprising a TCI state p and a TCI state q associated with the same direction, TCI state p or TCJ state q with a lower octet index in the TCI state (de)activation MAC CE is or corresponds to or is associated with the first TRP and TCI state p or TCI state q with a higher octet index in the TCI state (de) activation MAC CE is or corresponds to or is associated with the second TRP.

Alternatively, throughout this disclosure, for each codepoint of the TCI field in DCI comprising TCI state p and TCI state q associated with the same direction, the TCI state (de)activation MAC CE provides information that TCI state p or TCI state q corresponds to or is associated with the first TRP or the second TRP.

Preferably in certain embodiments, throughout this disclosure, when the beam indication DCI indicates a TCI state associated with the first TRP, the TCI state associated with the first TRP is or corresponds to a 1-st (or first) indicated TCJ state.

Preferably in certain embodiments, throughout this disclosure, when the beam indication DCI indicates a TCI state associated with the second TRP, the TCI state associated with the second TRP is or corresponds to a 2-nd (or second) indicated TCI state.

Preferably in certain embodiments, throughout this disclosure, one UE panel is associated with one TRP or the first TRP is associated with the first UE panel and the second TRP is associated with the second UE panel.

Preferably in certain embodiments, throughout this disclosure, the beam indication DCI corresponds to or could be replaced by a DCI format with a TCI field indicating a different TCI state for at least one TRP.

More specifically, the DCI format corresponds to DCI format 1_1 or DCI format 1_2, and/or the DCI format will schedule, or without scheduled downlink assignment or PDSCH.

Preferably in certain embodiments, throughout this disclosure, the quality of the currently used/indicated beam could be determined via one or more beams. Preferably in certain embodiments, the quality of the currently used/indicated beam could be the average quality of all RSs in an RS list.

Preferably in certain embodiments, the UE could be configured with or enabled with the UE triggered report.

Preferably in certain embodiments, the UE has capability to support the UE triggered report.

Preferably in certain embodiments, throughout this disclosure, the currently used beam for LTM may be applied or may be on PCell, or PSCell. Preferably in certain embodiments, for beam for SCell operation, the UE does not trigger the report for LTM for the SCell.

Preferably in certain embodiments, throughout this disclosure, the currently used beam for sTRP or mTRP (no matter which cell) could be applied or may be on PCell, PSCell, or SCell.

Preferably in certain embodiments, a network node or a serving cell will indicate whether to enable the UE triggered report.

Preferably in certain embodiments, the UE triggered report is based on L1/L2 signaling.

Preferably in certain embodiments, once RRC or L3 signaling is enabled/configured, the UE will not use a further L3 signal for the UE triggered report.

Preferably in certain embodiments, throughout this disclosure, (average) the quality of all of the at least one current used/indicated beams could be with a weighting factor. Preferably in certain embodiments, the quality of the current used/indicated beam in timing x, and the quality of the current used/indicated beam in timing y are both used for (average) the quality of all of the at least one current used/indicated beams.

Preferably in certain embodiments, both timing x and timing y are earlier than the current timing, when timing x is closer to the current timing than timing y, weighting for the quality of the current used/indicated beam in timing x is provided with more weighting.

Preferably in certain embodiments, throughout this disclosure, one UE panel could be replaced by one (logical) antenna port comprising a set of antenna elements. Preferably in certain embodiments, a different UE panel could associate with a different (logical) antenna port. Preferably in certain embodiments, the antenna port could be used for SRS transmission, PUCCH transmission, PUSCH transmission, PDSCH reception, PDCCH reception, CSI-RS reception, and/or SS-PBCH reception.

Concept 2

This concept is to determine the object of the RS or the TCI state to be used for determining for triggering the report (e.g., used for determining whether a triggered condition for a UE triggered report is fulfilled). Preferably in certain embodiments, a different (triggered condition for) UE triggered report is based on or associated with a same or different RS or TCI state.

For the currently used/indicated TCJ state (or RS), it could be the first indicated TCI state and/or the second indicated TCI state by one or more beams indicating DCI.

For the currently used/indicated TCI state (or RS), it could be configured by an RS list. Preferably in certain embodiments, the RS list is configured per UE, or per carrier or per BWP or per TRP. Preferably in certain embodiments, the RS list may comprise the RS associated with the indicated TCI state via a beam indication DCI. Preferably in certain embodiments, the RS list may comprise the RS associated with CORESET 0, or CORESET with common search space.

For the currently used/indicated TCI state (or RS), it could be determined from a beam failure detection RS list.

For the currently used/indicated TCI state (or RS), the UE maintains or records or utilizes an RS list. Preferably in certain embodiments, the RS list is determined based on the TCI state for the common DL channel or the signal and/or the UE-specific DL channel or signal. Preferably in certain embodiments, the RS list is determined based on the TCI state for a first set of DL channels or the signal without using/applying a unified TCI state and/or a second set of DL channels or signals with using/applying unified TCI state. For example, CORESET 0 is associated with TCI state x, beam indication DCI indicates TCJ state y, then the currently used/indicated TCJ state (or RS) could be the TCI state x and the TCJ state y (e.g., the maintained RS list comprises TCI state x and TCI state y). More specifically, the first set of DL channels or signals comprises CORESET 0, CORESET associated with the common search space (e.g., for paging, for system information, for RAR), and/or CSI-RS. In some examples, CSI-RS for beam management is not used as the currently used/indicated TCI state (preferably in certain embodiments, the reason is such that CSI-RS is for potential beam changes or updates). In some examples, CSI-RS for tracking is not used as the currently used/indicated TCI state. Preferably in certain embodiments, the unified TCI state corresponds one or more joint/DL TCI states via one or more beam indication DCIs.

Preferably in certain embodiments, the UE would trigger the report when the quality of at least one of the RSs in the RS list is worse. Preferably in certain embodiments, the UE would trigger the report when the quality of all RSs in the RS list is worse. Preferably in certain embodiments, the triggered condition may be further based on one or more candidate TCI states. Preferably in certain embodiments, the threshold for LTM and the threshold for beam management may correspond to a different value. Preferably in certain embodiments, the quality of at least one RS is worse may correspond that the quality of the at least one RS is with an offset lower than the quality of a candidate RS or the quality of the at least one RS is lower than a threshold.

For the currently used/indicated TCI state (or RS), when the UE is configured with an RS list associated with the UE triggered report, the currently used/indicated TCI state (or RS) is determined based on the RS list. For the currently used/indicated TCI state (or RS), when the UE is NOT configured with an RS list associated with the UE triggered report (and the UE is configured with or enabled with the UE triggered report), the currently used/indicated TCI state (or RS) is determined based on the indicated TCI state and/or the activated TCI state and/or the TCI state for CORESET monitoring.

For the candidate RS, the UE could be configured with one candidate RS list associated with the UE triggered report. Preferably in certain embodiments, the one candidate RS list comprises one or more or a subset from CSI-RS-ResourceConfigMobility or CSI-ResourceConfig or CSI-SSB-ResourceSet, or NZP-CSI-RS-ResourceSet or configuration/information associated with an SS-PBCH index. Alternatively, the UE would maintain one candidate RS list associated with the UE triggered report.

For the candidate RS, the UE could be configured with one or more lists of candidate RSs. Preferably in certain embodiments, a first list of the one or more lists of candidate RSs is associated with the candidate RS for the UE triggered report associated with LTM. Preferably in certain embodiments, a second list of the one or more lists of candidate RSs is associated with the candidate RS for the UE triggered report associated with a single TRP (and preferably in certain embodiments, multiple TRPs). Preferably in certain embodiments, a third list of the one or more lists of candidate RSs is associated with the candidate RS for the UE triggered report associated with multiple TRPs.

When the UE is configured with one or more candidate RS lists, the UE determines the candidate RS for the UE triggered report based on the one or more candidate RS lists. When the UE is NOT configured with one or more candidate RS lists, the UE determines the candidate RS for the UE triggered report based on the RS associated with one or more CSI reporting configurations (e.g., CSI-ReportConfig). Preferably in certain embodiments, especially the one or more CSI reporting configurations corresponds to reportQuantity being at least associated with RSRP. Alternatively, when the UE is NOT configured with one or more candidate RS lists, the UE determines the candidate RS for the UE triggered report based on CSI-RS-ResourceConfigMobility or CSI-ResourceConfig or CSI-SSB-ResourceSet, or NZP-CSI-RS-ResourceSet or configuration/information associated with an SS-PBCH index. Alternatively, the UE determines the candidate RS for the UE triggered report based on a subset of RSs from CSI-RS-ResourceConfigMobility or CSI-ResourceConfig or CSI-SSB-ResourceSet, or NZP-CSI-RS-ResourceSet or configuration/information associated with the SS-PBCH index. In one example, a specific parameter would be configured per candidate RS, and/or based on the specific parameter (enable or presence/absence), the UE determines whether one candidate RS is used or applied or determined for the UE triggered report. Preferably in certain embodiments, the UE is configured with a maximum number of candidate RSs for the UE triggered report. Preferably in certain embodiments, the maximum number of candidate RSs for the UE triggered report could be up to UE capability. Preferably in certain embodiments, a different candidate cell could have a different maximum number of candidate RSs for the UE triggered report.

Preferably in certain embodiments, one UETriggeredCondConfig could refer to a triggered condition. Preferably in certain embodiments, (parameter(s) related to the first (kind of) the report and/or parameter(s) related to the second (kind of) report in) one UETriggeredCondConfig comprise association with one or more candidate RSs, quality type (e.g., RSRP, SINR), one or more thresholds (for the currently used/indicated beam, and/or for the one or more candidate RSs), one or more offset (for currently used/indicated beam, and/or for the one or more candidate RSs), the first or second TRP, the first (kind of) TRP or the second (kind of) TRP, a beam based trigger or a beam pair based trigger, and/or LTM or non-LTM. In one example, one UETriggeredCondConfig corresponds to parameter(s) related to the first (kind of) report and/or the parameter(s) related to the second (kind of) report (e.g., one entry in which associating the one RS in FIG. 11, or FIG. 13, could be one UETriggeredCondConfig).

Preferably in certain embodiments, the UE could be configured with one or more UETriggeredCondConfig. Preferably in certain embodiments, each UETriggeredCondConfig comprises the parameter(s) related to the first (kind of) report or parameter(s) related to the second (kind of) report. Preferably in certain embodiments, the UE would be configured with association between one UETriggeredCondConfig, and one candidate RS. Preferably in certain embodiments, for UETriggeredCondConfig being associated with the first (kind of) report, the UE would use such a condition also comparing to the currently used/indicated RS. Preferably in certain embodiments, for UETriggeredCondConfig being associated with the second (kind of) report, the UE would use such a condition also comparing to the currently used/indicated RS. Preferably in certain embodiments, distinguish of UETriggeredCondConfig associated with the first (kind of) report and the second (kind of) report may be based on an explicit parameter's indication or absence/presence of a parameter (e.g., whether there is a second threshold for comparing the currently used RS). Preferably in certain embodiments, UETriggeredCondConfig may comprise which root cause (triggered reason, e.g., LTM, beam management) or one UETriggeredCondConfig is associated with one triggered condition. Preferably in certain embodiments, when UETriggeredCondConfig is associated with the first (kind of) report, the UE determines whether to trigger the report based on the quality of both the current used/indicated RS and the candidate RS associated with one UETriggeredCondConfig. Preferably in certain embodiments, one UETriggeredCondConfig corresponds to either LTM or non-LTM. Preferably in certain embodiments, one UETriggeredCondConfig corresponds to one triggered condition.

Preferably in certain embodiments, one CSI-RS resource set or one CSI-RS resource (associated with CSI-ResourceConfig or CSI-RS-ResourceConfigMobility) is configured to be associated with one UETriggeredCondConfig (e.g., it could be associated with an identity of UETriggeredCondConfig). Preferably in certain embodiments, the one CSI-RS resource set or the one CSI-RS resource associated with the one UETriggeredCondConfig could be used or utilized or determined as the candidate RS for the UE triggered report. For example, when the quality of all or at least part of or at least one RS among the one CSI-RS resource set is higher than a threshold (if UETriggeredCondConfig is not associated with the currently used/indicated RS), the UE would trigger the report. For another example, when the quality of the currently used/indicated RS is worse and the quality of all or at least part of or at least one RS among the one CSI-RS resource set is better (if UETriggeredCondConfig is associated with the currently used/indicated RS), the UE would trigger the report. Preferably in certain embodiments, for the one CSI-RS resource set or one CSI-RS resource configured to be associated with one UETriggeredCondConfig, the UE transmits reports associated with the one CSI-RS resource set or the one CSI-RS based on an associated CSI-ReportConfig and also an associated UETriggeredCondConfig. Preferably in certain embodiments, for a second one CSI-RS resource set or second one CSI-RS resource without being configured to be associated with one UETriggeredCondConfig, the UE transmits reports associated with the second one CSI-RS resource set or the second one CSI-RS based on associated CSI-ReportConfig. Preferably in certain embodiments, the one CSI-RS resource set or the one CSI-RS resource being configured to be associated with one UETriggeredCondConfig corresponds to a CSI-RS resource for beam management or associated with a CSI report with quantity associated with RSRP.

Alternatively, one UETriggeredCondConfig is associated with one CSI-RS resource or one CSI-RS resource set (e.g., one UETriggeredCondConfig may comprise an identity of one CSI-RS resource or one CSI-RS resource set). Based on which RS is associated with the one UETriggeredCondConfig, the UE determines the candidate RS for triggering the report. For an RS NOT associated with any UETriggeredCondConfig, such RS cannot be used for triggering the report.

Alternatively, one CSI-ReportConfig may be configured with association with UETriggeredCondConfig (e.g., one CSI-ReportConfig may comprise the identity of UETriggeredCondConfig). Based on which RS is associated with the one CSI-ReportConfig being configured with association with UETriggeredCondConfig, the UE determines the candidate RS for triggering the report.

For the RS associated with another CSI-ReportConfig without being configured with association with UETriggeredCondConfig, such RS cannot be used for triggering the report. Preferably in certain embodiments, for the one CSI-ReportConfig being configured with association with UETriggeredCondConfig, the UE may transmit the UE triggered report in addition to one or more CSI reports according to CSI-ReportConfig based on a periodic/aperiodic/semi-persistent way.

Preferably in certain embodiments, one or more CSI-ReportConfigs could associate a same UETriggeredCondConfig. Preferably in certain embodiments, one or more UETriggeredCondConfigs could associate same a CSI-ReportConfig.

Preferably in certain embodiments, the first (kind of) report is configured or set or specified with higher priority than the second (kind of) report. Preferably in certain embodiments, the UE will prioritize to include the first (kind of) report into a MAC PDU than the second (kind of) report (especially when the size of the MAC PDU cannot accommodate both the first and second kind of report).

Preferably in certain embodiments, one UETriggeredCondConfig may comprise a parameter associated with the first TRP or the second TRP.

Preferably in certain embodiments, one UETriggeredCondConfig may comprise a parameter associated with the first UE panel or the second UE panel.

Preferably in certain embodiments, the UE determines whether to trigger a beam pair based report based on associated CSI-ReportConfig (e.g., groupBasedBeamReporting-v1710). Preferably in certain embodiments, this method is an implicit way to determine whether to trigger the beam pair based report based on CSI-ReportConfig rather than (directly) based on UETriggeredCondConfig. Preferably in certain embodiments, when UETriggeredCondConfig is associated with a CSI-ReportConfig being configured with group based beam reporting, the UE triggers the report when the quality of both the candidate RS in a pair of candidate RSs is better than a corresponding threshold(s) (at least for the second kind of report).

Alternatively, the UE determines whether to trigger a beam pair based report based on a specific parameter. Preferably in certain embodiments, the specific parameter is configured in UETriggeredCondConfig. Preferably in certain embodiments, the specific parameter is used to configure or enable a beam pair based triggered condition. With this specific parameter indicating enabled, the triggered condition is at least based on the quality of both RSs in one pair of RSs. In one example, the specific parameter being enabled is configured simultaneously with associated CSI-ReportConfig being configured with a group based beam reporting (e.g., groupBasedBeamReporting-v1710). With this specific parameter indicating enabled, the triggered condition is at least based on the quality of both RSs in one pair of RSs. In one example, the specific parameter being denable is NOT associated with CSI-ReportConfig being NOT configured with a group based beam reporting (e.g., groupBasedBeamReporting-v1710). In one example, a joint configuration of indicating the first TRP, the second TRP, or both TRPs is used or configured in one UETriggeredCondConfig. Preferably in certain embodiments, when one UETriggeredCondConfig with such joint configuration indicating the first TRP, the RSs associated with UETriggeredCondConfig are used as the candidate RS associated with the first TRP for triggering the report, and/or in other words, quality comparison between the current used/indicated RS and the candidate RS, if any, are applied for the first TRP. Preferably in certain embodiments, the triggered report (according to UETriggeredCondConfig with such joint configuration indicating the first TRP) is associated with first TRP and/or the triggered condition is based on the quality of the first TRP. On the other hand, when UETriggeredCondConfig with such joint configuration indicating the second TRP, the triggered report is associated with the second TRP and/or the triggered condition is based on the quality of the second TRP. In the last, when UETriggeredCondConfig with such joint configuration indicating both TRPs (or a beam pair based report), the triggered report is associated with both the TRP and/or the triggered condition is at least based on the quality of both TRPs. Alternatively, whether UETriggeredCondConfig is associated with the first or the second TRP and whether to have/enable the beam pair based report corresponds to different configurations/parameters (in one UETriggeredCondConfig).

Alternatively and/or preferably, whether a UETriggeredCondConfig is associated with the first TRP or the second TRP is based on an associated RS or RS set is configured or associated with the first TRP or the second TRP. Preferably in certain embodiments, when an CSI-RS resource or an CSI-RS resource set is configured with or associated with the first TRP, once the UETriggeredCondConfig is associated with the CSI-RS resource or the CSI-RS resource set, the UETriggeredCondConfig is associated with the first TRP. Preferably in certain embodiments, the triggered report (according to UETriggeredCondConfig with RS associated with the first TRP) is associated with the first TRP and/or the triggered condition is based on the quality of the first TRP. Preferably in certain embodiments, quality comparison is based on a used/indicated RS and the candidate RS associated with the first TRP. Preferably in certain embodiments, the triggered condition is (based on) that the quality of the CSI-RS resource or the CSI-RS resource set and/or the quality of the used/indicated RS associated with first TRP (NOT based on the quality of the used/indicated RS associated with the second TRP for this UETriggeredCondConfig). Additionally and/or preferably, one UETriggeredCondConfig could be configured with association to one CSI-RS resource or one set of CSI-RS resource sets. Preferably in certain embodiments, one UETriggeredCondConfig could be configured with association to more than one CSI-RS resource or more than one set of CSI-RS resource sets. Preferably in certain embodiments, one UETriggeredCondConfig could be configured with association to one pair of CSI-RS resources or one pair of CSI-RS resource sets. Preferably in certain embodiments, first CSI-RS resource of the one pair of CSI-RS resources is configured with the first TRP. Preferably in certain embodiments, the second CSI-RS resource of the one pair of CSI-RS resources is configured with the second TRP. Preferably in certain embodiments, when UETriggeredCondConfig is configured with more than one CSI-RS resource or more than one CSI-RS resource set, the triggered condition is (based on) that the quality of both CSI-RS resources or both CSI-RS resource sets and/or the quality of the used/indicated RS associated with the first TRP and the quality of the used/indicated RS associated with the second TRP (for this UETriggeredCondConfig). Preferably in certain embodiments, when UETriggeredCondConfig is configured with more than one CSI-RS resource or more than one CSI-RS resource set, the beam pair based report is used/applied/determined.

Additionally and/or preferably, one UETriggeredCondConfig could be configured with association with the currently used/indicated TCI state. In one example, one UETriggeredCondConfig could comprise TCI state or RS identity associated with the currently used/indicated TCI state. In another example, the currently used/indicated TCI state is based implicitly via the first indicated TCI state and/or the second indicated TCI state and/or the TCI state for monitoring CORESER 0 and/or the TCI state for monitoring CORESET with CSS. Preferably in certain embodiments, one UETriggeredCondConfig could comprise one or more RSs being configured for being used as the currently used/indicated TCI state or RS. Preferably in certain embodiments, one UETriggeredCondConfig could associate with one list which is used for being used as the currently used/indicated TCI state or RS. Preferably in certain embodiments, one UETriggeredCondConfig could associate with per TRP's RS list which is used for being used as the currently used/indicated TCI state or the RS per TRP. Preferably in certain embodiments, one UETriggeredCondConfig could associate with both TRP's RS lists which is used for being used as the currently used/indicated TCI state or the RS for both TRPs.

Preferably in certain embodiments, the UE may have capability related to a maximum number of triggered reports.

Preferably in certain embodiments, the maximum number of triggered reports is up to UE capability.

Concept 3

This concept is to have a prohibit/skip mechanism for avoiding too frequently triggered UE reports. Preferably in certain embodiments, prohibit/skip mechanism (e.g., timer or counter) is used to prohibit/skip reports for the same target, e.g., reports for non-LTM, reports associated with the same serving cell, or reports for LTM.

For example, after a report for non-LTM is transmitted, following the UE triggered report(s) for non-LTM may not be triggered/transmitted due to the prohibit/skip mechanism (and the following UE triggered report(s) for LTM is allowed to be triggered/transmitted). For example, after a report for LTM is transmitted, following the UE triggered report(s) for LTM may not be triggered/transmitted due to the prohibit/skip mechanism (and following procedure for non-LTM is allowed to be triggered/transmitted). For example, after a report associated with a first serving cell is transmitted, following the UE triggered report(s) associated with the first serving cell may not be triggered/transmitted due to the prohibit/skip mechanism (and following UE triggered report(s) associated with a second serving cell is allowed to be triggered/transmitted).

Preferably in certain embodiments, a same target may correspond to (the quality of) a same RS which has been reported via one of a periodic/aperiodic/semi-persistent report or the UE triggered report. Preferably in certain embodiments, the same target may correspond RS for RSRP.

Preferably in certain embodiments, the UE maintains one or more timers associated with the prohibit/skip mechanism. Preferably in certain embodiments, the one or more timers are associated with the UE triggered report. Preferably in certain embodiments, the prohibit/skip mechanism may correspond that the UE does not generate the triggered report until the timer expires. Preferably in certain embodiments, the prohibit/skip mechanism may correspond that the UE does not trigger the report when the timer is running. Preferably in certain embodiments, the prohibit/skip mechanism may correspond that the UE does not transmit the triggered report when the timer is running. Preferably in certain embodiments, the prohibit/skip mechanism may correspond that the UE does not transmit/trigger/generate the report during a specific time interval. Preferably in certain embodiments, the specific time interval starts based on or after or from a timing that the UE last time transmitted a report associated with the same target. Preferably in certain embodiments, length of the first time interval is configured (per target). Preferably in certain embodiments, within the specific time interval, the UE can transmit the network node based report (e.g., periodic report, semi-persistent report, or report requested by DCI) but cannot transmit the UE triggered report.

Preferably in certain embodiments, the UE may be configured with a (periodic) PUCCH resource and/or a (periodic) PUSCH resource for the UE triggered report. Preferably in certain embodiments, the configured PUCCH resource and/or PUSCH resource for the UE trigged report is configured not overlapping with the first time interval with respect to timing(s) for transmitting the network node based report. Preferably in certain embodiments, when the UE does not trigger the report, the UE does not transmit on the configured PUCCH resource and/or PUSCH resource for the UE trigged report or for other purposes different than the UE triggered report. Preferably in certain embodiments, the UE is not allowed to transmit/trigger/generate the UE triggered report (for a target) within union of the first interval with respect to the network node configured timings for transmitting the network based report (for the target). Preferably in certain embodiments, the prohibit/skip mechanism could be configured per (configuration of) triggered condition, triggered criteria, per UE or per scenario (e.g., LTM, sTRP, mTRP) or per cell, or per TRP, or per UE panel. Preferably in certain embodiments, each of the above listed nouns/things could be a target. Preferably in certain embodiments, one target corresponds any one or any combined of the following: the one triggered condition, or one triggered criteria, or one scenario (e.g., LTM, sTRP, mTRP) or one cell, or one TRP or one UE panel. Preferably in certain embodiments, the first TRP and the second TRP in the sDCI mTRP scenario may share one prohibit/skip mechanism (e.g., ideal backhaul for both TRPs, and when the UE transmits the UE triggered report for at least one of the first or second TRPs, the UE applies the prohibit/skip mechanism for both TRPs). Preferably in certain embodiments, the first TRP and the second TRP in the mDCI mTRP scenario may have a respective one prohibit/skip mechanism (e.g., non-ideal backhaul for both TRPs, and when the UE transmits the UE triggered report for at least one of the first or second TRPs, the UE applies the prohibit/skip mechanism for the respective TRP). Preferably in certain embodiments, a different (configuration of) triggered condition may enable/disable or be configured with the prohibit/skip mechanism or a different (configuration of) triggered condition may have a different timer value. Preferably in certain embodiments, the different triggered criteria may enable/disable or be configured with the prohibit/skip mechanism or the different triggered criteria may have a different timer value. Preferably in certain embodiments, the different scenario may enable/disable or be configured with the prohibit/skip mechanism or the different scenario may have a different timer value. Preferably in certain embodiments, a different cell may enable/disable or ne configured with the prohibit/skip mechanism or the different cell may have a different timer value. Preferably in certain embodiments, the same (configuration of) triggered condition may (all) associate with the same timer value and/or the prohibit/skip mechanism. Preferably in certain embodiments, behaviour of the same enable the prohibit/skip mechanism and the same timer value is configured or shared for the same (configuration of) triggered condition, or for the same triggered criteria, or for the same UE or for the same scenario (e.g., LTM, sTRP, mTRP) or for the same cell. Preferably in certain embodiments, the UE could be configured with the one or more timers. Preferably in certain embodiments, each timer corresponds to one or more (configuration of) triggered conditions, one or more triggered criteria, one or more scenarios (e.g., LTM, sTRP, mTRP) or one or more cells, or one or more TRPs, or one or more UE panels. More specifically, each timer corresponds to one (configuration of) triggered condition, one triggered criteria, one or more scenarios (e.g., LTM, sTRP, mTRP) or one cell, or one TRP, or one UE panel. Preferably in certain embodiments, for the same target, the UE maintains one timer. Preferably in certain embodiments, in other words, per target maintaining the timer is performed on the UE side. Preferably in certain embodiments, when timer A for target A is running, the corresponding prohibit mechanism is performed for target A, and preferably in certain embodiments, the prohibit mechanism is not performed for target(s) other than target A. In one example, the triggered condition for the first TRP may associate with a first timer and the triggered condition for the second TRP associates with a second timer. When the UE has reported the quality of the candidate RS associated with the first TRP, the UE (re)starts the first timer and/or the UE does not trigger or transmit the triggered report associated with the first TRP. Preferably in certain embodiments, under the first timer running, the UE could trigger the UE triggered report and/or transmit the UE triggered report associated with the second TRP.

Preferably in certain embodiments, when a timer of the one or more timers expires, the UE stops the timer of the one or more timers.

Preferably in certain embodiments, the UE (re)starts the timer in response to transmitting a periodic/aperiodic/semi-persistent report (associated with the timer). Preferably in certain embodiments, the UE (re)starts the timer in response to transmitting a UE triggered report (associated with the timer). Preferably in certain embodiments, when an RS is used for determining the quality of the candidate beam has been reported by one of a periodic/aperiodic/semi-persistent report or the UE triggered report, the UE triggers the report not associating with the RS. Preferably in certain embodiments, when or in response to the timer expiring, the UE could transmit the UE triggered report (also when the triggered condition is met). Preferably in certain embodiments, when or in response to the timer not expiring, the UE is not allowed to transmit the UE triggered report (even when the triggered condition is met). Preferably in certain embodiments, when the timer is running, the UE is not allowed to transmit the UE triggered report (even when the triggered condition is met).

Preferably in certain embodiments, a first time interval is associated with TTI(s) that the timer is running. Preferably in certain embodiments, a second time interval is associated with TTI(s) that the timer is not running. Preferably in certain embodiments, a different parameter(s) and/or the triggered condition may associate with the first time interval and the second interval, respectively. In one example, configuration of the triggered condition (e.g., UETriggeredCondConfig) may be configured with two groups of parameter(s) associated with the first and the second time interval. Preferably in certain embodiments, the UE is avoided or prohibited to trigger and/or transmit the report during the first time interval except when the triggered condition associated with the parameter(s) associated with the first time interval is met. Preferably in certain embodiments, the triggered condition associated with the first time interval may be stricter (e.g., the quality of the candidate beam is better than a stricter threshold and/or the quality of the currently used beam is worse than a stricter threshold). Otherwise, the UE does not transmit or trigger the UE triggered report during the first time interval. Preferably in certain embodiments, when the timer is running, the first group of parameter(s) are used for determining the triggered condition. Preferably in certain embodiments, when the timer is expired, the second group of parameter(s) are used for determining the triggered condition.

Preferably in certain embodiments, in some special cases when/during the timer is running, the UE can trigger the report and/or transmit the report. Preferably in certain embodiments, the UE stops the timer in response to or when some special cases happen, preferably in certain embodiments, the some special cases are when the currently used beam is changed, the candidate beam is changed, the parameter(s) related to the triggered condition is reconfigured, or LTM MAC CE (e.g., LTM Cell Switch Command) is received. Preferably in certain embodiments, the UE skips or ignores or stops the timer. Preferably in certain embodiments, (even when the timer is running), for the some special cases, the UE triggers the report once the triggered condition is met or the UE triggers once the some special cases happen. Preferably in certain embodiments, for the some special cases, the triggered condition is (based on) the first group of parameter(s) when the timer is running. Preferably in certain embodiments, the some special cases are per target based. Preferably in certain embodiments, "target" could correspond to (configuration of) the triggered condition, the triggered criteria, the UE or scenario (e.g., LTM, sTRP, mTRP) or the cell, or the TRP or the UE panel. Preferably in certain embodiments, when the UE receives a beam indication DCI indicating the currently beam change for the second TRP, the some special cases are associated with the second TRP (and not associated with the first TRP). Preferably in certain embodiments, when the UE receives LTM MAC CE (e.g., LTM Cell Switch Command), the some special cases are associated with the impacted target (e.g., both the first TRP and the second TRP). Preferably in certain embodiments, when the UE receives LTM MAC CE (e.g., LTM Cell Switch Command), the some special cases are associated with the first TRP only or the TRP for receiving PDCCH associated with common search space.

Preferably in certain embodiments, a same target may correspond an RS being associated with the network node based reporting and the UE triggered based reporting. Preferably in certain embodiments, the same target may correspond one or more RSs associated with one same TRP associated with the network node based reporting and the UE triggered based reporting.

Preferably in certain embodiments, when the UE receives a UL grant or configured UL grant with UL resources, the UE would transmit a (UE) triggered report based on the UL grant or the configured UL grant. Preferably in certain embodiments, the UL resource is in a timing. Preferably in certain embodiments, the UE is requested by a network node to transmit an aperiodic CSI report (associated with RSRP) and/or is configured by a network node to transmit a periodic CSI report (associated with RSRP) and/or is activated by the network node to transmit a semi-persistent CSI report (associated with RSRP). Preferably in certain embodiments, based on the network node's request and/or configuration, the UE would transmit the CSI report in a timing (which is the same as the UL resource). Preferably in certain embodiments, the UE will omit or drop or ignore one of the network requested/configured reports or the UE triggered report. Preferably in certain embodiments, the UE will transmit only one of the network requested/configured reports or the UE triggered report. Preferably in certain embodiments, the UE will drop or does not transmit one of the network requested/configured reports or the UE triggered report. Preferably in certain embodiments, the UE will transmit both the network requested/configured report and the UE triggered report. Preferably in certain embodiments, the UE will drop or ignore or omit the UE triggered report. Preferably in certain embodiments, in case both the network requested/configured report or the UE triggered report are being associated with same target, the UE will drop or ignore or omit the UE triggered report.

For example, the UE may have the UE triggered report 1 associated with the first TRP and the UE triggered report 2 associated with the second TRP which would be transmitted in a timing. Preferably in certain embodiments, when the UE has a network node based CSI report associated with the first TRP, the UE drops the UE triggered report 1 and/or transmits the UE triggered report 2. Preferably in certain embodiments, no matter the timing with overlapping of the UE triggered report and the network node based report or not, the UE transmits both in the timing. Preferably in certain embodiments, the network node based on the report or the network node requested/configured report corresponds to a report configured by or associated with CSI-ReportConfig.

Preferably in certain embodiments, at most one report (for a first target) is transmitted by the UE in a time interval or in a (PUCCH/PUSCH) transmission. For example, when a first report (e.g., periodic report, semi-persistent report, or network requested report) for LTM and a UE triggered report for LTM are to be transmitted in the time interval or in the transmission, only one of them is transmitted (e.g., the first report or the UE triggered report). A UE triggered report for non-LTM is allowed to be transmitted in the time interval or in the transmission. For example, when a first report (e.g., periodic report, semi-persistent report, or network requested report) associated with a first serving cell and a UE triggered report associated with the first serving cell are to be transmitted in the time interval or in the transmission, only one of them is transmitted (e.g., the first report or the UE triggered report). A UE triggered report associated with a second serving cell is allowed to be transmitted in the time interval or in the transmission.

Exemplary embodiments of the present invention are described below.

Figure 15:
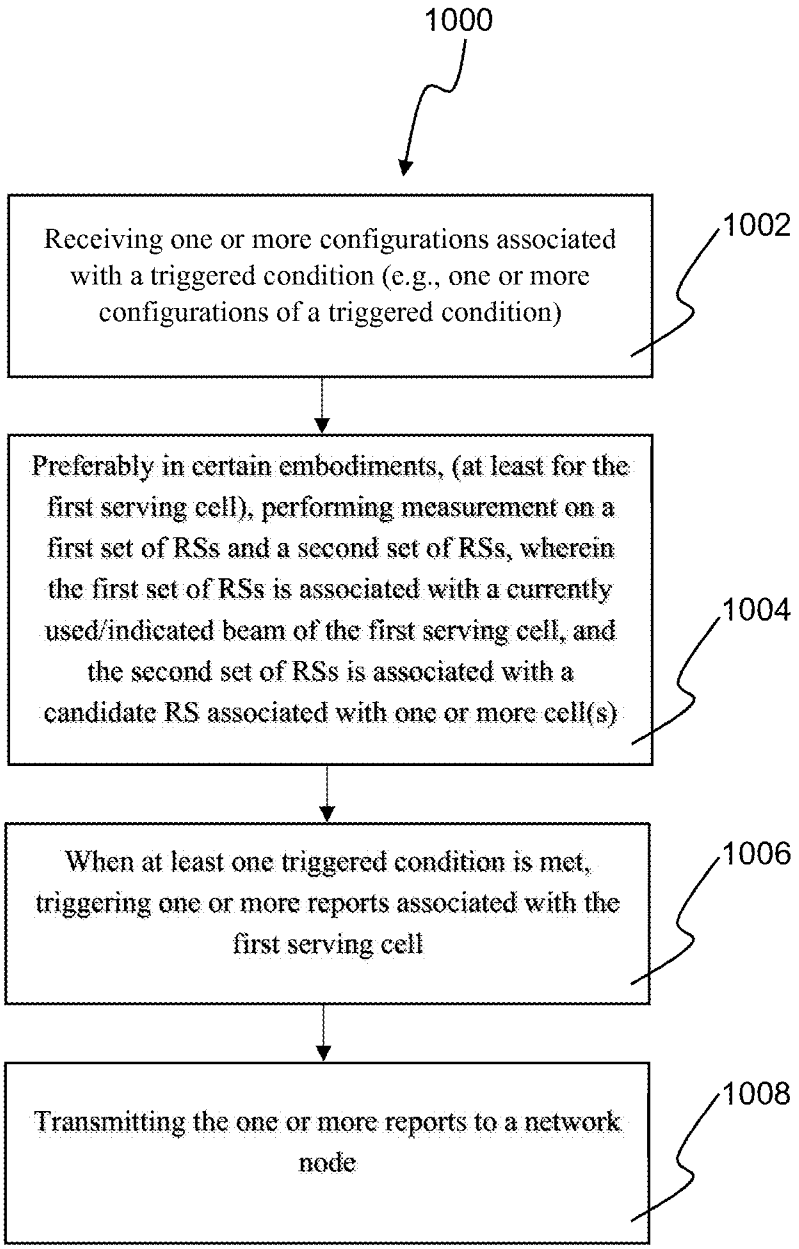
FIG. 15 is a flow diagram of a method of a UE comprising receiving one or more configurations associated with a triggered condition, preferably in certain embodiments, (at least for the first serving cell), performing measurement on a first set of RSs and a second set of RSs, when at least one triggered condition is met, triggering one or more reports associated with the first serving cell, and transmitting the one or more reports to a network node, in accordance with embodiments of the present invention.

Referring to FIG. 15, with this and other concepts, systems, and methods of the present invention, a method 1000 of a UE performing transmission and reception with a first serving cell comprises receiving one or more configurations associated with a triggered condition (e.g., one or more configurations of a triggered condition) (step 1002), preferably in certain embodiments, (at least for the first serving cell), performing measurement on a first set of RSs and a second set of RSs, wherein the first set of RSs is associated with a currently used/indicated beam of the first serving cell, and the second set of RSs is associated with a candidate RS associated with one or more cell(s) (step 1004), when at least one triggered condition is met, triggering one or more reports associated with the first serving cell (step 1006), and transmitting the one or more reports to a network node (step 1008).

Referring back to FIGS. 3 and 4, in one or more embodiments from the perspective of a UE performing transmission and reception with a first serving cell, the device 300 includes a program code 312 stored in memory 310 of the transmitter. The CPU 308 could execute program code 312 to: (i) receive one or more configurations associated with a triggered condition (e.g., one or more configurations of a triggered condition); (ii) preferably in certain embodiments, (at least for the first serving cell), perform measurement on a first set of RSs and a second set of RSs, wherein the first set of RSs is associated with a currently used/indicated beam of the first serving cell, and the second set of RSs is associated with a candidate RS associated with one or more cell(s); (iii) when at least one triggered condition is met, trigger one or more reports associated with the first serving cell; and (iv) transmit the one or more reports to a network node. Moreover, the CPU 308 can execute the program code 312 to perform all of the described actions, steps, and methods described above, below, or otherwise herein.

Figure 16:
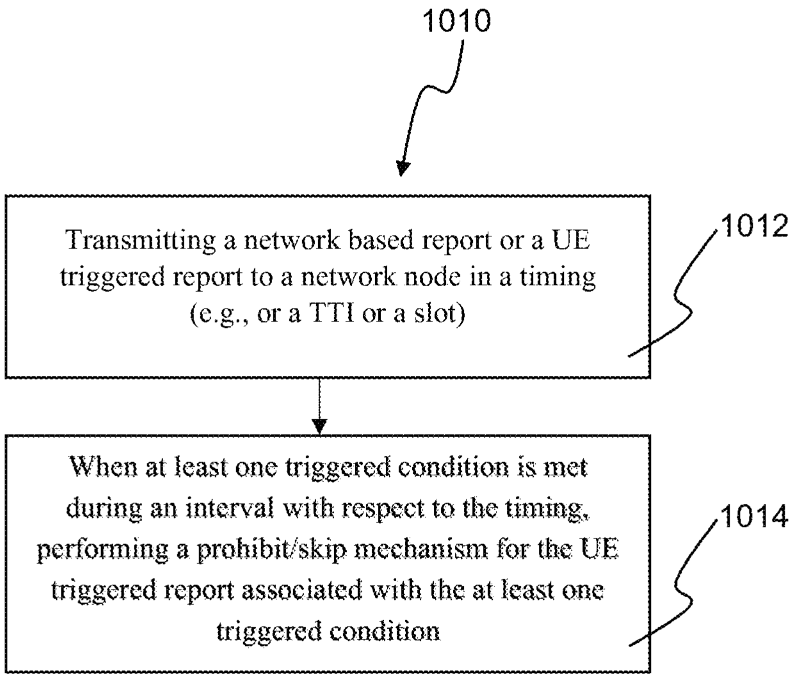
FIG. 16 is a flow diagram of a method of a UE comprising transmitting a network based report or a UE triggered report to a network node in a timing (e.g., or a TTI or a slot), and when at least one triggered condition is met during an interval with respect to the timing, performing a prohibit/skip mechanism for the UE triggered report associated with the at least one triggered condition, in accordance with embodiments of the present invention.

Referring to FIG. 16, with this and other concepts, systems, and methods of the present invention, a method 1010 of a UE performing transmission and reception with a first serving cell comprises transmitting a network based report or a UE triggered report to a network node in a timing (e.g., or a TTI or a slot) (step 1012), and when at least one triggered condition is met during an interval with respect to the timing, performing a prohibit/skip mechanism for the UE triggered report associated with the at least one triggered condition (step 1014).

Referring back to FIGS. 3 and 4, in one or more embodiments from the perspective of a UE performing transmission and reception with a first serving cell, the device 300 includes a program code 312 stored in memory 310 of the transmitter. The CPU 308 could execute program code 312 to: (i) transmit a network based report or a UE triggered report to a network node in a timing (e.g., or a TTI or a slot); and (ii) when at least one triggered condition is met during an interval with respect to the timing, perform a prohibit/skip mechanism for the UE triggered report associated with the at least one triggered condition. Moreover, the CPU 308 can execute the program code 312 to perform all of the described actions, steps, and methods described above, below, or otherwise herein.

Figure 17:
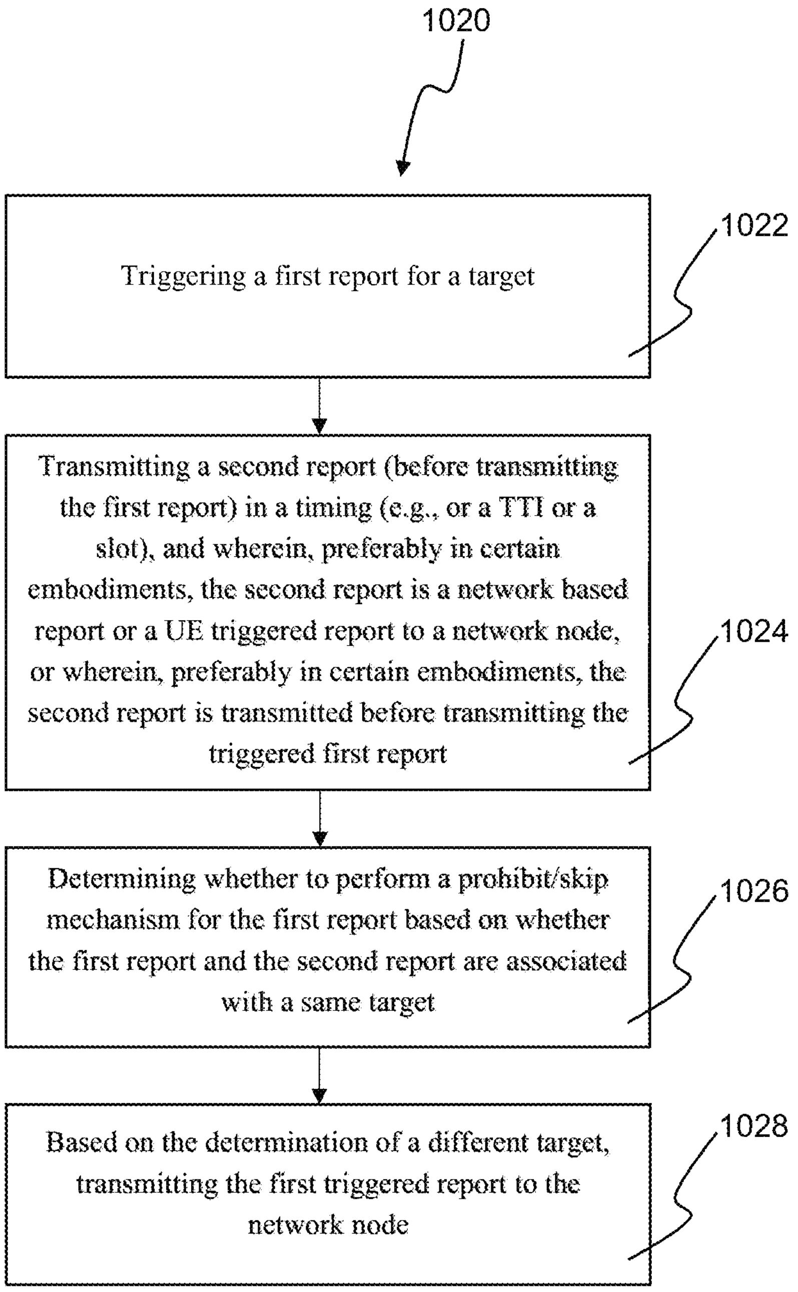
FIG. 17 is a flow diagram of a method of a UE comprising triggering a first report for a target, transmitting a second report (before transmitting the first report) in a timing (e.g., or a TTI or a slot), determining whether to perform a prohibit/skip mechanism for the first report based on whether the first report and the second report are associated with a same target, and based on the determination of a different target, transmitting the first triggered report to the network node, in accordance with embodiments of the present invention.

Referring to FIG. 17, with this and other concepts, systems, and methods of the present invention, a method 1020 of a UE performing transmission and reception with a first serving cell comprises triggering a first report for a target (step 1022), transmitting a second report (before transmitting the first report) in a timing (e.g., or a TTI or a slot), and wherein, preferably in certain embodiments, the second report is a network based report or a UE triggered report to a network node, or wherein, preferably in certain embodiments, the second report is transmitted before transmitting the triggered first report (step 1024), determining whether to perform a prohibit/skip mechanism for the first report based on whether the first report and the second report are associated with a same target (step 1026), and based on the determination of a different target, transmitting the first triggered report to the network node (step 1028).

Referring back to FIGS. 3 and 4, in one or more embodiments from the perspective of a UE performing transmission and reception with a first serving cell, the device 300 includes a program code 312 stored in memory 310 of the transmitter. The CPU 308 could execute program code 312 to: (i) trigger a first report for a target; (ii) transmit a second report (before transmitting the first report) in a timing (e.g., or a TTI or a slot), and wherein, preferably in certain embodiments, the second report is a network based report or a UE triggered report to a network node, or wherein, preferably in certain embodiments, the second report is transmitted before transmitting the triggered first report; (iii) determine whether to perform a prohibit/skip mechanism for the first report based on whether the first report and the second report are associated with a same target; and (iv) based on the determination of a different target, transmit the first triggered report to the network node. Moreover, the CPU 308 can execute the program code 312 to perform all of the described actions, steps, and methods described above, below, or otherwise herein.

Preferably in certain embodiments, the first report and the second report are associated with the same target, and/or the UE performs a prohibit/skip mechanism for the first report, and/or the UE cancels/drops/ignores the triggered first report.

Preferably in certain embodiments, based on the determination of the same target, the UE cancels transmission of the first triggered report.

Preferably in certain embodiments, based on the determination of the same target, the UE performs the prohibit/skip mechanism for the first report during a time interval (with respect to the timing).

Preferably in certain embodiments, based on the determination of the different target, the UE does not perform the prohibit/skip mechanism for the first report during a time interval (with respect to the timing).

Preferably in certain embodiments, when the UE could include the first triggered report with transmission for the second report in the timing, the UE transmits both the first and the second report.

Preferably in certain embodiments, after the timing and within the time interval, the UE is not allowed to or does not transmit or cancel to transmit the first triggered report and/or the UE cancels the triggered report (based on determination of the same target).

Alternatively, the UE performs a prohibit/skip mechanism for the first report (no matter if a same or a different target between the first and the second report or not), and/or the UE cancels the first triggered report once the UE transmits the second report.

Preferably in certain embodiments, when the first and the second report are associated with the same target, the UE cancels the first triggered report when/once the UE transmits the second report.

Preferably in certain embodiments, the UE cancels the (already) triggered first report when/once the UE transmits the second report (no matter if the same target or not, or alternatively based on the same target between the first and the second report).

Preferably in certain embodiments, the UE receives one or more configurations associated with the triggered condition (e.g., one or more configurations of the triggered condition).

Preferably in certain embodiments, once the UE transmits the second report, the UE resets the counter associated with one or more triggered conditions or criteria (no matter if the same target or not, or alternatively based on the same target between the first and the second report).

Preferably in certain embodiments, the triggered condition being met corresponds to at least an associated counter reaching (or exceeding) a maximum number, which the counter is used for counting a number of times that criteria is being met.

Preferably in certain embodiments, during the time interval, the UE does not trigger and/or transmit the triggered report.

Preferably in certain embodiments, during the time interval, the UE uses or determines triggered condition based on another group of parameter(s).

Preferably in certain embodiments, based on whether the UE is in the time interval (associated with the prohibit/skip mechanism) or not, determining a different group of parameter(s) for determining whether to trigger the UE report, and/or a different triggered condition could be grouped into being triggered within the time interval or being triggered outside the time interval.

Preferably in certain embodiments, the UE maintains a timer associated with a prohibit/skip mechanism (for one target).

Preferably in certain embodiments, the UE (re)starts the timer when the UE transmits a report (e.g., the network node based report or the UE triggered report).

Preferably in certain embodiments, when the timer expires, the UE stops the timer.

Preferably in certain embodiments, when the timer is running, the UE performs a prohibit/skip mechanism.

Preferably in certain embodiments, when the timer expires or is stopped, the UE could transmit the UE triggered report (e.g., the first triggered report).

Preferably in certain embodiments, when the timer expires or is stopped, the UE could trigger the first report.

Preferably in certain embodiments, a length of the time interval is determined based on the timer.

Preferably in certain embodiments, a length of the time interval is configured by an RRC signal and/or associated with one target.

Preferably in certain embodiments, the timer could be per target, and/or the timer for target A does not impact the UE transmitting target B's transmission of the triggered report.

Preferably in certain embodiments, when the network node based report is aperiodic or is requested by a DCI, the UE cancels the triggered report in response to receiving the DCI or the request (preferably in certain embodiments, based on the same target between the triggered report and the network node based report).

Preferably in certain embodiments, the UE cancels the triggered first report when the UE receives a DCI or a request from the network node for the second report (preferably in certain embodiments, based on the same target between the first report and the second report).

Preferably in certain embodiments, the UE receives a PDCCH order or a beam indication DCI (indicating to change one or more indicated TCI states) after transmitting the one or more reports to the network node.

Preferably in certain embodiments, the PDCCH order indicates a RACH procedure for acquiring TA for a candidate cell.

Preferably in certain embodiments, the PDCCH order indicates the UE performs the RACH procedure associated with the RS associated with the one or more reports.

Preferably in certain embodiments, the one or more reports comprise at least one candidate RS in the second set of RSs.

Preferably in certain embodiments, the at least one candidate RS is associated with a cell with a different PCI than the first cell.

Preferably in certain embodiments, one configuration associated with one triggered condition corresponds or provides information that a criteria and/or a number of times for the criteria for triggering the report, and/or threshold(s), and/or offset(s), and/or quality type, and/or association with the currently used/indicated beam or RS(s), and/or association with the candidate beam or RS(s), association with the report configuration, and/or LTM or non-LTM, and/or a first kind of report or a second kind of report, and/or a beam based comparison or a beam pair based comparison.

Preferably in certain embodiments, one triggered condition being met corresponds that a number of times of one or more criteria is met, wherein the one or more criteria is or corresponds to: the quality of at least one candidate beam (plus or minus offset(s)) is larger than (or equal to) a threshold, and/or the quality of at least one current used/indicated beam (plus or minus offset(s)) is smaller than (or equal to) a threshold, and/or the quality of at least one candidate beam (plus or minus offset(s)) is larger than (or equal to) the quality of at least one current used/indicated beam (plus or minus offset(s), and/or beam(s)/TCI state(s)/RS(s) to be indicated by the UE triggered report is different from that indicated by the last transmitted (UE-triggered, periodic, aperiodic, or semi-persistent) report (associated with the same serving cell), and/or the quality of beam(s)/TCI state(s)/RS(s) to be indicated by the UE triggered report (plus or minus offset(s)) is different from (e.g., larger than (or equal to) or smaller than (or equal to)) the quality of the beam(s)/TCI state(s)/RS(s) indicated by the last transmitted (UE-triggered, periodic, aperiodic, or semi-persistent) report (plus or minus offset(s)) (associated with the same serving cell).

Preferably in certain embodiments, (configuration of) the at least one triggered condition is associated with criteria associated with the quality of the candidate beam (no matter the quality of the currently used/indicated beam).

Preferably in certain embodiments, (configuration of) the at least one triggered condition is associated with criteria associated with the quality of the candidate beam when the quality of the currently used/indicated beam is not bad (e.g., the quality of currently used/indicated beam is not with an offset lower than the quality of the candidate beam, or the quality of the currently used/indicated beam is not lower than a threshold).

Preferably in certain embodiments, (configuration of) the at least one triggered condition is associated with criteria associated with both the quality of the candidate beam and the currently used/indicated beam.

Preferably in certain embodiments, (configuration of) the at least one triggered condition or criteria could associate with either the first TRP or the second TRP.

Preferably in certain embodiments, (configuration of) the at least one triggered condition or criteria comprise a parameter/indication/signal indicating (configuration of) the at least one triggered condition or criteria being associated with either the first TRP or the second TRP.

Preferably in certain embodiments, when (configuration of) the at least one triggered condition or the criteria is associated with the first TRP, the RS for determining the quality of the currently used/indicated beam and RS for determining the quality of the candidate beam are associated with the first TRP.

Preferably in certain embodiments, based on an associated RS, which for determining the quality of the currently used/indicated beam and/or for determining the quality of the candidate beam, is associated with which first TRP or second TRP, the UE determines (configuration of) the at least one triggered condition or criteria is associated with which TRP.

Preferably in certain embodiments, an RS resource or RS resource set could be configured with either the first TRP or the second TRP, and based on this information, when such RS is associated with (configuration of) the at least one triggered condition or criteria, the (configuration of) the at least one triggered condition or criteria being associated with which TRP is determined.

Preferably in certain embodiments, when an RS being used for determining the quality of the currently used/indicated beam, which is associated with (configuration of) the at least one triggered condition or criteria, is associated with the first TRP, (configuration of) the at least one triggered condition or criteria is associated with the first TRP.

Preferably in certain embodiments, when (configuration of) the at least one triggered condition or criteria is associated with the first TRP, the RS used for determining the quality of the candidate beam is based on the first TRP, and on the other hand, when (configuration of) the at least one triggered condition or criteria is associated with the second TRP, the RS used for determining the quality of the candidate beam is based on the second TRP.

Preferably in certain embodiments, when the RS being used for determining the quality of the candidate beam, which is associated with (configuration of) the at least one triggered condition or criteria, is associated with first TRP, (configuration of) the at least one triggered condition or criteria is associated with the first TRP.

Preferably in certain embodiments, when (configuration of) the at least one triggered condition or criteria is associated with the first TRP, the RS used for determining the quality of the currently used/indicated beam is based on the first TRP, and on the other hand, when (configuration of) the at least one triggered condition or criteria is associated with the second TRP, the RS used for determining the quality of the currently used/indicated beam is based on the second TRP.

Preferably in certain embodiments, the UE does not expect the RS used for determining the quality of the currently used/indicated beam and the RS for determining the quality of candidate beam is associated with a different TRP, and/or when or wherein both RSs are associated with the same (configuration of) the at least one triggered condition or criteria.

Preferably in certain embodiments, based on indication/parameter/signaling of (configuration of) the at least one triggered condition or criteria (wherein the indication/parameter/signaling indicates either the first, the second TRP), the UE determines (configuration of) the at least one triggered condition or criteria is associated with the first TRP.

Preferably in certain embodiments, (configuration of) the at least one triggered condition or criteria could be configured with or enabled with beam pair based triggering/comparison.

Preferably in certain embodiments, beam pair triggering/comparison corresponds that criteria is met for both TRPs or per TRP's criteria are both met.

Preferably in certain embodiments, (configuration of) the at least one triggered condition or criteria is associated with both the first TRP's RS and the second TRP's RS or the RS associated with the UE's first panel and the RS associated with the UE's second panel.

Preferably in certain embodiments, (configuration of) the at least one triggered condition or criteria is associated with the first TRP's RS for determining the quality of the candidate beam and the second TRP's RS for determining the quality of the candidate beam.

Preferably in certain embodiments, when (configuration of) the at least one triggered condition or criteria is configured with the two TRP's RS for determining the quality of the candidate beam, (configuration of) the at least one triggered condition or criteria is enabled with or configured with beam pair triggering/reporting.

Preferably in certain embodiments, for beam pair triggering/reporting, the triggered condition is (based on) at least when both TRP's criteria are met.

Preferably in certain embodiments, (configuration of) the at least one triggered condition or criteria comprises signaling/indication indicating either the first TRP, the second TRP, or both TRPs.

Preferably in certain embodiments, (configuration of) the at least one triggered condition or criteria comprises signaling/indication indicating the triggered condition is based on either the quality of the beam associated with the first TRP being met (comprising the quality of the currently used/indicated beam associated with the first TRP and/or the quality of the candidate beam associated with the first TRP), or the quality of beam associated with the second TRP being met (comprising the quality of the currently used/indicated beam associated with the second TRP and/or the quality of the candidate beam associated with the second TRP), or the quality of beam associated with both TRPs being met (comprising the quality of the currently used/indicated beam associated with the first TRP and/or the quality of the candidate beam associated with the first TRP, and the quality of the currently used/indicated beam associated with the second TRP and/or the quality of the candidate beam associated with the second TRP).

Preferably in certain embodiments, beam pair triggering/comparison could be replaced by joint TRP triggering.

Preferably in certain embodiments, when beam pair triggering/comparison (joint TRP triggering) is configured or enabled, the UE expects to be configured with the RS associated with the two TRPs.

Preferably in certain embodiments, when beam pair triggering/comparison (joint TRP triggering) is configured or enabled, offset, threshold, and/or quality type, which criteria, configured by (configuration of) the at least one triggered condition could be configured per TRP (then there are two respective above parameters) or configured being shared by two TRPs.

Preferably in certain embodiments, different criteria could have or be configured with a different number of times for triggering the report.

Preferably in certain embodiments, one triggered condition corresponds a number of times that one criteria is being met.

Preferably in certain embodiments, the number of timers could be one, and/or the one triggered condition could be replaced by the one criteria.

Preferably in certain embodiments, the first set of RSs may comprise one or more currently used/indicated beams of the first serving cell, and/or preferably in certain embodiments, the first set of RSs may comprise one or more currently used/indicated beams of a second cell which is with configuration of an additional PCI associated with the first serving cell.

Preferably in certain embodiments, the first set of RSs may comprise an RS associated with a first indicated TCI state by at least one beam indication DCI.

Preferably in certain embodiments, the first set of RSs may comprise an RS associated with a second indicated TCI state by at least one beam indication DCI.

Preferably in certain embodiments, the first set of RSs may comprise an RS for CORESET monitoring, for CORESET 0, and/or for beam failure detection.

Preferably in certain embodiments, the first set of RSs may comprise a first subset of an RS associated with a first TRP and a second subset of RSs associated with a second TRP.

Preferably in certain embodiments, the first set of RSs is used to determine the quality of at least one current used/indicated beam.

Preferably in certain embodiments, the first subset of the first set of RSs is used to determine the quality of at least one current used/indicated beam associated with the first TRP or the first UE panel.

Preferably in certain embodiments, the second subset of the first set of RSs is used to determine the quality of at least one current used/indicated beam associated with the second TRP or the second UE panel.

Preferably in certain embodiments, the first set of RSs, which is used for determining the quality of the currently used/indicated beam, is configured by a list of RSs, and/or the list of RSs is different than the RS used for beam failure detection.

Alternatively, the first set of RSs may comprise an RS from the beam failure detection.

Alternatively, the first subset of RSs may comprise an RS from beam failure detection associated with the first TRP.

Alternatively, the second subset of RSs may comprise an RS from beam failure detection associated with the second TRP.

Alternatively, when the UE is configured with a list of RSs for the first set of RSs (via explicit RRC signaling), the UE determines the first set of RSs based on the currently used/indicated TCI state and/or an RS associated with the TCI state for CORESET monitoring.

Preferably in certain embodiments, for configuration of the triggered condition associated with LTM, the first set of RSs comprises an RS associated with the TCI state for monitoring CORESET with CSS.

Preferably in certain embodiments, the first set of RSs is updated or changed based on the beam indication DCI and/or the TCI state (de)activation MAC CE.

Preferably in certain embodiments, when the UE receives the beam indication DCI indicating the indicated TCI state different than the currently used/indicated TCI state (with same direction), the UE updates the RS in the first set of RSs, and/or the UE replaces RS1 (which is associated with the original indicated TCI state) by RS2 (which is associated with the TCI state indicated by the beam indication DCI).

Preferably in certain embodiments, the UE maintains a counter per TRP or per (configuration of) triggered condition, wherein the counter is used for determining or counting the number of times that the criteria is met.

Preferably in certain embodiments, the UE resets the counter when or in response to the UE changing PCell, a serving beam change, receiving the beam indication DCI, receiving the TCI state (de)activation MAC CE, a beam failure, and/or transmitting the triggered report.

Preferably in certain embodiments, the UE maintains a timer per TRP or per (configuration of) triggered condition, wherein the UE triggers the report based on at least when the timer expires (and the triggered condition is met).

Preferably in certain embodiments, the UE restarts the timer in response to the UE changing PCell, a serving beam change, receiving the beam indication DCI, receiving the TCI state (de)activation MAC CE, beam failure, transmitting the triggered report.

Preferably in certain embodiments, the UE does not trigger the report (associated with one triggered condition) when the timer is running.

Alternatively, the UE maintains a specific timer for all UE triggered reports.

Preferably in certain embodiments, when an RS for determining the quality of the candidate beam associated with one (configuration of) triggered condition has a link or association with a periodic, aperiodic, semi-persistent CSI report configuration and/or BFR, once one of a periodic, aperiodic, semi-persistent CSI report configuration and/or BFR is transmitted, the UE triggers the report after a time duration after one of the reports.

Preferably in certain embodiments, when the UE triggers a BFR procedure and/or identifies BFR for the first TRP, the UE will cancel an ongoing triggered report associated with the first TRP.

Preferably in certain embodiments, when the UE triggers the BFR procedure and/or identifies BFR for first TRP, the UE will cancel the ongoing triggered report associated with the impacted TRP.

Preferably in certain embodiments, when the UE triggers the BFR procedure and/or identifies BFR for the first TRP, the UE will cancel the ongoing triggered report associated with both the first TRP and the second TRP.

Preferably in certain embodiments, when the UE triggers the BFR procedure and/or identifies BFR for the first TRP, the UE (re)starts the timer for the first TRP, and/or the UE considers/determines the timer is running, and/or the UE does not transmit the triggered report associated with the first TRP.

Preferably in certain embodiments, a BFR MAC CE is prioritized over the triggered report.

Preferably in certain embodiments, the UE will transmit both the BFR MAC CE and the triggered report.

Preferably in certain embodiments, the UE triggers a BFR procedure after the UE triggered report.

Preferably in certain embodiments, the UE triggers a BFR procedure before transmitting the UE triggered report.

Preferably in certain embodiments, the timer is used for prohibiting the UE from too frequently triggering the report (no matter which triggered condition is met).

Preferably in certain embodiments, the UE does not trigger the report (associated with any triggered condition) when the timer is running.

Preferably in certain embodiments, when or in response to the UE changing PCell, serving beam change, receiving beam indication DCI, receiving TCI state (de)activation MAC CE, beam failure, transmitting the triggered report, the UE disables the timer for the UE trigger report.

Preferably in certain embodiments, when or in response to the UE changing PCell, serving beam change, receiving beam indication DCI, receiving TCI state (de)activation MAC CE, beam failure, and/or transmitting the triggered report, the UE disables the timer, and/or the UE considers/determines the timer is not running, and/or the UE considers/determines the timer is expired.

Alternatively, the UE maintains a timer per TRP or per (configuration of) triggered condition, wherein the UE triggers the report based on at least when the timer does not expire.

Preferably in certain embodiments, for beam pair based reporting/comparison, whether criteria (associated with configuration of triggered condition) is met or not is based on whether both TRP's criteria is met or not, and/or whether the counter is increased by one or not is based on whether both TRP's criteria is met or not (or the criteria is to check both TRP's criteria is met or not).

Preferably in certain embodiments, when only one TRP's criteria is met while another TRP is not, for beam pair based reporting/comparison, the UE does not increase the counter associated with the configuration of triggered condition.

Preferably in certain embodiments, when both TRP's criteria are met, for beam pair based reporting/comparison, the UE increases the counter associated with the configuration of the triggered condition.

Preferably in certain embodiments, when the counter reaches (or exceeds) the maximum number associated with the configuration of the triggered condition, the UE triggers the report (associated with the triggered condition).

Preferably in certain embodiments, the second set of RSs comprise the RS used for determining the quality of the candidate beam.

Preferably in certain embodiments, the second set of RSs are used for RSRP measurement.

Preferably in certain embodiments, the second set of RSs comprise the RS associated with the candidate RS in response to beam failure.

Preferably in certain embodiments, the second set of RSs comprise the RS associated with a deactivated TCI state(s) for PDCCH monitoring, for (all) CORESET(s), for CORESET 0, and/or of one or multiple or all CORESET pools, for the CORESET associated with CSS, for the CORESET associated with both USS and CSS.

Preferably in certain embodiments, the second set of RSs comprise the RS associated with (configuration of) one or more triggered conditions or criteria.

Preferably in certain embodiments, the second set of RSs comprise the RS associated with (configuration of) the triggered condition or criteria.

Preferably in certain embodiments, the second set of RSs is associated with the candidate RS for the triggering report.

Preferably in certain embodiments, the second set of RSs comprise SS-PBCH and/or CSI-RS (for beam management, associated with RSRP).

Preferably in certain embodiments, the second set of RSs comprise the RS associated with one, multiple, or candidate cells.

Preferably in certain embodiments, the second set of RSs comprise the RS associated with the first serving cell, wherein the second set of RSs comprise the RS without being configured or being included in the first set of RSs.

Preferably in certain embodiments, the second set of RSs comprise the RS associated with a second serving cell, a third cell, a fourth cell, and/or a fifth cell.

Preferably in certain embodiments, the one, multiple, or candidate cells are the activated cell.

Preferably in certain embodiments, based on association between configuration of the at least one triggered condition and the configuration of one or more RS resource(s), determining RS, being as the associated one or more RS resource (s), used for the quality of the candidate beam (associated with configuration of the at least one triggered condition).

Preferably in certain embodiments, the second set of RSs may comprise a first subset of RSs associated with a first TRP and a second subset of RSs associated with a second TRP.

Preferably in certain embodiments, the first subset of the second set of RSs is used to determine the quality of at least one candidate beam associated with the first TRP or the first UE panel.

Preferably in certain embodiments, the second subset of the second set of RSs is used to determine the quality of at least one candidate beam associated with the second TRP or the second UE panel.

Preferably in certain embodiments, the second set of RSs, which is used for determining the quality of the currently used/indicated beam, is configured by a list of RSs, and/or the list of RSs is different than RS used for the candidate RS in response to beam failure.

Preferably in certain embodiments, the UE ignores or cancels or does not perform measurement on one or more RSs in the second set of RSs when the one or more RSs is on a cell where the UE is in an inactive state or the network node for the cell is in an inactive state.

Alternatively, the second set of RSs may comprise the RS used for the candidate RS in response to beam failure.

Alternatively, the first subset of RSs may comprise the RS used for the candidate RS in response to beam failure associated with the first TRP.

Alternatively, the second subset of RSs may comprise being used for the candidate RS in response to beam failure associated with the second TRP.

Alternatively, when the UE is configured with a list of RSs for the second set of RSs (via explicit RRC signaling), the UE determines the second set of RSs based on the RS from the (RRC configured) TCJ state list.

Preferably in certain embodiments, the second set of RSs is updated or changed based on an RRC reconfiguration and/or a second MAC CE or specific DCI indicating add, remove, and/or replace the RS in the second set of RSs.

Preferably in certain embodiments, (configuration of) the at least one triggered condition is associated with one or more first RSs (which may be a subset) in the first set of RSs.

Preferably in certain embodiments, (configuration of) the at least one triggered condition is associated with one or more second RSs (which may be a subset) in the second set of RSs.

Preferably in certain embodiments, based on association between (configuration of) the at least one triggered condition, the UE determines one or more first RSs, preferably in certain embodiments, which is used to determine the quality of at least one current used/indicated beam, being associated with (configuration of) the at least one triggered condition.

Preferably in certain embodiments, based on association between (configuration of) the at least one triggered condition, the UE determines one or more second RSs, preferably in certain embodiments, which is used to determine the quality of at least one candidate beam, being associated with (configuration of) the at least one triggered condition.

Preferably in certain embodiments, the UE determines whether the at least one triggered condition is met or not based on at least the quality of the candidate beam associated with the one or more RSs associated with (configuration of) the at least one triggered condition.

Preferably in certain embodiments, a different number of times, and/or a different criteria, and/or a different threshold, a different offset being used/configured corresponds to a different triggered condition.

Preferably in certain embodiments, the UE transmits a capability signal to inform the network node whether it supports beam pair based triggering/reporting.

Preferably in certain embodiments, whether the UE triggers the report is based on whether the network node provides a configuration of the triggered condition.

Preferably in certain embodiments, the UE triggers the report before triggering beam failure.

Preferably in certain embodiments, the one or more reports comprise information associated with which (configuration of) triggered condition, triggered reason (if the UE does not report the configuration of the triggered condition), one or more RSs from the second set of RSs, one or more RSs from the first set of RSs, and/or which TRP (if configuration of the triggered condition does not have explicit TRP information).

Preferably in certain embodiments, the (UE triggered) report is transmitted via MAC CE.

Preferably in certain embodiments, the (UE triggered) report is transmitted via UCI.

Note that any of above and herein methods, alternatives, examples, and embodiments may be combined, in whole or in part, or applied simultaneously or separately.

Figure 18:
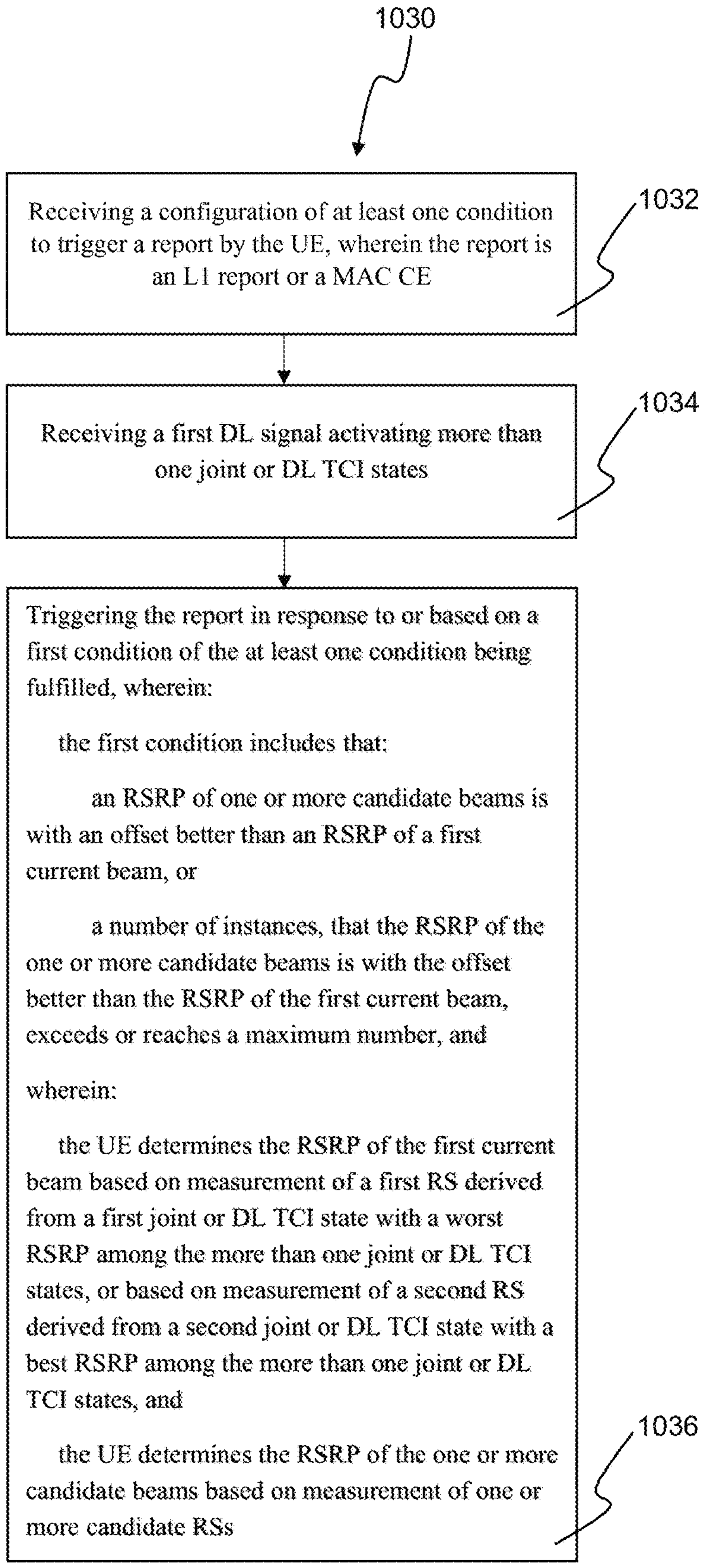
FIG. 18 is a flow diagram of a method of a UE comprising receiving a configuration of at least one condition to trigger a report by the UE, receiving a first DL signal activating more than one joint or DL TCI states, and triggering the report based on a first condition of the at least one condition being fulfilled, in accordance with embodiments of the present invention.

Referring to FIG. 18, with this and other concepts, systems, and methods of the present invention, a method 1030 of a UE comprises receiving a configuration of at least one condition to trigger a report by the UE, wherein the report is an L1 report or a MAC CE (step 1032), receiving a first DL signal activating more than one joint or DL TCI states (step 1034), and triggering the report in response to or based on a first condition of the at least one condition being fulfilled, wherein: the first condition includes that: an RSRP of one or more candidate beams is with an offset better than an RSRP of a first current beam, or a number of instances, that the RSRP of the one or more candidate beams is with the offset better than the RSRP of the first current beam, exceeds or reaches a maximum number, and wherein: the UE determines the RSRP of the first current beam based on measurement of a first RS derived from a first joint or DL TCI state with a worst RSRP among the more than one joint or DL TCI states, or based on measurement of a second RS derived from a second joint or DL TCI state with a best RSRP among the more than one joint or DL TCI states, and the UE determines the RSRP of the one or more candidate beams based on measurement of one or more candidate RSs (step 1036).

In various embodiments, the first joint or DL TCI state comprises two QCL information, wherein one QCL information of the two QCL information is associated with the first RS with a QCL type as type-D and another QCL information of the two QCL information is associated with a fourth RS with a QCL type other than type-D, and/or the first DL signal corresponds to a TCI state activation or deactivation MAC CE.

In various embodiments, the second joint or DL TCI state comprises two QCL information, wherein one QCL information of the two QCL information is associated with the second RS with a QCL type as type-D and another QCL information of the two QCL information is associated with a fourth RS with a QCL type other than type-D, and/or the first DL signal corresponds to a TCI state activation or deactivation MAC CE.

In various embodiments, the first RS corresponds to a CSI-RS for beam management or a CSI-RS for RSRP measurement (i.e., the first RS does not correspond to a CSI-RS for purpose other than beam management); and/or the first RS does not correspond to a CSI-RS for tracking.

In various embodiments, the second RS corresponds to a CSI-RS for beam management or a CSI-RS for RSRP measurement (i.e., the second RS does not correspond to a CSI-RS for purpose other than beam management); and/or the second RS does not correspond to a CSI-RS for tracking.

In various embodiments, the at least one condition includes at least one of: a second condition including that an RSRP of a second current beam is worse than a first threshold, and/or a third condition including that the RSRP of the one or more candidate beams is better than a second threshold, and/or a fourth condition including that an RSRP or an average RSRP of N best beams of the one or more candidate beams is with the offset better than the RSRP of the second current beam, wherein N is larger than one, and/or a fifth condition including that the RSRP of the one or more candidate beams is with a second offset better than the RSRP of the second current beam.

In various embodiments, the UE triggers the report in response to or based on the second condition being fulfilled, and/or the UE triggers the report in response to or based on the third condition being fulfilled, and/or the UE triggers the report in response to or based on the fourth condition being fulfilled, and/or the UE triggers the report in response to or based on the fifth condition being fulfilled.

In various embodiments, the one or more candidate beams is at least one of: one or more configured joints or DL TCI states, and/or one or more activated joints or DL TCI states, and/or one or more RSs associated with the first condition, and/or one or more RSs configured for the report triggered by the UE.

In various embodiments, the UE is configured with a periodic PUCCH resource and/or a periodic PUSCH resource for transmitting the report, and/or the UE does not expect to multiplex network triggered content into the periodic PUCCH resource and/or the periodic PUSCH resource, and/or the UE transmits the report on one of the periodic PUCCH resource or one of the periodic PUSCH resource when the report is triggered.

In various embodiments, the UE receives a second DL signal indicating a third joint or DL TCI state, wherein the third joint or DL TCI state is associated with a third RS, and/or the second DL signal corresponds to a DCI with a TCI field for indicating the third joint or DL TCI state, and/or the third joint or DL TCI state comprises two QCL information, wherein one QCL information of the two QCL information is associated with the third RS with QCL type as type-D and another QCL information of the two QCL information is associated with a fourth RS with QCL type other than type-D, and/or the UE determines an RSRP of a second current beam based on measurement of the third RS.

In various embodiments, the UE receives PDSCH and/or PDCCH which is configured to follow an indicated TCI state based on the third joint or DL TCI state, and/or the third RS which is used for determining the RSRP of the second current beam is not only used for receiving PDCCH but also for receiving PDSCH.

In various embodiments, the offset is configured by the configuration, per condition of the at least one condition, per BWP, or per serving cell, and/or different conditions of the at least one condition are configured with a same or different offset, and/or conditions of the at least one condition in different BWPs are configured with the same or different offset, and/or conditions of the at least one condition in different serving cells are configured with the same or different offset. Based on the offset being configured per BWP, different conditions of the at least one condition, in a same BWP, are configured with a same offset. Based on the offset being configured per serving cell, different conditions of the at least one condition, in a same serving cell, are configured with a same offset. The offset is a positive number or a negative number.

In various embodiments, the UE maintains a counter associated with the number of instances, and/or the counter or the number of instances is increased by one in response to the RSRP of the one or more candidate beams is with the offset better than the RSRP of the first current beam, and/or the UE resets the counter or the number of instances when or in response to the UE changing PCell, a current beam change, receiving a beam indication DCI, receiving the TCI state activation or deactivation MAC CE, a beam failure, triggering a beam failure recovery, and/or transmitting the (triggered) report, and/or the maximum number is configured by the configuration, per condition of the at least one condition, per Bandwidth Part (BWP), or per serving cell, and/or the default value of the maximum number is one. Based on the maximum number being configured per BWP, different conditions of the at least one condition, in a same BWP, are configured with a same maximum number. Based on the maximum number being configured per serving cell, different conditions of the at least one condition, in a same serving cell, are configured with a same maximum number.

In various embodiments, the maximum number is based on the UE's capability; and/or the UE reports its capability, to a network node, associated with the maximum number (i.e., long term triggering); and/or the maximum number is configured by the configuration, per condition of the at least one condition, per BWP, or per serving cell; and/or the UE is configured with the maximum number associated with the first condition; and/or a default value of the maximum number is one; and/or if the UE is not configured with the maximum number associated with the first condition, the default value of the maximum number is one (i.e., one shot triggering).

In various embodiments, when the UE is configured with the maximum number and determines the number of instances, that an RSRP of a same beam of the one or more candidate beams is with the offset better than the RSRP of the first current beam, exceeds or reaches the maximum number, the UE triggers the report; and/or the UE determines the number of instances based on at least each one of the one or more candidate beams; and/or the UE determines the number of instances based on at least the first current beam.

In various embodiments, the UE maintains a timer associated with the first condition, and/or the first condition includes that the timer expires, and/or the first condition is not fulfilled when the timer is running, and/or the UE starts or restarts the timer when the UE transmits the report, a periodic report, or a report triggered by a network, and/or the UE stops the timer in response to change of the first current beam, change of the one or more candidate beams, or receiving an LTM MAC CE (e.g., LTM Cell Switch Command), and/or the UE restarts the timer in response to the UE changing PCell, a serving beam change, receiving a beam indication DCI, receiving the TCI state activation or deactivation MAC CE, and/or a beam failure.

In various embodiments, the UE cancels the report in one or multiple conditions of: the report is transmitted by the UE or is included in a MAC PDU or TB, and/or a periodic, a semi-persistent, or a network requested report is transmitted by the UE, and/or a MAC reset, and/or one or more parameters for the report are reconfigured, and/or a BFR is triggered and not canceled for a serving cell and the report is associated with the serving cell, and/or a random access procedure for an SpCell or an SCell BFR is initiated, and/or the first current beam is deactivated, and/or the one or more candidate beams to be indicated in the report are deactivated, and/or at least one serving cell associated with the report is deactivated or released, and/or at least one candidate cell associated with the report is deactivated or released, and/or a PCell change, and/or an LTM Cell Switch Command is received or an LTM is initiated, and/or a network node is in a power saving state for a serving cell of the UE.

In various embodiments, the one or more candidate beams and the first current beam are associated with a same serving cell, and/or the one or more candidate beams are associated with a candidate cell and the first current beam is associated with a serving cell, and/or the one or more candidate RSs comprise an RS being associated with a same serving cell as the first RS or the second RS, and/or the one or more candidate RSs comprise an RS being associated with different PCI than the first RS or the second RS.

In various embodiments, the report indicates one or multiple of: one or multiple serving cells associated with the first current beam indicated by the report, and/or one or multiple serving cells associated with the one or more candidate beams indicated by the report, and/or the first current beam of a serving cell, and/or the first current beam of a PCell, and/or the RSRP of the first current beam, and/or the one or more candidate beams of the serving cell, and/or one or multiple candidate cells which is associated with the one or more candidate beams indicated by the report, and/or the one or more candidate beams of same or different candidate cells, and/or the RSRP of the one or more candidate beams, and/or information associated with LTM or non-LTM, and/or an Identity associated with the first condition.

Referring back to FIGS. 3 and 4, in one or more embodiments from the perspective of a UE, the device 300 includes a program code 312 stored in memory 310 of the transmitter. The CPU 308 could execute program code 312 to: (i) receive a configuration of at least one condition to trigger a report by the UE, wherein the report is an L1 report or a MAC CE; (ii) receive a first DL signal activating more than one joint or DL TCI states; and (iii) trigger the report in response to or based on a first condition of the at least one condition being fulfilled, wherein: the first condition includes that: an RSRP of one or more candidate beams is with an offset better than an RSRP of a first current beam, or a number of instances, that the RSRP of the one or more candidate beams is with the offset better than the RSRP of the first current beam, exceeds or reaches a maximum number, and wherein the UE determines the RSRP of the first current beam based on measurement of a first RS derived from a first joint or DL TCI state with a worst RSRP among the more than one joint or DL TCI states, or based on measurement of a second RS derived from a second joint or DL TCI state with a best RSRP among the more than one joint or DL TCI states, and the UE determines the RSRP of the one or more candidate beams based on measurement of one or more candidate RSs. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

receiving a configuration of at least one condition, from a network node, to trigger a report by the UE, wherein the report is an L1 report or a Medium Access Control (MAC) Control Element (CE);

receiving a first Downlink (DL) signal activating more than one joint or DL Transmission Configuration Indication (TCI) states; and triggering the report based on a first condition of the at least one condition being fulfilled, wherein:

the first condition includes that:

a Reference Signal Received Power (RSRP) of one or more candidate beams is with an offset better than an RSRP of a first current beam, or a number of instances, that the RSRP of the one or more candidate beams is with the offset better than the RSRP of the first current beam, exceeds or reaches a maximum number, and wherein:

the UE determines the RSRP of the first current beam based on; measurement of a first Reference Signal (RS) derived from a first joint or DL TCI state with a worst RSRP among the more than one joint or DL TCI states; or measurement of a second RS derived from a second joint or DL TCI state with a best RSRP among the more than one joint or DL TCI states, according to the configuration from the network node, and the UE determines the RSRP of the one or more candidate beams based on measurement of one or more candidate RSs.

2. The method of claim 1, wherein:

the first joint or DL TCI state or the second joint or DL TCI state comprises two Quasi Co-Location (QCL) information, and one QCL information of the two QCL information is associated with the first RS or the second RS with a QCL type as type-D and another QCL information of the two QCL information is associated with a fourth RS with a QCL type other than the type-D;

the first DL signal corresponds to a TCI state activation or deactivation MAC CE;

the first RS or the second RS corresponds to a Channel State Information Reference Signal (CSI-RS) for beam management or a CSI-RS for RSRP measurement; or the first RS or the second RS does not correspond to a CSI-RS for tracking.

3. The method of claim 1, wherein the at least one condition includes at least one of:

a second condition including that an RSRP of a second current beam is worse than a first threshold;

a third condition including that the RSRP of the one or more candidate beams is better than a second threshold;

a fourth condition including that an RSRP or an average RSRP of N best beams of the one or more candidate beams is with an offset better than the RSRP of the second current beam, wherein N is larger than one; or a fifth condition including that the RSRP of the one or more candidate beams is with a second offset better than the RSRP of the second current beam.

4. The method of claim 3, wherein the UE triggers the report based on the second condition being fulfilled, or wherein the UE triggers the report based on the third condition being fulfilled, or wherein the UE triggers the report based on the fourth condition being fulfilled, or wherein the UE triggers the report based on the fifth condition being fulfilled.

5. The method of claim 1, wherein the one or more candidate beams is at least one of:

one or more configured joints or DL TCI states;

one or more activated joints or DL TCI states;

one or more RSs associated with the first condition; or one or more RSs configured for the report triggered by the UE.

6. The method of claim 1, wherein the UE is configured with at least one of: a periodic Physical Uplink Control Channel (PUCCH) resource for transmitting the report; or a periodic Physical Uplink Shared Channel (PUSCH) resource for transmitting the report, or wherein the UE does not expect to multiplex network triggered content into the periodic PUCCH resource or the periodic PUSCH resource, or wherein the UE transmits the report on one of the periodic PUCCH resource or one of the periodic PUSCH resource when the report is triggered.

7. The method of claim 1, wherein:

the UE receives a second DL signal indicating a third joint or DL TCI state, and the third joint or DL TCI state is associated with a third RS;

the second DL signal corresponds to a Downlink Control Information (DCI) with a TCI field for indicating the third joint or DL TCI state;

the third joint or DL TCI state comprises two QCL information, and one QCL information of the two QCL information is associated with the third RS with QCL type as type-D and another QCL information of the two QCL information is associated with a fourth RS with QCL type other than the type-D; or the UE determines an RSRP of a second current beam based on measurement of the third RS.

8. The method of claim 7, wherein the UE receives at least one of: Physical Downlink Shared Channel (PDSCH); or Physical Downlink Control Channel (PDCCH) which is configured to follow an indicated TCI state based on the third joint or DL TCI state, or wherein the third RS which is used for determining the RSRP of the second current beam is not only used for receiving the PDCCH but also for receiving the PDSCH.

9. The method of claim 1, wherein:

the offset is configured by the configuration, per condition of the at least one condition, per Bandwidth Part (BWP), or per serving cell;

different conditions of the at least one condition are configured with a same or different offset;

conditions of the at least one condition in different BWPs are configured with the same or different offset; or conditions of the at least one condition in different serving cells are configured with the same or different offset.

10. The method of claim 1, wherein:

the UE maintains a counter associated with the number of instances;

the counter or the number of instances is increased by one in response to the RSRP of the one or more candidate beams is with the offset better than the RSRP of the first current beam; or the UE resets the counter or the number of instances in response to at least one of: the UE changing Primary Cell (PCell), a current beam change, receiving a beam indication via DCI, receiving a TCI state activation or deactivation via MAC CE, a beam failure, triggering a beam failure recovery, or transmitting the report.

11. The method of claim 1, wherein:

the maximum number is based on a capability of the UE;

the UE reports the capability, to the network node, associated with the maximum number;

the maximum number is configured by the configuration, per condition of the at least one condition, per BWP, or per serving cell;

the UE is configured with the maximum number associated with the first condition;

a default value of the maximum number is one; or if the UE is not configured with the maximum number associated with the first condition, the default value of the maximum number is one.

12. The method of claim 1, wherein the UE cancels the report in one or multiple conditions of:

the report is transmitted by the UE or is included in a MAC Packet Data Unit (PDU) or Transport Block (TB);

a periodic, a semi-persistent, or a network requested report is transmitted by the UE;

a MAC reset;

one or more parameters for the report are reconfigured;

a Beam Failure Recovery (BFR) is triggered and not canceled for a serving cell and the report is associated with the serving cell;

a random access procedure for a Special Cell (SpCell) or a Secondary Cell (SCell) BFR is initiated;

the first current beam is deactivated;

the one or more candidate beams to be indicated in the report are deactivated;

at least one serving cell associated with the report is deactivated or released;

at least one candidate cell associated with the report is deactivated or released;

a PCell change;

an L1/L2-Triggered Mobility (LTM) Cell Switch Command is received or an LTM is initiated; or the network node is in a power saving state for a serving cell of the UE.

13. The method of claim 1, wherein:

the one or more candidate beams and the first current beam are associated with a same serving cell;

the one or more candidate beams are associated with a candidate cell and the first current beam is associated with a serving cell;

the one or more candidate RSs comprise an RS being associated with a same serving cell as the first RS or the second RS; or the one or more candidate RSs comprise an RS being associated with different Physical Cell Identity (PCI) than the first RS or the second RS.

14. The method of claim 1, wherein the report indicates one or multiple of:

one or multiple serving cells associated with the first current beam indicated by the report;

one or multiple serving cells associated with the one or more candidate beams indicated by the report;

the first current beam of a serving cell;

the first current beam of a PCell;

the RSRP of the first current beam;

the one or more candidate beams of the serving cell;

one or multiple candidate cells which is associated with the one or more candidate beams indicated by the report;

the one or more candidate beams of a same candidate cell or different candidate cells;

the RSRP of the one or more candidate beams;

information associated with an L1/L2-Triggered Mobility (LTM) or non-LTM; or an Identity associated with the first condition.

15. A User Equipment (UE), comprising:

a memory; and a processor operatively coupled with the memory, wherein the processor is configured to execute a program code to:

receive a configuration of at least one condition, from a network node, to trigger a report by the UE, wherein the report is an L1 report or a Medium Access Control (MAC) Control Element (CE);

receive a first Downlink (DL) signal activating more than one joint or DL Transmission Configuration Indication (TCI) states; and trigger the report based on a first condition of the at least one condition is fulfilled, wherein:

the first condition includes that:

a Reference Signal Received Power (RSRP) of one or more candidate beams is with an offset better than an RSRP of a first current beam, or a number of instances, that the RSRP of the one or more candidate beams is with the offset better than the RSRP of the first current beam, exceeds or reaches a maximum number, and wherein:

the UE determines the RSRP of the first current beam based on: measurement of a first Reference Signal (RS) derived from a first joint or DL TCI state with a worst RSRP among the more than one joint or DL TCI states; or measurement of a second RS derived from a second joint or DL TCI state with a best RSRP among the more than one joint or DL TCI states, according to the configuration from the network node, and the UE determines the RSRP of the one or more candidate beams based on measurement of one or more candidate RSs.

16. The UE of claim 15, wherein:

the first joint or DL TCI state or the second joint or DL TCI state comprises two Quasi Co-Location (QCL) information, and one QCL information of the two QCL information is associated with the first RS or the second RS with a QCL type as type-D and another QCL information of the two QCL information is associated with a fourth RS with a QCL type other than the type-D;

the first DL signal corresponds to a TCI state activation or deactivation MAC CE;

the first RS or the second RS corresponds to a Channel State Information Reference Signal (CSI-RS) for beam management or a CSI-RS for RSRP measurement; or the first RS or the second RS does not correspond to a CSI-RS for tracking.

17. The UE of claim 15, wherein the at least one condition includes at least one of:

a second condition including that an RSRP of a second current beam is worse than a first threshold;

a third condition including that the RSRP of the one or more candidate beams is better than a second threshold;

a fourth condition including that an average RSRP of N best beams of the one or more candidate beams is with an offset better than the RSRP of the second current beam, wherein N is larger than one; or a fifth condition including that the RSRP of the one or more candidate beams is with a second offset better than the RSRP of the second current beam.

18. The UE of claim 17, wherein the UE triggers the report based on the second condition being fulfilled, or wherein the UE triggers the report based on the third condition being fulfilled, or wherein the UE triggers the report based on the fourth condition being fulfilled, or wherein the UE triggers the report based on the fifth condition being fulfilled.

19. The UE of claim 15, wherein the one or more candidate beams is at least one of:

one or more configured joints or DL TCI states;

one or more activated joints or DL TCI states;

one or more RSs associated with the first condition; or one or more RSs configured for the report triggered by the UE.

20. The UE of claim 15, wherein the UE is configured with at least one of: a periodic Physical Uplink Control Channel (PUCCH) resource for transmitting the report; or a periodic Physical Uplink Shared Channel (PUSCH) resource for transmitting the report, or wherein the UE does not expect to multiplex network triggered content into the periodic PUCCH resource or the periodic PUSCH resource, or wherein the UE transmits the report on one of the periodic PUCCH resource or one of the periodic PUSCH resource when the report is triggered.

* * * * *